US011980911B2

(12) United States Patent
Becker et al.

(10) Patent No.: US 11,980,911 B2
(45) **Date of Patent: *May 14, 2024**

(54) HANDHELD SPRAY GUN

(71) Applicant: Graco Minnesota Inc., Minneapolis, MN (US)

(72) Inventors: Steven D. Becker, Blaine, MN (US); David M. Larsen, Albertville, MN (US); Steve J. Wrobel, Rogers, MN (US); Mark D. Shultz, Ham Lake, MN (US); Robert J. Gundersen, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,593

(22) Filed: Mar. 23, 2023

(65) Prior Publication Data

US 2023/0234085 A1 Jul. 27, 2023

Related U.S. Application Data

(63) Continuation of application No. 17/349,109, filed on Jun. 16, 2021, now Pat. No. 11,623,233, which is a (Continued)

(51) Int. Cl.
*B05B 7/24* (2006.01)
*B05B 7/00* (2006.01)
(Continued)

(52) U.S. Cl.
CPC .......... *B05B 7/2437* (2013.01); *B05B 7/0093* (2013.01); *B05B 7/0815* (2013.01); (Continued)

(58) Field of Classification Search
CPC ... B05B 7/2437; B05B 7/2416; B05B 7/2478; B05B 15/62; B05B 7/0093; B05B 7/0815; B05B 7/1413; B05B 12/002
(Continued)

(56) References Cited

U.S. PATENT DOCUMENTS 1,982,055 A 11/1934 Jenkins
2,904,262 A 9/1959 Peeps
(Continued)

FOREIGN PATENT DOCUMENTS

CN 1708359 A 12/2005
CN 201020437 Y 2/2008
(Continued)

OTHER PUBLICATIONS

Second Chinese Office Action for CN Application No. 202111545482.5, dated May 20, 2023, pp. 16.
(Continued)

*Primary Examiner* — Steven J Ganey
(74) *Attorney, Agent, or Firm* — Kinney & Lange, P. A.

(57) ABSTRACT

A sprayer includes a spray gun and a hopper. An air source provides compressed air to the sprayer to both eject fluid from the spray gun as a spray and to pressurize the hopper. The spray gun includes passages for providing compressed air to the nozzle for spraying and to the hopper for pressurizing the hopper. The spray gun further includes a relief valve for venting pressurized air from the hopper. The hopper receives the compressed air through a port in the hopper, and the compressed air assists the flow of material out of the hopper and into the spray gun.

18 Claims, 26 Drawing Sheets

Related U.S. Application Data continuation of application No. 16/257,941, filed on Jan. 25, 2019, now Pat. No. 11,052,412.

(60) Provisional application No. 62/654,050, filed on Apr. 6, 2018, provisional application No. 62/643,250, filed on Mar. 15, 2018, provisional application No. 62/622,776, filed on Jan. 26, 2018.

(51) Int. Cl.

| | |
|---|---|
| ***B05B 7/08*** | (2006.01) |
| ***B05B 7/14*** | (2006.01) |
| ***B05B 12/00*** | (2018.01) |
| ***B05B 15/62*** | (2018.01) |

(52) U.S. Cl.

CPC .......... *B05B 7/1413* (2013.01); *B05B 7/2416* (2013.01); *B05B 7/2478* (2013.01); *B05B 12/002* (2013.01); *B05B 15/62* (2018.02)

(58) Field of Classification Search

USPC .......................................... 239/302, 345, 346

See application file for complete search history.

(56) References Cited

U.S. PATENT DOCUMENTS

| | | | | |
|---|---|---|---|---|
| 3,083,883 | A | 4/1963 | Glidden | |
| 3,236,459 | A | 2/1966 | McRitchie | |
| 3,650,479 | A | 3/1972 | Liedberg | |
| 3,777,981 | A | 12/1973 | Probst et al. | |
| 4,043,510 | A | 8/1977 | Morris | |
| 4,256,241 | A | 3/1981 | Mesic | |
| 4,434,939 | A * | 3/1984 | Stankowitz | B05B 7/2435 239/345 |
| 5,069,389 | A | 12/1991 | Bitsakos | |
| 5,284,299 | A | 2/1994 | Medlock | |
| 5,415,351 | A * | 5/1995 | Otto | B05B 7/2478 239/346 |
| 5,695,125 | A | 12/1997 | Kumar | |
| 5,979,797 | A | 11/1999 | Castellano | |
| 6,726,125 | B1 * | 4/2004 | Nonis | B05B 7/12 239/375 |
| 7,017,838 | B2 | 3/2006 | Schmon | |
| 7,296,760 | B2 | 11/2007 | Alexander et al. | |
| 7,712,682 | B2 | 5/2010 | Joseph et al. | |
| 7,766,250 | B2 | 8/2010 | Kosmyna et al. | |
| 7,950,598 | B2 | 5/2011 | Olson et al. | |
| 8,061,295 | B2 | 11/2011 | Zimmerman et al. | |
| 8,066,205 | B2 | 11/2011 | Bass et al. | |
| 8,893,991 | B2 | 11/2014 | Alexander et al. | |
| 9,630,196 | B2 | 4/2017 | Finstad et al. | |
| 11,052,412 | B2 | 7/2021 | Becker et al. | |
| 2005/0284963 | A1 | 12/2005 | Reedy | |
| 2013/0140384 | A1 | 6/2013 | Alexander et al. | |
| 2013/0313338 | A1 | 11/2013 | Liang | |
| 2015/0322681 | A1 | 11/2015 | Kinne et al. | |
| 2015/0330089 | A1 | 11/2015 | Finstad et al. | |

FOREIGN PATENT DOCUMENTS

| | | | |
|---|---|---|---|
| CN | 103782073 | A | 5/2014 |
| CN | 104226509 | A | 12/2014 |
| CN | 204784898 | U | 11/2015 |
| CN | 206190994 | U | 5/2017 |
| EP | 1385632 | B1 | 3/2011 |
| EP | 2962765 | A1 | 1/2016 |
| JP | H0447495 | Y2 | 11/1992 |
| TW | 201436869 | A | 10/2014 |
| TW | 201436879 | A | 10/2014 |
| WO | 2014116949 | A1 | 7/2014 |
| WO | 2014116957 | A2 | 7/2014 |

OTHER PUBLICATIONS

Extended European Search Report for EP Application No. 19153797.6, dated Jun. 7, 2019, pp. 9.

Extended European Search Report for EP Application No. 19153800.8, dated Jun. 11, 2019, pp. 10.

First Chinese Office Action for CN Application No. 2019100711538, dated Aug. 5, 2020, pp. 22.

First Chinese Office Action for CN Application No. 2019100721722, dated Jul. 29, 2020, pp. 27.

First Chinese Office Action for CN Application No. 202111545482.5, dated Nov. 16, 2022, pp. 14.

Second Chinese Office Action for CN Application No. 2019100721722, dated Apr. 2, 2021, pp. 7.

Second Chinese Office Action for CN Application No. 2019100711538, dated Mar. 23, 2021, pp. 6.

Third Chinese Office Action for CN Application No. 202111545482.5, dated Nov. 21, 2023, pp. 66.

* cited by examiner

HANDHELD SPRAY GUN

CROSS-REFERENCE TO RELATED APPLICATION(S)

This application is a continuation of U.S. application Ser. No. 17/349,109 filed Jun. 16, 2021 for "HANDHELD TEXTURE SPRAY GUN WITH HOPPER," which in turn is a continuation of U.S. application Ser. No. 16/257,941 filed Jan. 25, 2019 and entitled "HANDHELD TEXTURE SPRAY GUN WITH HOPPER," which in turn claims the benefit of U.S. Provisional Application No. 62/622,776 filed on Jan. 26, 2018, and entitled "HANDHELD TEXTURE SPRAY GUN WITH HOPPER," claims the benefit of U.S. Provisional Application No. 62/643,250 filed on Mar. 15, 2018, and entitled "HANDHELD TEXTURE SPRAY GUN WITH HOPPER," and claims the benefit of U.S. Provisional Application No. 62/654,050 filed on Apr. 6, 2018, and entitled "HANDHELD TEXTURE SPRAY GUN WITH HOPPER," the disclosures of which are hereby incorporated by reference in their entireties.

BACKGROUND

The present disclosure relates generally to spraying of a fluid, and more particularly to spraying a fluid which applies a texture on a wall, ceiling, floor, or other surface.

Texture fluid is typically thick and viscous. Such fluid is typically a mixture of solids and liquids and/or has a mud-like consistency. Such texture is typically sold as a bag of dry particles which are mixed with water and then sprayed on a surface, such as drywall, pool decks, and/or ceilings, for which an aesthetic textured finish is desired. Such finishes can be a knockdown, orange peel, popcorn, or smooth finish, amongst other options. Once sprayed, the fluid dries and hardens in place. Due to the thick and viscous nature of the fluid, it can be difficult to prepare and spray. Preparing and spraying must be convenient to avoid premature drying of the fluid before being sprayed. Moreover, the texture fluid is typically heavy, making the spraying device difficult to handle and maneuver. These and other aspects of spraying fluid are addressed herein. While a fluid comprising texture mixture will be used herein as an exemplar, it will be understood that this is merely one example and that various other fluids (e.g., water, oil, solvents, beads, flowable solids, paint, adhesives, filler, and/or pellets, etc.) can be applied.

SUMMARY

According to one aspect of the disclosure, a sprayer configured to spray fluid includes a hopper configured to hold the fluid and a spray gun mounted to the hopper and configured to receive fluid from the hopper and spray the fluid onto a surface. The spray gun includes a gun body; an air passage extending into the gun body, the air passage configured to receive a flow of pressurized air; a first air pathway fluidly connected to the air passage and extending through the gun body; and a second air pathway fluidly connected to the air passage and extending through the gun body.

According to another aspect of the disclosure, a sprayer configured to spray fluid includes a hopper configured to hold the fluid and a spray gun mounted to the hopper and configured to receive fluid from the hopper and spray the fluid onto a surface; and a pressure regulator mounted to a gun body of the spray gun and configured to regulate a flow of pressurizing air from the gun body to the hopper, the flow of pressurizing air configured to pressurize the hopper to force fluid from the hopper into the spray gun. The pressure regulator is operable in a passive mode in which the pressure regulator allows a vacuum condition in the hopper to cause the pressure regulator to shift to an open state such that the flow of pressurizing air can flow through the pressure regulator to the hopper in response to the vacuum condition.

According to yet another aspect of the present disclosure, a sprayer configured to spray fluid includes a hopper configured to hold the fluid; a spray gun mounted to the hopper and configured to receive fluid from the hopper and spray the fluid onto a surface, the spray gun configured to receive a pressurized airflow and provide the pressurized airflow to the hopper; and a relief valve disposed in a flowpath of the pressurized airflow, the flowpath fluidly connected to the hopper. The relief valve configured to pneumatically connect an interior of the hopper to the atmosphere when the relief valve is in an open position, thereby venting the pressure within the hopper.

According to yet another aspect of the disclosure, a sprayer configured to spray fluid, includes a hopper configured to hold the fluid; a spray gun mounted to the hopper and configured to receive fluid from the hopper and spray the fluid onto a surface; and a pressure regulator mounted to a gun body of the spray gun and configured to regulate a pressure of a flow of pressurizing air flowing to the hopper. The pressure regulator includes a pressure control mechanism configured to control the pressure of the flow of pressurizing air passing through the pressure regulator; and a knob configured to rotate to control a state of the pressure control mechanism. The knob has a limited angular displacement between a minimum pressure position and a maximum pressure position.

According to yet another aspect of the present disclosure, a sprayer configured to spray fluid includes a hopper configured to hold the fluid and a spray gun mounted to the hopper and configured to receive fluid from the hopper and spray the fluid onto a surface. The spray gun includes a gun body having a flowpath therethrough, the flowpath configured to provide a pressurizing airflow to the hopper; and a pressure regulator mounted to a gun body of the gun and configured to regulate the pressurizing airflow to the hopper. The pressure regulator includes a housing mounted on the gun body; a diaphragm retained between the housing and the gun body; a downstream chamber defined by the gun body and a second side of the diaphragm, wherein the downstream chamber is fluidly connected to the hopper; and a seal member connected to the diaphragm and separating the downstream chamber from an upstream chamber in the gun body.

According to yet another aspect of the present disclosure, a sprayer configured to spray fluid includes a spray gun configured to receive a fluid and spray the fluid onto a surface and a hopper mounted on the spray gun and configured to hold the fluid and provide the fluid to the spray gun. The hopper includes a hopper base; and an air passage extending through a wall of the hopper base, the air passage including a passage inlet and a passage outlet, and the air passage configured to provide pressurized air to an interior of the hopper.

According to yet another aspect of the present disclosure, a sprayer configured to spray fluid includes a spray gun configured to receive a fluid and spray the fluid onto a surface and a hopper mounted on to the spray gun and configured to hold the fluid and provide the fluid to the spray gun. The spray gun includes a gun body and a throat extending from the gun body. The hopper includes a hopper base having a neck configured to mount to the throat of the gun body, wherein the fluid moves through the neck and throat between the hopper and the spray gun.

According to yet another aspect of the present disclosure, a sprayer configured to spray fluid includes a spray gun configured to receive a fluid and spray the fluid onto a surface, the spray gun including a gun body and a throat extending from the gun body, and a hopper mounted on the spray gun and configured to hold the fluid and provide the fluid to the gun. The hopper includes a hopper base; a lip disposed at a first end of the hopper base and extending around a top opening in the hopper base; a seal groove extending around an exterior of the hopper base below the lip; a seal disposed within the groove; and a lid disposed over the top opening and the lip, the lid configured to engage the seal to enclose and seal the hopper base.

According to yet another aspect of the present disclosure, a sprayer configured to spray fluid includes a spray gun configured to receive a fluid and spray the fluid onto a surface and a hopper mounted on the spray gun. The spray gun includes a gun body; and a throat extending from the gun body. The hopper is mounted at the throat and configured to hold the fluid and provide the fluid to the spray gun. The hopper includes a hopper base having a neck; and a first groove extending around an exterior of the hopper proximate a top of the hopper base. The sprayer further includes a second groove extending around one of an exterior of the throat and an interior of the neck; a first seal disposed within the first groove; and a second seal disposed within the second groove. The first seal is configured to interface with and seal with a lid disposed on the top of the hopper. The second seal is configured to interface with the throat and neck to seal the interface between the throat and the neck.

According to yet another aspect of the present disclosure, a sprayer configured to spray fluid includes a spray gun configured to receive a fluid and spray the fluid onto a surface and a hopper mounted on the spray gun and configured to hold the fluid and provide the fluid to the spray gun. The hopper includes a plurality of projections extending from an exterior of the hopper. The plurality of projections are vertically elongate. The plurality of projections are spaced around a periphery of the hopper. The plurality of projections are configured to engage multiple points along a curved surface of a container when the sprayer is placed in the container.

According to yet another aspect of the present disclosure, a sprayer configured to spray fluid includes a spray gun configured to receive a fluid and spray the fluid onto a surface and a hopper mounted on the spray gun and configured to hold the fluid and provide the fluid to the spray gun. The hopper includes a hopper base; a lid disposed on the hopper base; and a port extending through the hopper base, wherein the port is configured to provide a pathway for fluid to enter the hopper such that the hopper can be refilled without removing the lid from the hopper base.

According to yet another aspect of the present disclosure, a method of spraying includes flowing pressurized air into a common air passage extending into a gun body of a spray gun; flowing a first portion of the pressurized air through a first branch path and to a nozzle of the spray gun to eject a fluid from the nozzle of the spray gun; controlling the flow of the first portion of the pressurized air through the first branch path with an airflow control mechanism disposed in the first branch path; flowing a second portion of the pressurized air through a second branch path within the gun body; regulating an air pressure of the second portion of the pressurized air with a pressure regulator disposed in the second branch path, thereby generating a regulated air flow within the second branch path downstream of the first branch path; and flowing the regulated air flow to a hose extending from a port in the gun body, the hose extending to a hopper mounted on the spray gun and configured to provide the regulated air flow to the hopper to pressurize the hopper.

According to yet another aspect of the present disclosure, a method of spraying includes flowing air into a common air passage extending into a gun body of a spray gun; flowing a first portion of the air through a first branch path and to a nozzle of the spray gun to eject a fluid from the nozzle of the spray gun; flowing a second portion of the air through a second branch path within the gun body and to a hose extending from a port in the gun body; flowing the second portion through the hose to an air passage extending through a wall of the hopper, wherein the air passage is disposed on a passage axis and includes a passage outlet oriented vertically towards a lid of the hopper; wherein the second portion is configured to pressurize an interior of the hopper to drive the fluid into the spray gun from the hopper.

DETAILED DESCRIPTION

As discussed above, texture fluid is typically a mixture of solids and liquids and/or has a mud-like consistency. While the spray gun of the present disclosure will be described in the context of a texture fluid, a person skilled in the art will understand that this is merely one example and that various other fluids (e.g., water, oil, solvents, beads, flowable solids, paint, adhesives, filler, and/or pellets, etc.) can be used with the spray gun of the present disclosure.

Figure 1B:
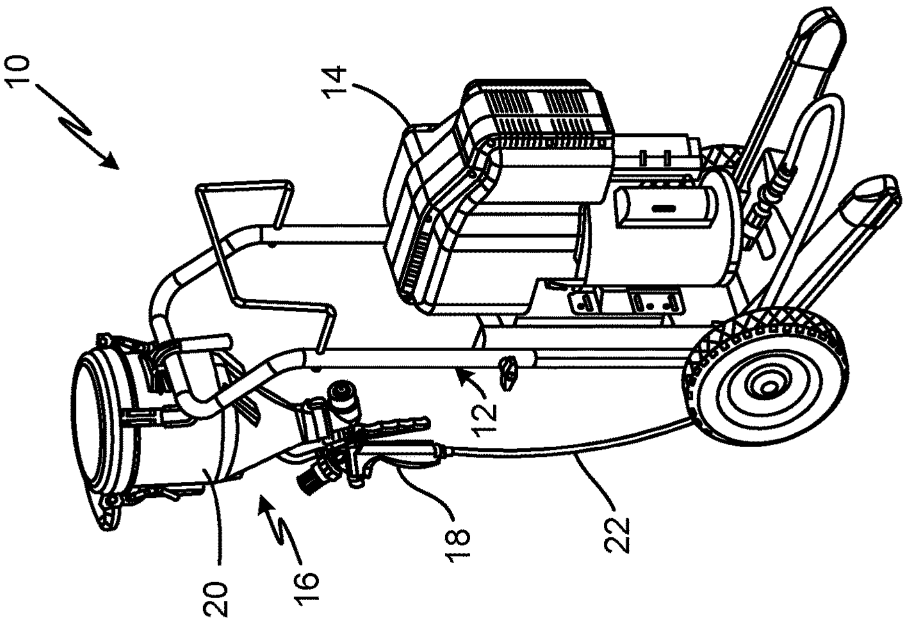
FIG. 1B is an isometric view of a sprayer system.
Figure 1A:
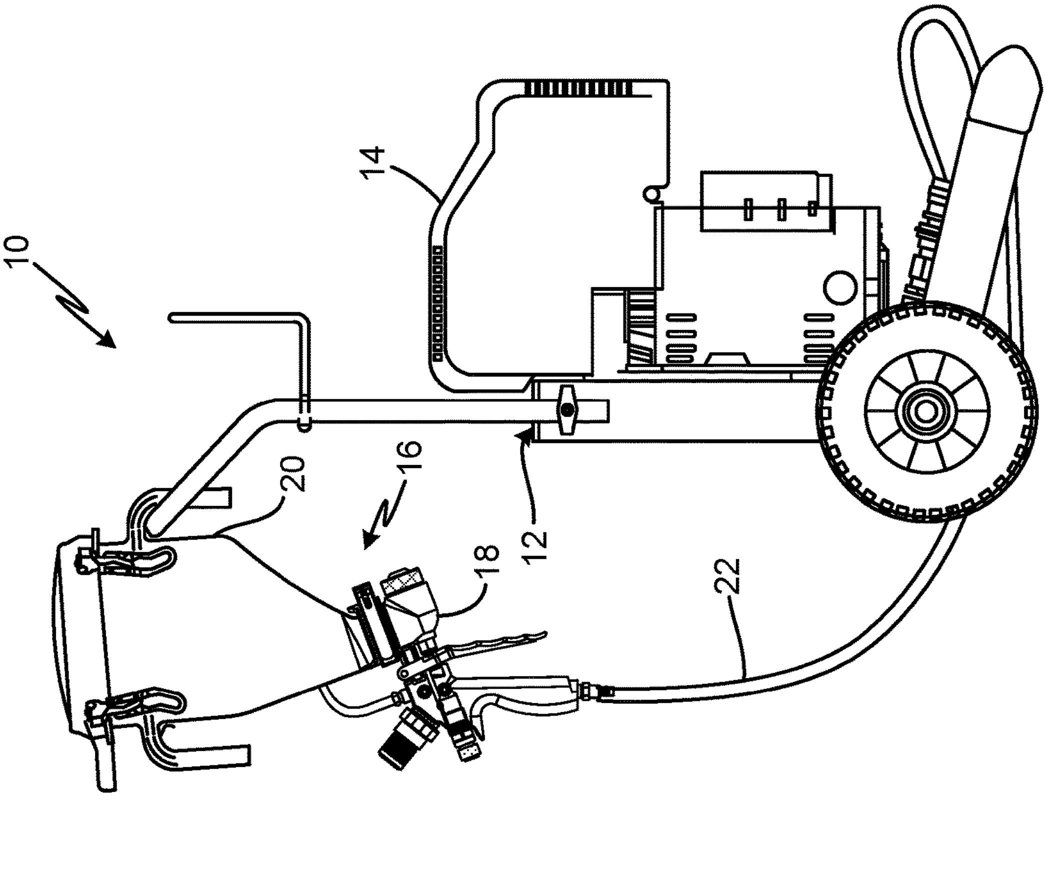
FIG. 1A is a side elevation view of a sprayer system.

FIG. 1A is a side view of a sprayer system 10. FIG. 1B is an isometric view of sprayer system 10. Sprayer system 10 includes frame 12, air supply 14 and sprayer 16. Sprayer 16 includes spray gun 18 and hopper 20. Hose 22 extends between and connects air supply 14 and sprayer 16.

Air supply 14 is configured to compress and pressurize air and to provide the compressed air to sprayer 16. In the example shown, air supply 14 shown is an air compressor. The compressor can be of any suitable style for providing compressing air to a desired pressure for operating sprayer 16. For example, the compressor can be an oil-less compressor or other type of piston compressor. Air supply 14 can alternatively include a turbine or impeller for compressing air. Air supply 14 can be operated by an electric motor. Air supply 14 can include, or alternatively can be, an air tank reservoir. As shown, frame 12 includes a stand and wheels. Air supply 14 outputs a flow of pressurized air to sprayer 16 both to eject material stored in hopper 20 through a nozzle of spray gun 18 as a spray, and to pressurize hopper 20. Specifically, air supply 14 outputs the flow of pressurized air to sprayer 16 through air supply hose 22. In various embodiments, air supply 14 outputs a continuous high volume of air at about 45 pounds per square inch (PSI) (about 310 kPa). A person skilled in that art would know how to select an appropriate pressure for the air supply 14, which may be higher or lower than 45 psi (310 kPa).

The flow of pressurized air is routed by air supply hose 22 to sprayer 16. Sprayer 16 includes spray gun 18 for spraying fluid onto a surface and hopper 20 for storing a supply of the prior to spraying. Hopper 20 is mounted on the top of spray gun 18. As will be explained further herein, the fluid is stored in the hopper 20 prior to spraying. The fluid is fed from hopper 20 to spray gun 18 via a mechanical connection between hopper 20 and spray gun 18. The fluid is then sprayed from spray gun 18 onto a surface. Spray gun 18 uses the flow of pressurized air from air supply 14 to propel the material received from hopper 20 through a spray nozzle of spray gun 18. The pressurized air from air supply 14 can also be provided to hopper 20 to pressurize hopper 20 and encourage the fluid flow from hopper 20 into spray gun 18. Each of spray gun 18 and hopper 20 will be further discussed herein.

Figures 2A, 2B:
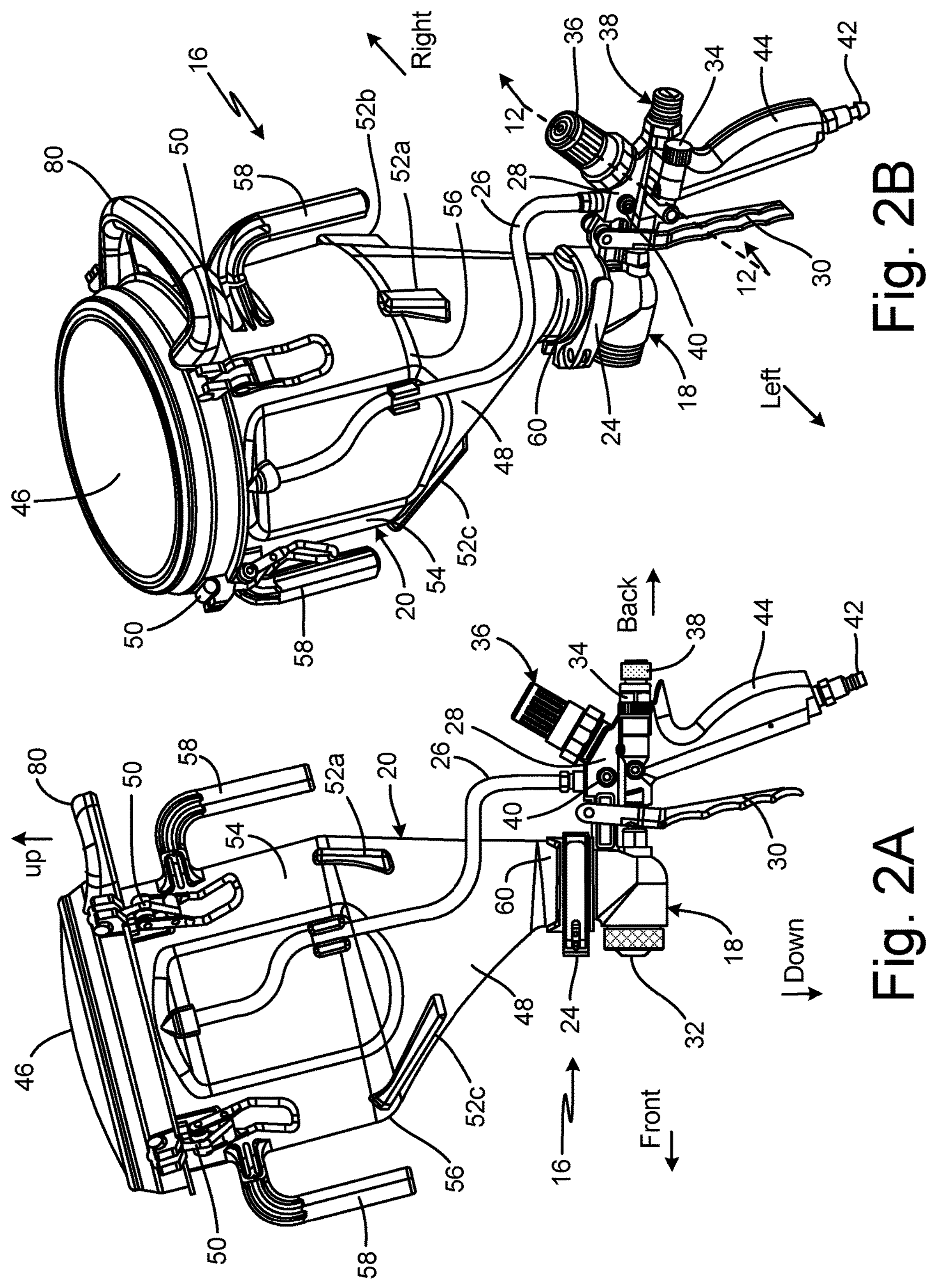
FIG. 2A is a side elevation view of a sprayer.
FIG. 2B is an isometric view of a sprayer.

FIG. 2A is a side elevation view of sprayer 16. FIG. 2B is an isometric view of sprayer 16. The up, down, back (i.e. rear), and front directions relative to sprayer 16 are indicated in FIG. 2A, and such relative directions will be used herein for reference. The left and right directions relative to sprayer 16 are indicated in FIG. 2B, and such relative directions will also be used herein for reference. Sprayer 16 includes spray gun 18, hopper 20, clamp 24, and hose 26. Spray gun 18 includes gun body 28, trigger 30, nozzle 32, airflow control 34, pressure regulator 36, spray regulator 38, relief valve 40, and connector 42. Gun body 28 includes handle 44. Hopper 20 includes lid 46, hopper base 48, and fasteners 50. Hopper base 48 includes projections 52*a*-52*d*, upper portion 54, transition section 56, handles 58, and neck 60. Lid 46 includes handle 80.

Gun body 28 can be a unitary piece of metal and/or can be made from multiple pieces of metal. Gun body 28 forms the general structure of spray gun 18. One or more channels can be formed within gun body 28 for routing the flow of compressed air and fluid through gun body 28. All components of spray gun 18 are structurally supported, directly or indirectly, by gun body 28. Furthermore, all components of hopper 20 are directly or indirectly structurally supported by gun body 28 during spraying.

Gun body 28 includes handle 44, which is integrally formed by gun body 28. Handle 44 is configured, by its shape, to be held by one hand of an operator/user. Handle 44, gripped by one hand, can be sufficient to support and operate sprayer 16 during the spraying of fluid. The user can also grasp handles 58 of hopper base 48 or handle 80 of lid 46 with the user's other hand. Handle 44 positions the hand of the user to actuate trigger 30 of spray gun 18. Trigger 30 is pivotally mounted on gun body 28 and can be pulled back by one or more fingers of the user. Generally, trigger 30 is maintained by a spring force in a non-actuated, forward position. Trigger 30 can then be pulled backward by the user, relative to handle 44, to open a flowpath through nozzle 32 and cause sprayer 16 to eject the fluid as a spray. Nozzle 32 is disposed at a front end of spray gun 18 and generates the spray as the fluid is ejected from spray gun 18. Connector 42 is mounted to handle 44 of gun body 28. Connector 42 can connect with an end of air supply hose 22 (FIGS. 1A-1B) to receive the flow of pressurized air from air supply 14 (FIG. 1A-1B). Connector 42 can be of any suitable configuration for connecting to air supply hose 22, such as a quick-disconnect type, a threaded connection, amongst other suitable options.

Spray regulator 38 extends into gun body 28 and is configured to adjust various aspects of the spray pattern provided caused by nozzle 32. For example, spray regulator 38 can adjust the needle travel of a spray control needle disposed in gun body 28 that is caused by the user depressing trigger 30. Limiting the needle travel regulates the size of the opening that the fluid can flow through within spray gun 18 just before being sprayed from nozzle 32. Spray gun 18 further includes various regulators for controlling the flow of the pressurized air within spray gun 18. The regulators include airflow control 34, pressure regulator 36, and relief valve 40. The airflow through gun body 28 and to nozzle 32 is regulated by airflow control 34. Hose 26 extends between spray gun 18 and hopper 20 and is configured to route pressurized air from spray gun 18 to hopper 20 to pressurize hopper 20. The airflow through hose 26 and to hopper 20 is regulated by pressure regulator 36 and relief valve 40, as will be further shown herein.

Hopper 20 includes lid 46 mounted on and attached to hopper base 48. In the illustrated embodiment, hopper base 48 is a unitary hollow structure configured to contain a fluid, such as texture material, although hopper base 48 may be formed from multiple components in other embodiments. Hopper base 48 is, in some examples, injected molded from polymer but may be made from any other material appropriate for a specific application. Hopper base 48 includes top and bottom openings. The top opening is configured to receive fluid to refill hopper base 48 with the fluid, and the bottom opening is configured to provide the fluid into gun body 18 at a location upstream of nozzle 32 so the fluid can be sprayed out of gun body 18 through nozzle 32. Hopper base 48 includes handles 58, which project from hopper base 48. Handles 58 provide grip points for the second hand of the user, as the user grasps handle 44 with the user's first hand. Moreover, handles 58 can be hung on a hanger, such as frame 12 (FIGS. 1A-1B), to maintain sprayer 16 in an upright, rest position while not being held by the user.

Lid 46 is disposed over and encloses the top opening in hopper base 48. Lid 46 seals on hopper base 48 to allow pressurization of hopper 20. Lid 46 can be formed in the same way as the hopper base 48 and from the same polymer or another material suitable for sealing over hopper base 48 such that hopper 20 can be pressurized. Lid 46 can alternatively be formed from a different material and/or in a different manner from hopper base 48. Lid fasteners 50 secure lid 46 on hopper base 48 over the top opening of hopper base 48. Lid fasteners 50 can be toggled to a tensioned position in which lid fasteners 50 pull lid 46 down on hopper base 48 to maintain a compressive force between the lid 46 and hopper base 48, thereby sealing the top opening of hopper base 48 with lid 46. For example, a seal, such as an o-ring, can be captured between lid 46 and hopper base 48 to facilitate the seal between lid 46 and hopper base 48. In other examples, lid 46 and hopper base 48 can be formed from material suitable for facilitating a seal or can include interface features for facilitating a sufficient seal to allow pressurization of hopper 20. Lid fasteners 50 can be released to unsecure lid 46 and allow removal of lid 46 from hopper base 48. While lid fasteners 50 are shown as over-center clamps, it is understood that other type of fasteners suitable for maintaining lid 46 on hopper base 48 and for facilitating the seal between lid 46 and hopper base 48 can be used instead. For example, various other types of clamps can be used. Also, various types of screws and nuts can be used to secure lid 46 to hopper base 48.

Hopper 20 is mounted on the top of the gun body 28 and is secured to gun body 28 by clamp 24. Clamp 24 is shown as an over-center clamp; however, other types of clamps can be used, such as a hose clamp or a duct clamp, and in such alternative clamps the clamp could be tightened by a butterfly thumb screw or other suitable mechanism. In one example, clamp 24 can include slots and a worm screw interfacing with the slots to facilitate tightening and loosening of clamp 24.

Hopper 20 includes neck 60 formed at a bottom portion of hopper base 48. Neck 60 defines an outlet port that is open through a bottom side of neck 60. The opening through the bottom of neck 60 is the bottom opening of hopper base 48. Clamp 24 extends around neck 60 and connects neck 60 to the top of spray gun 18 to seal the bottom opening of hopper base 48 to spray gun 18. Clamp 24 wraps around both of a throat portion of gun body 28 and neck 60 of hopper 20 to secure hopper 20 on spray gun 18. Clamp 24 can be released (e.g., via a lever or screw) to unsecure hopper 20 from spray gun 18 and facilitate removal of hopper 20 from spray gun 18.

Figure 7:
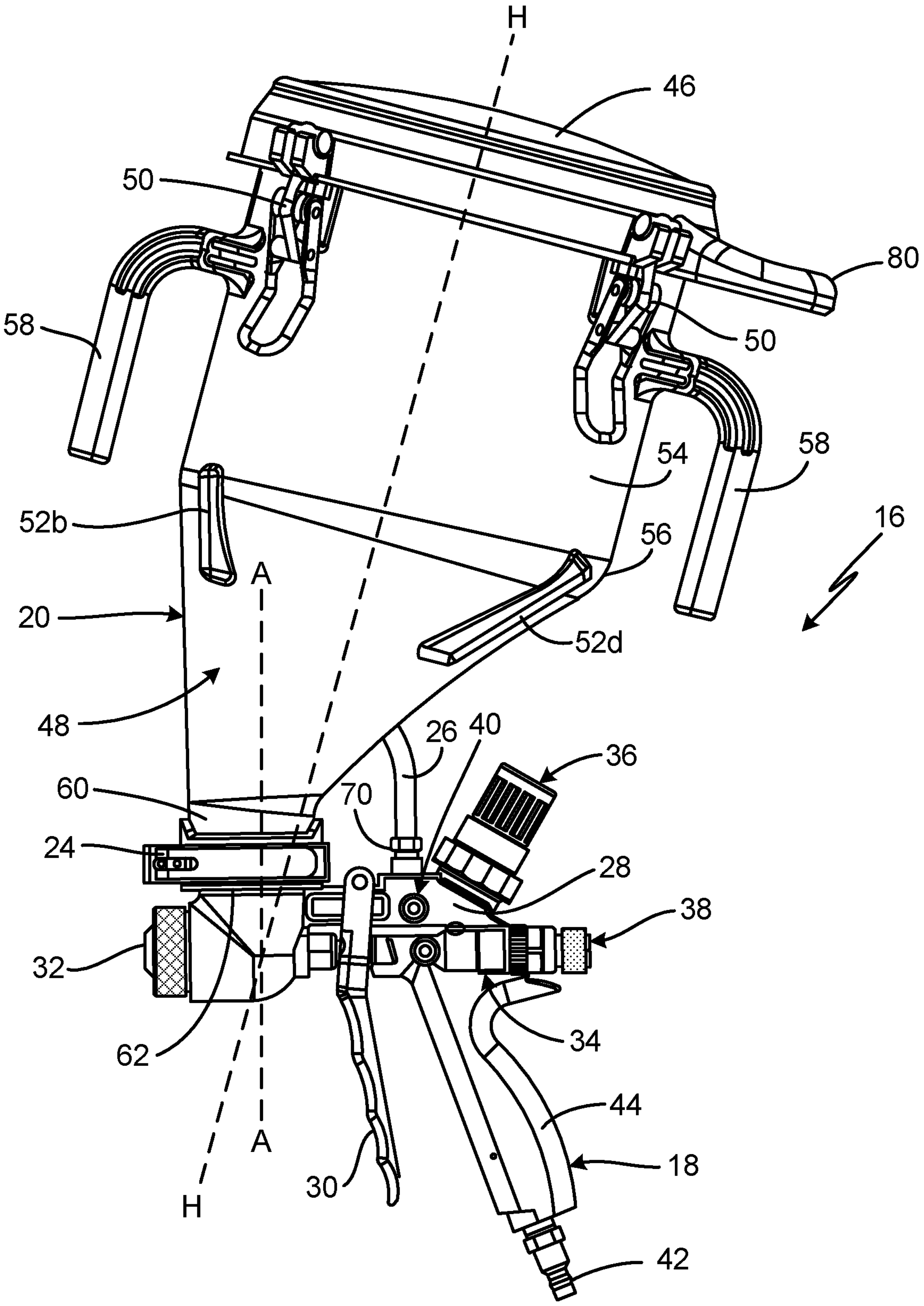
FIG. 7 is a side elevation view of a sprayer showing a hopper mounted on a spray gun in a second orientation.

Hopper base 48 includes projections 52*a*-52*d* (52*d* is shown in FIG. 7). Projections 52*a*-52*d* are formed from the same material as the remainder of hopper base 48. In some examples, projections 52*a*-52*d* are integrally formed with hopper base 48, but projections 52*a*-52*d* can be formed separate from hopper base 48 and later connected to hopper base 48 in any desired manner. Projections 52*a*-52*d* project outward from the circular exterior of hopper base 48. Projections 52*a*-52*d* are spaced around the periphery of hopper base 48. Projections 52*a*-52*d* are elongate in a vertical (up and down) orientation. In this way, projections 52*a*-52*d* have a ridge profile.

Upper portion 54 of hopper base 48 has a profile with a generally consistent diameter. Transition portion 22 extends between upper portion 54 of hopper base 48 and neck 60 of hopper base 48. Transition section 56 transitions the profile of hopper base 48 from having a generally consistent diameter above transition section 56, in upper portion 54, to having an angled, narrowing diameter below transition section 56. The diameter of hopper base 48 below transition section 56 deceases to neck 60 of hopper base 48. As shown, the projections 52*a*-52*d* overlap transition section 56 and extend onto the angled, narrowing diameter portion below transition section 56.

Projections 52*a*-52*d* function to stabilize sprayer 16 when sprayer 16 is placed in a bucket or against another rounded support surface. Commonly, a user will mix the texture fluid or other spray fluid in a container and then pour the fluid into hopper 20 while hopper 20 is standing upright and supported by the container. Alternatively, the user may pour the ingredients into hopper 20 and mix the fluid in hopper 20. In either case, the risk of spillage of the fluid is high. To alleviate the risk of spillage, the user can place sprayer 16 in a standard five gallon bucket, or other suitable container, that can both hold sprayer 16 in an upright position and catch any spills of the fluid during the filling process. In the bucket, connector 42 and/or gun body 28 rests on the bottom of the bucket while two or more of projections 52*a*-52*d* engage the side of the bucket. More specifically, projections 52*a*-52*d* typically engage the inside of the top lip of the bucket. Without projections 52*a*-52*d*, a rounded side of hopper base 48 would engage the rounded inside of the top lip of the bucket. In such an arrangement, sprayer 16 would not be stabilized and would instead be prone to rocking due to the engagement of these two rounded surfaces. But in various embodiments of the present disclosure, sprayer 16 is stabilized, and not prone to rocking, due to engagement of two or more of projections 52*a*-52*d* with two or more spaced portions of the rounded inside of the top lip of the bucket. In this way, projections 52*a*-52*d* are configured to engage multiple points along a curved surface of a bucket when sprayer 16 is placed in the bucket to thereby stabilize sprayer 16 within the bucket. For example, only two of projections 52*a*-52*d* may contact the bucket when sprayer 16 is placed in the bucket and leans against the curved surface of the bucket. Projections 52*a*-52*d* may, in some examples, be the only part of hopper 20 that contacts the bucket. The vertical elongation of projections 52*a*-52*d* allows sprayer 16 to be placed in and stabilized within different sized buckets (e.g., having different heights) during filling.

During operation, compressed air is provided to sprayer 16 via a hose, such as air supply hose 22 (FIGS. 1A-1B), connected to sprayer 16 at connector 42. The compressed air flows through gun body 28, with a first portion flowing through airflow control 34 and to nozzle 32, and a second portion flowing through pressure regulator 36, relief valve 40, and hose 26 to hopper. The second portion flows into hopper base 48 through hose 26 to pressurize the contents of hopper 20. Pressurizing hopper 20 enhances the flow of material out of hopper 20 into spray gun 18. The first portion flows through gun body 28, picks up the material entering spray gun 18 from hopper 20, and carries the material out of nozzle 32 as a spray. As such, the first portion entrains the fluid and carries the fluid out of spray gun 18 as a spray, while the second portion pressurizes hopper 20, which pressurization assists in driving the fluid into spray gun 18 from hopper 20.

Figure 3:
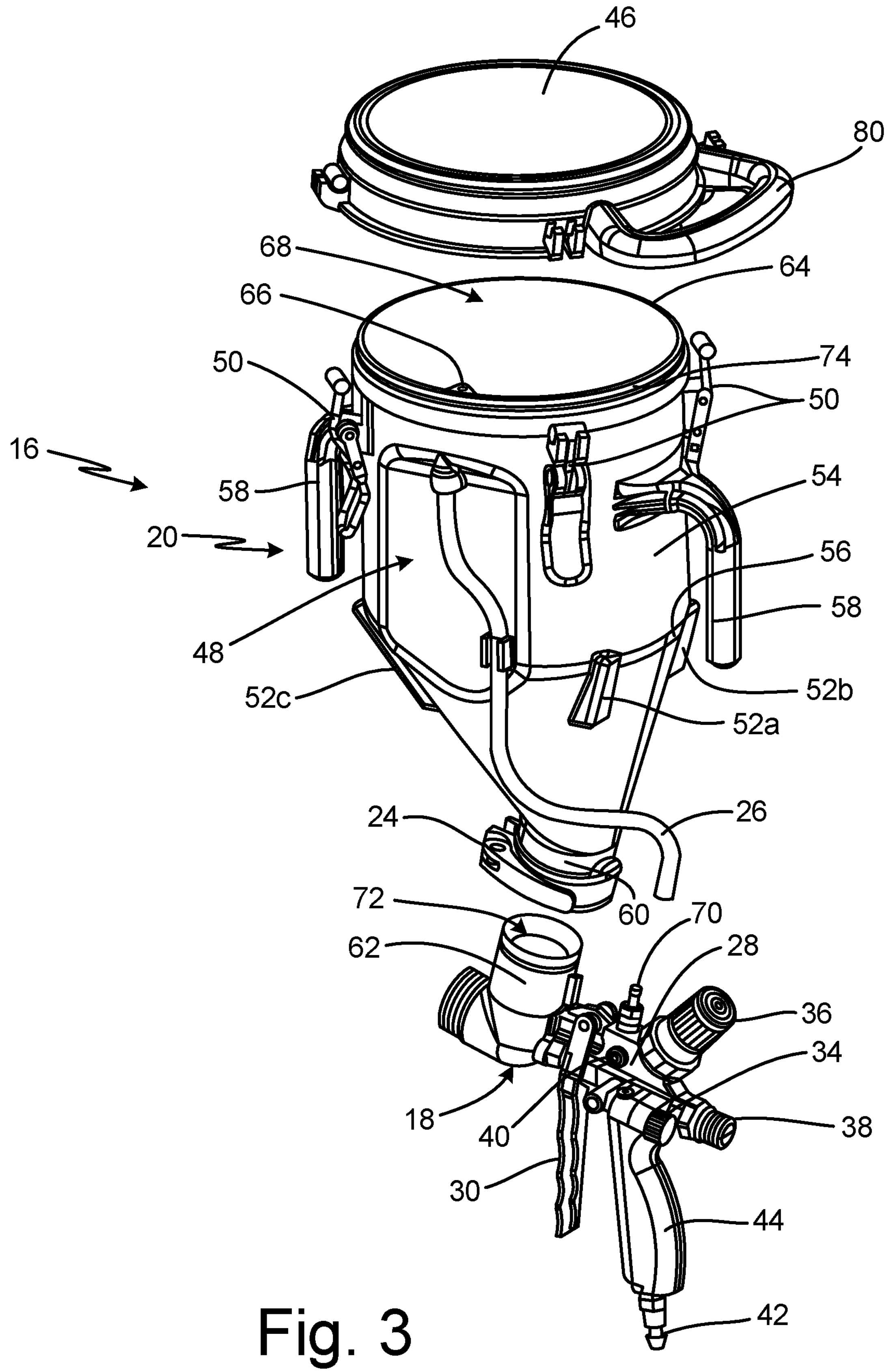
FIG. 3 is an exploded isometric view of a sprayer.

FIG. 3 is an exploded perspective view of sprayer 16. Sprayer 16 includes spray gun 18, hopper 20, clamp 24, and hose 26. Spray gun 18 includes gun body 28, trigger 30, airflow control 34, pressure regulator 36, spray regulator 38, relief valve 40, connector 42, and connector 70. Gun body 28 includes handle 44 and throat 62. Channel 72 extends into gun body 28 at throat 62. Hopper 20 includes lid 46, hopper base 48, and fasteners 50. Hopper base 48 includes projections 52*a*-52*d*, upper portion 54, transition section 56, handles 58, neck 60, lip 64, and port 66. Hopper base 48 defines interior space 68. Lid 46 includes handle 80.

In the view shown, hopper 20 has been removed from spray gun 18 to expose throat 62 of spray gun 18. In some examples, throat 62 can be integrally formed as part of gun body 28. Throat 62 forms a cylindrical structure around which neck 60 of hopper base 48 can fit. Neck 60 is secured to throat 62 by clamp 24 squeezing around the neck 60 of hopper base 48. Removing hopper 20 exposes channel 72 through neck 60 and into spray gun 18. Fluid from hopper 20 flows out of hopper 20 through neck 60 and into channel 72. The fluid is picked up from channel 72 by the flow of compressed air within gun body 28 and is ejected from spray gun 18 through nozzle 32 (best seen in FIGS. 9A and 9B) as a spray. While the illustrated embodiment shows throat 62 fitting within neck 60 to secure and seal hopper base 48 to spray gun 18, it is understood that the relative sizing between throat 62 and neck 60 can be reversed such that neck 60 fits within throat 62. A sealing ring can be located on either of neck 60 or throat 62 to seal the fluid connection between neck 60 and throat 62. The sealing ring can be fixed to either an exterior surface or an interior surface of either of neck 60 or throat 62 so that the sealing ring engages both of neck 60 and throat 62 at the interface between neck 60 and throat 62.

Removal of lid 46 from hopper base 48 reveals an interior space 68 of hopper 20. Interior space 68 is where the fluid resides before being fed into spray gun 18 and ejected as a spray. Removal of lid 46 from hopper base 48 also exposes lip 64 of hopper base 48. Lip 64 defines the top opening of hopper base 48. Typically, the fluid is placed into interior space 68 of hopper 20 through the top opening of hopper base 48.

Removal of lid 46 from the hopper base 48 also reveals seal 74 extending around hopper base 48. Seal 74 is shown as a ring that extends entirely around hopper base 48. For example, seal 74 can be a rubber O-ring that extends around hopper base 48. Seal 74 resides within an annular groove that extends around the exterior of hopper base 48. Seal 74 contacts an inner annular surface of lid 46 when lid 46 is placed on hopper base 48. Seal 74 is compressed by lid 46 and provides an air tight seal between lid 46 and hopper base 48 to prevent air and/or fluid from escaping from the top of hopper 20.

Port 66 is formed on lip 64. Port 66 is a hole exposed on the top of lip 64. Port 66 faces upwards, and not sideways, relative to hopper base 48. As further explained herein, pressurized air is released into interior space 68 of hopper 20 though port 66. Lid 46 abuts seal 74 of hopper 20 so the pressurized air is maintained within interior space 68 and cannot escape from the top of hopper 20 between hopper base 48 and lid 46, due to seal 74. Instead, the pressurized air in interior space 68 of hopper 20 exerts a downward force on the fluid within interior space 68 to cause the fluid to feed into spray gun 18 at a rate greater than that provided by gravity alone. In some examples, the pressurization of hopper 20 can cause the fluid to flow into spray gun 18 at a rate 3-6 times faster than gravity alone. The pressurized air released into interior space 68 of hopper 20 through port 66 is supplied to hopper 20 from spray gun 18. More specifically, the pressurized air enters gun body 28 through connector 42, flows through gun body 28 to connector 70, where the pressurized air enters hose 26 and flows through hose 26 to hopper 20. The air exits hose 26 and enters a flowpath formed within the body of hopper base 48. The pressurized air flows through the flowpath formed within hopper base 48 and enters interior space 68 of hopper 20 through port 66. Hose 26 can be formed of any suitable material for transporting the pressurized air to hopper 20 from gun body 28, such as from an elastomer, such as rubber. In some examples, hose 26 is configured to rupture and/or detach from connector 70 when the pressure within hopper 20 reaches a pressure level greater than a threshold pressure. In some examples, hose 26 can be configured to rupture and/or detach from connector 70 when the pressure level is 3-5 times greater than the threshold pressure. For example, the desired pressure can be about 5 PSI (about 34.5 kPa), and hose 26 can be configured to rupture and/or detach when the pressure level in hopper 20 reaches 15-20 PSI (about 103-138 kPa). It is understood that other pressure levels could be appropriate based on materials used to make the hopper 20, hose 26, gun body 28, and other parts of the spray gun 18.

Figure 4:
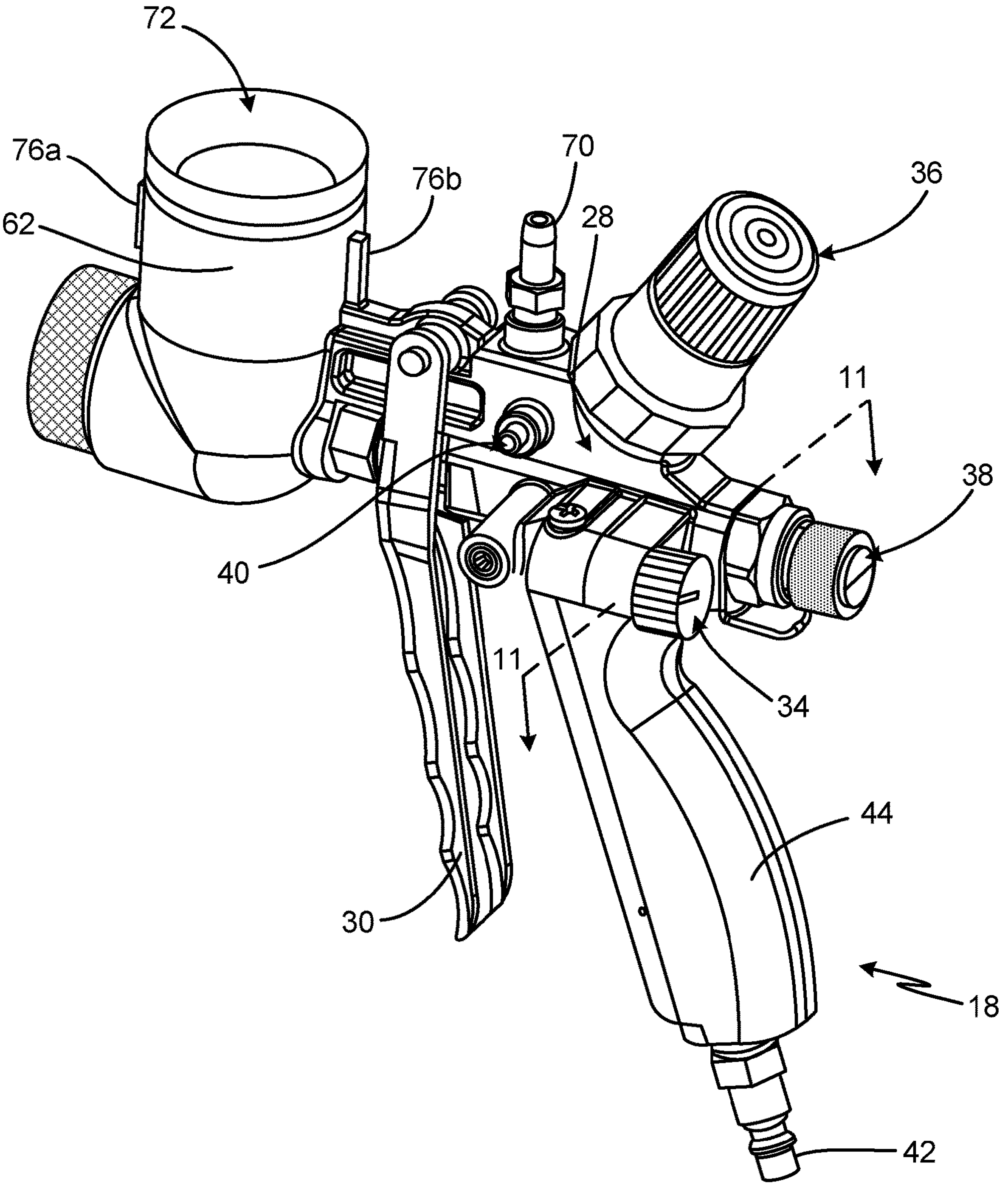
FIG. 4 is an isometric view of a spray gun.

FIG. 4 is an isometric view of spray gun 18. Spray gun 18 includes gun body 28, trigger 30, airflow control 34, pressure regulator 36, spray regulator 38, relief valve 40, connector 42, and connector 70. Gun body 28 includes handle 44 and throat 62. Throat 62 includes projections 76*a*, 76*b*. Throat 62 also defines channel 72.

Projections 76*a*, 76*b* are formed on throat 62. In some examples, projections 76*a*, 76*b* are integrally formed with throat 62. Projections 76*a*, 76*b* can be formed from the same material as the rest of gun body 28 or any other material deemed appropriate. Projections 76*a*, 76*b* project outward from the circular profile of throat 62. Projections 76*a*, 76*b* are elongated in a vertical (up and down) orientation and are disposed parallel with each other. In the illustrated embodiment, projections 76*a*, 76*b* are located in respective front and back positions around the periphery of throat 62. It is understood, however, that projections 76*a*, 76*b* can be disposed at any desired respective positions around throat 62, such as respective right side and left side positions or respective clocked positions about throat 62. In the illustrated embodiment, the projections 76*a*, 76*b* are located 180-degrees apart from each other about the periphery of the throat 62. It is understood, however, that projections 76*a*, 76*b* can be disposed at any desired angular displacement from each other, such as 60-degrees, 90-degrees, 120-degrees, or any other desired angular displacement. In the illustrated embodiment, there are only two projections 76*a*, 76*b* disposed around the periphery of throat 62. It is understood, however, that spray gun 18 can include as many or as few projections 76*a*, 76*b* as desired. However, projections 76*a*, 76*b* are preferably arrayed about throat 62 in such a way that hopper 20 can mount on throat 62 in only a forward or backward orientation, as discussed in more detail with regard to FIGS. 6 and 7. Projections 76*a*, 76*b* are indexing features which stabilize and fix the orientation of hopper 20 with respect to spray gun 18, as further shown below in FIGS. 5A-7.

Figure 5B:
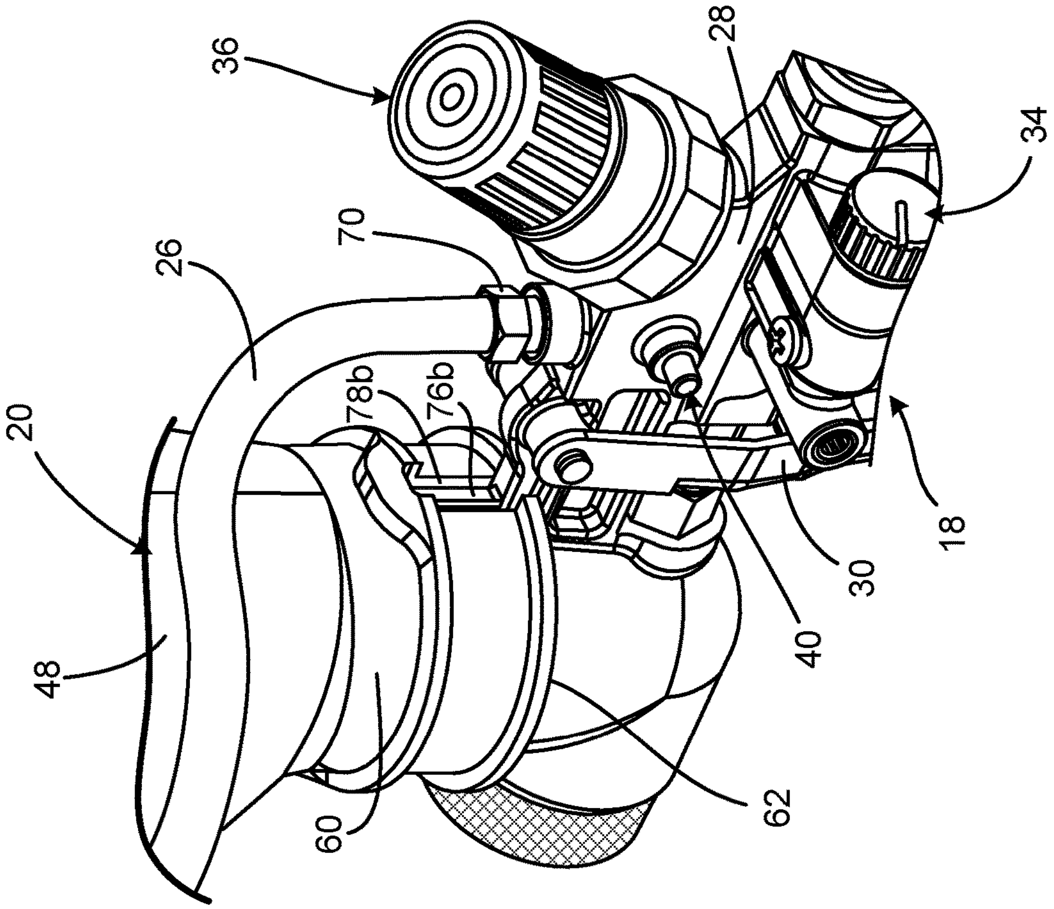
FIG. 5B is a second isometric view of a detail showing the connection between a spray gun and a hopper.
Figure 5A:
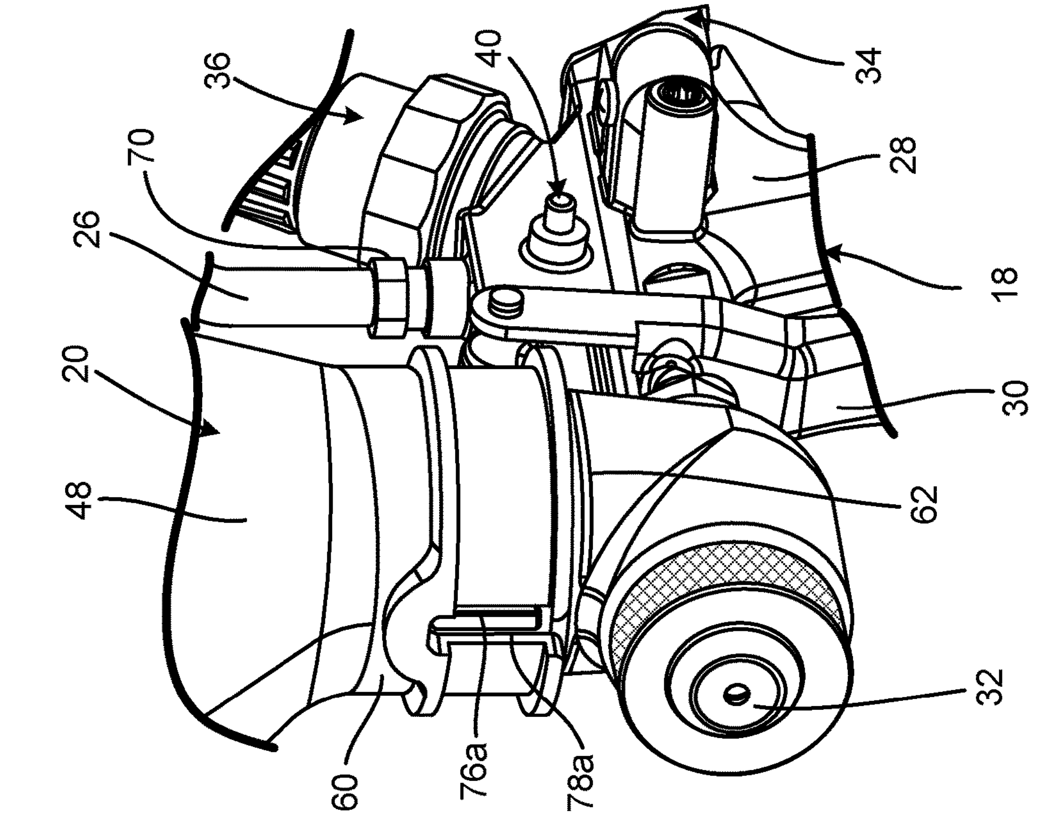
FIG. 5A is a first isometric view of a detail showing the connection between a spray gun and a hopper.

FIG. 5A is a first isometric view of a detail showing the connection between spray gun 18 and hopper 20. FIG. 5B is a second isometric view of a detail showing the connection between spray gun 18 and hopper 20. Gun body 28, trigger 30, nozzle 32, airflow control 34, pressure regulator 36, relief valve 40, and connector 70 of spray gun 18 are shown. Throat 62 of gun body 28 is shown. Throat 62 includes projections 76*a*, 76*b*. Hopper base 48 of hopper 20 is shown. Neck 60 of hopper base 48 is shown. Neck 60 includes slots 78*a*, 78*b*.

Cylindrical neck 60 of hopper 20 fits on cylindrical throat 62 of spray gun 18. Neck 60 of hopper 20 includes slots 78*a*, 78*b*. Slots 78*a*, 78*b* are formed in the same material as the rest of hopper base 48. In the example shown, slots 78*a*, 78*b* extend entirely through wall forming neck 60, but it is understood that shallower slots (e.g., grooves) on the inner surface of the wall defining neck 60, which do not extend entirely through the wall of neck 60, can instead be used. Slots 78*a*, 78*b* are elongated in a vertical (up and down) orientation and are parallel with each other. In the illustrated embodiment, slots 78*a*, 78*b* are located in respective front and back positions around the periphery of neck 60. In the illustrated embodiment, slots 78*a*, 78*b* are located 180-degrees apart from each other about the periphery of neck 60. While there are only two slots 78*a*, 78*b* shown around the periphery of neck 60, it is understood that neck 60 can include any desired number of slots 78*a*, 78*b*. Clamp 24 (best seen in FIGS. 2A-2B) is not shown in FIGS. 5A-5B to expose projections 76*a*, 76*b* within slots 78*a*, 78*b*. It is understood that normally clamp 24 would be mounted entirely around neck 60, covering projections 76*a*, 76*b* and slots 78*a*, 78*b*.

Projections 76*a*, 76*b* fit in slots 78*a*, 78*b*, respectively, with hopper 20 in a first orientation on spray gun 18. Projections 76*a*, 76*b* fit in slots 78*b*, 78*a*, respectively, with hopper 20 in a second orientation on spray gun 18. Furthermore, projections 76*a*, 76*b* are aligned with slots 78*a*, 78*b*. Projections 76*a*, 76*b* and slots 78*a*, 78*b* are configured such that neck 60 cannot be placed around throat 62, or cannot be placed securely for normal spraying use, except when projections 76*a*, 76*b* are received in slots 78*a*, 78*b*. Also, once projections 76*a*, 76*b* are within slots 78*a*, 78*b*, the interface between projections 76*a*, 76*b* and slots 78*a*, 78*b* prevent neck 60 for rotating relative to throat 62. Projections 76*a*, 76*b* and slots 78*a*, 78*b* thereby prevent rotation of hopper 20 relative to spray gun 18. The indexing of projections 76*a*, 76*b* with slots 78*a*, 78*b* allows hopper 20 to be mounted on spray gun 18 in only one of two orientations. The two orientations can be forward-facing (shown in FIG. 6) and backward-facing (shown in FIG. 7).

Figure 6:
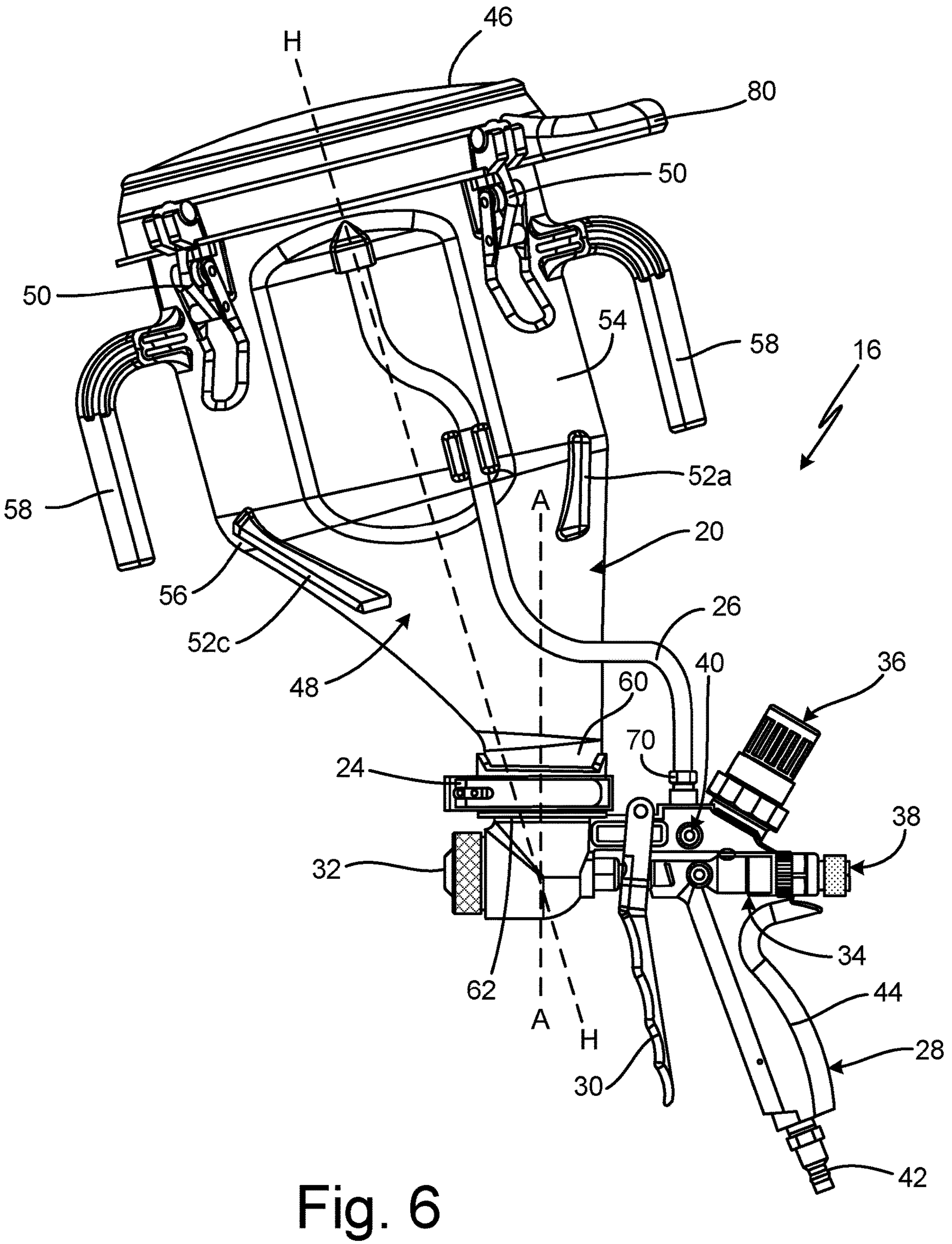
FIG. 6 is a side elevation view of a sprayer showing a hopper mounted on a spray gun in a first orientation.

FIG. 6 is a side elevation view of sprayer 16 showing hopper 20 mounted in a forward-facing tilt orientation. FIG. 7 is a side elevation view of sprayer 16 showing hopper 20 mounted in a backward-facing tilt orientation. FIGS. 6 and 7 will be discussed together. Sprayer 16 includes spray gun 18, hopper 20, clamp 24, and hose 26. Spray gun 18 includes gun body 28, trigger 30, nozzle 32, airflow control 34, pressure regulator 36, spray regulator 38, relief valve 40, connector 42, and connector 70. Gun body 28 includes handle 44 and throat 62. Hopper 20 includes lid 46, hopper base 48, and fasteners 50. Hopper base 48 includes projections 52*a*-52*d*, upper portion 54, transition section 56, handles 58, and neck 60. Lid 46 includes lid handle 80. Upper portion 54 is disposed on hopper axis H-H. Vertical axis A-A is also shown.

FIG. 6 shows hopper 20 tilting forwards while FIG. 7 shows hopper 20 tilting backwards, corresponding to the two different indexing positions of projections 76*a*, 76*b* with slots 78*a*, 78*b*. As shown, hopper 20 is tilted in one of two directions. The tilting of hopper 20 moves its center of mass (when sprayer 16 is upright, as shown in FIGS. 6-7) beyond neck 60, or at least not coaxial or otherwise aligned with a center of neck 60.

The tilting of hopper 20 can lower its height as compared to mounting hopper 20 vertically straight. Tilting hopper 20 has several ergonomic and functional benefits. The forward tilt setup shown in FIG. 6 is best suited for spraying fluid on ceilings and/or high walls, as hopper 20 is more centered on spray gun 18 for ideal support and balance for the user, and hopper 20 would be generally vertical to best facilitate gravity-directed flow with spray gun 18 tilted backwards to orient nozzle 32 upward relative to a horizontal plane to spray in an upward trajectory.

The backward tilt setup shown in FIG. 7 is best suited for spraying fluid on low walls and/or floors, as hopper 20 is more centered on spray gun 18 for ideal support and balance for the user, and hopper 20 would be generally vertical to best facilitate gravity-directed flow with spray gun 18 tilted forwards to orient nozzle 32 downward relative to a horizontal plane to spray in a downward trajectory.

Lid 46 is removable from hopper 20 and can be oriented on hopper 20 such that lid handle 80 projects rearward with hopper 20 disposed in either of the forward tilt orientation or the backward tilt orientation. As such, the user can grasp lid handle 80 to assist the user in holding sprayer 16 in either the forward tilt orientation or the backward tilt orientation.

The tilt of hopper 20 helps evacuate more fluid from hopper 20. As such, the indexing features (projections 76*a*, 76*b* and slots 78*a*, 78*b*) support hopper 20 in either forward or backward tilt orientations for spraying either high or low surfaces, and the orientation is readily reversible, depending on the preferences of the user and/or the demands of the particular project. To reverse the orientation, the user removes clamp 24 and removes hopper 20 from spray gun 18. The user then rotates hopper 20 to realign projections 76*a*, 76*b* and slots 78*a*, 78*b*. The user places hopper 20 back on spray gun 18 and tightens clamp 24. Hopper 20 is thus positioned on spray gun 18 in the opposite orientation from the initial orientation of hopper 20. The user can thus easily reorient hopper 20 between the forward tilt orientation and the backward tilt orientation.

Figure 8B:
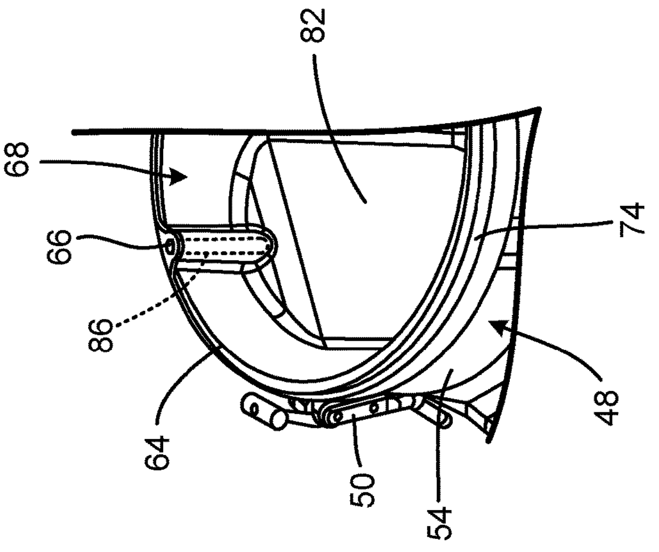
FIG. 8B is a detail isometric view of a portion of a hopper.
Figure 8A:
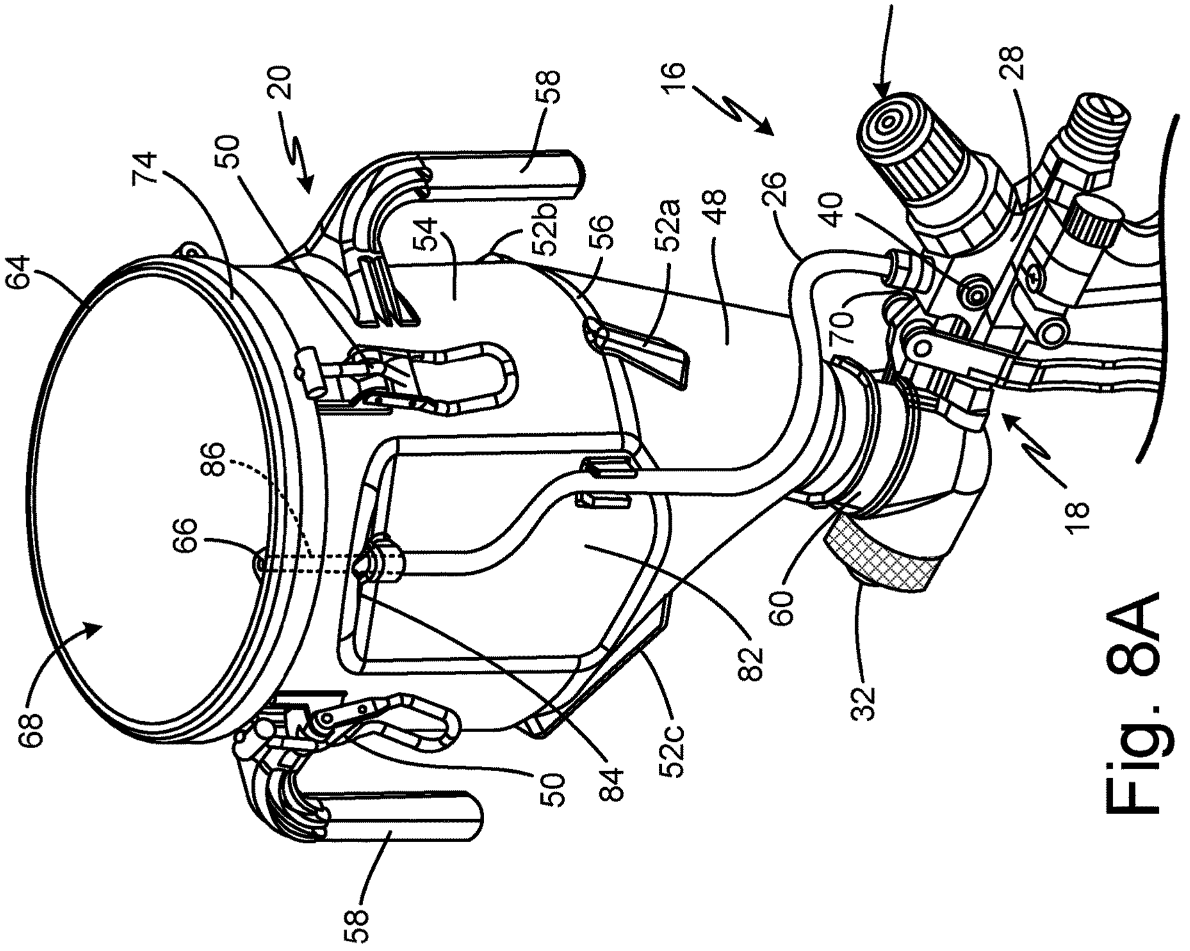
FIG. 8A is an isometric view of a portion of a sprayer.
Figure 8C:
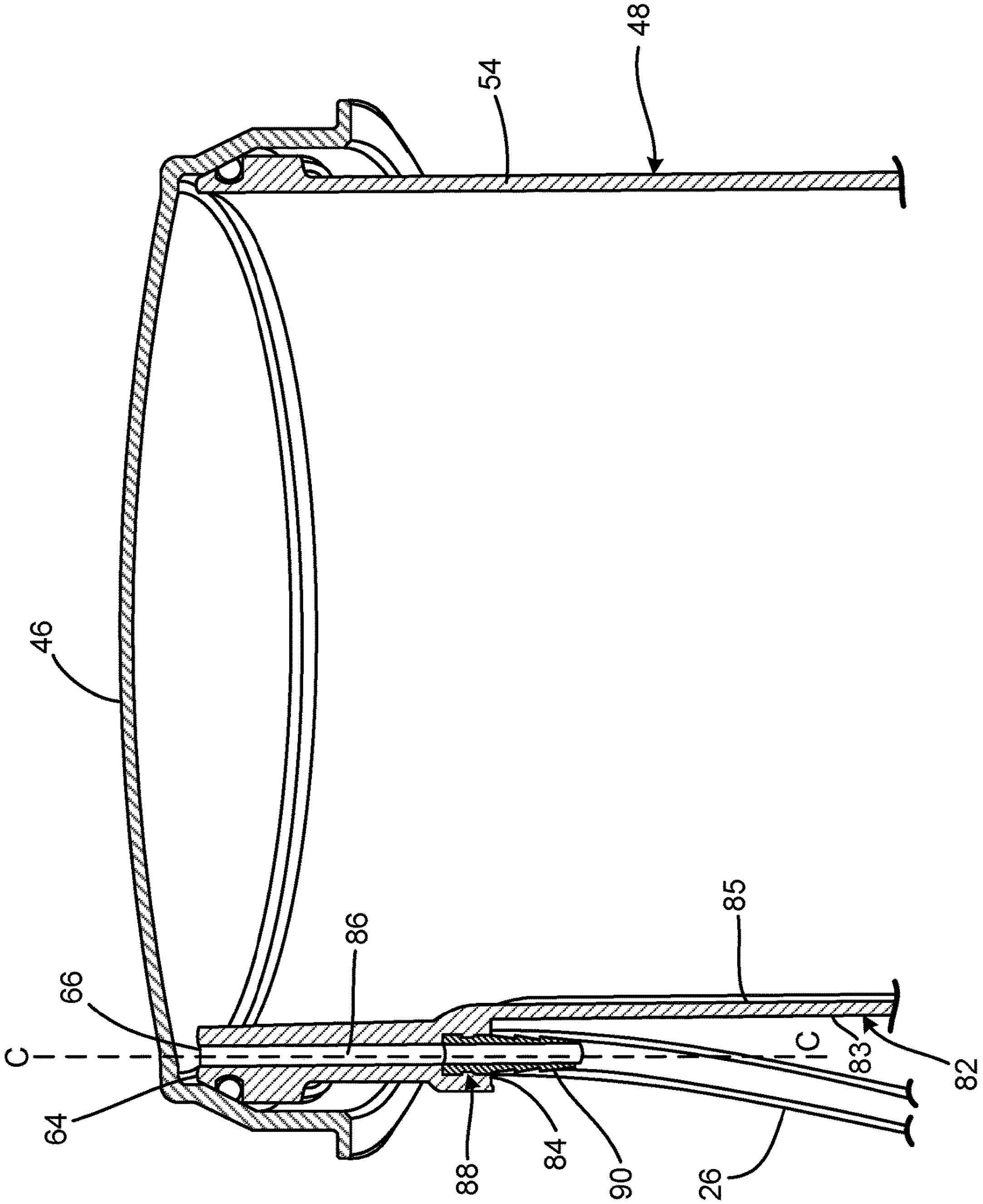
FIG. 8C is a cross-sectional view of a hopper.

FIG. 8A is an isometric view of sprayer 16. FIG. 8B is a detail isometric view of a portion of hopper 20. FIG. 8C is a cross-sectional view of upper portion 54 of hopper 20. FIGS. 8A-8C will be discussed together. Spray gun 18, hopper 20, and hose 26 of sprayer 16 are shown. Gun body 28, nozzle 32, pressure regulator 36, relief valve 40, and connector 70 of spray gun 18 are shown. Hopper 20 includes lid 46, hopper base 48, and fasteners 50. Hopper base 48 includes projections 52*a*-52*d*, upper portion 54, transition section 56, handles 58, neck 60, lip 64, port 66, flat wall 82, ridge 84, wall channel 86, lower opening 88, and hopper connector 90. Hopper 20 defines interior space 68.

Hopper 20 is mounted on spray gun 18. Hopper base 48 extends between a bottom opening through neck 60 and a top opening surrounded by lip 64. Flat wall 82 is disposed on a circumferential side of hopper base 48. Generally, the wall of hopper base 48 is round from neck 60 to lip 64. For example, except for handles 58 and projections 52*a*-52*d*, hopper base 48 is cylindrical above transition section 56, and conical between transition section 56 and neck 60. However, flat wall 82 interrupts this round profile, both above and below transition section 56, on one side of hopper base 48. Both exterior side 83 of flat wall 82 and interior side 85 of flat wall 82 are flat. The transition from round profile to flat profile on the exterior of hopper base 48 creates ridge 84 along a top of the depression created to form flat wall 82.

Ridge 84, along the depression, allows for lower opening 88 of wall channel 86 to be formed, as further explained below.

Wall channel 86 is formed in and extends through the wall of hopper base 48. Wall channel 86 has port 66 disposed at a top opening on lip 64. Wall channel 86 extends between lower opening 88 on ridge 84 and port 66. The flat profile of the flat wall 82 allows the lower opening 88 of wall channel 86 to be exposed and accessible from an exterior of hopper 20. Wall channel 86 extends along channel axis C-C, is straight between port 66 and lower opening 88, and does not include any curves or bends.

Wall channel 86 being straight, and port 66 being exposed on the top of lip 64 forming the top opening of interior space 68, has several advantages in fluid spraying. It is noted that texture fluid spraying can be messy, and the fluid itself can dry and clog passages. Port 66 is within the interior space 68 of hopper 20, which is pressurized by air provided through hose 26, as port 66 is needed to supply the pressurized air to interior space 68. However, the interior of hopper 20 is susceptible to being splashed and/or clogged with the fluid. Placing port 66 on the top of lip 64 means that port 66 is positioned as high on hopper base 48 as possible, and port 66 is not on an inward facing surface of the hopper base 48 that is exposed to the fluid within hopper 20. Port 66 is therefore less likely to be exposed to and clogged by the fluid. The straight profile of wall channel 86, and the accessibility of port 66 and lower opening 88, facilitates easy detection of debris in wall channel 86, as the user can look entirely through wall channel 86 between port 66 and lower opening 88. The straight profile of wall channel 86, and the accessibility of port 66 and lower opening 88, also facilitates easy cleaning of wall channel 86. For example, it is easier to spray water through a straight conduit for cleaning. Also, a straight ramrod can be easily passed through the straight wall channel 86 to clean wall channel 86. It is noted that in some embodiments, port 66 can be exposed on the top of lip 64 as shown, but wall channel 86 need not be straight and can instead be curved between lower opening 88 and port 66.

As shown in the cross sectional view of FIG. 8C, lip 64 of hopper base 48 is located above seal 74. Also, seal 74 is located about the exterior of hopper base 48. This arrangement allows port 66 to be disposed as high as possible on hopper base 48 to avoid fluid contaminating wall channel 86.

Figure 9A:
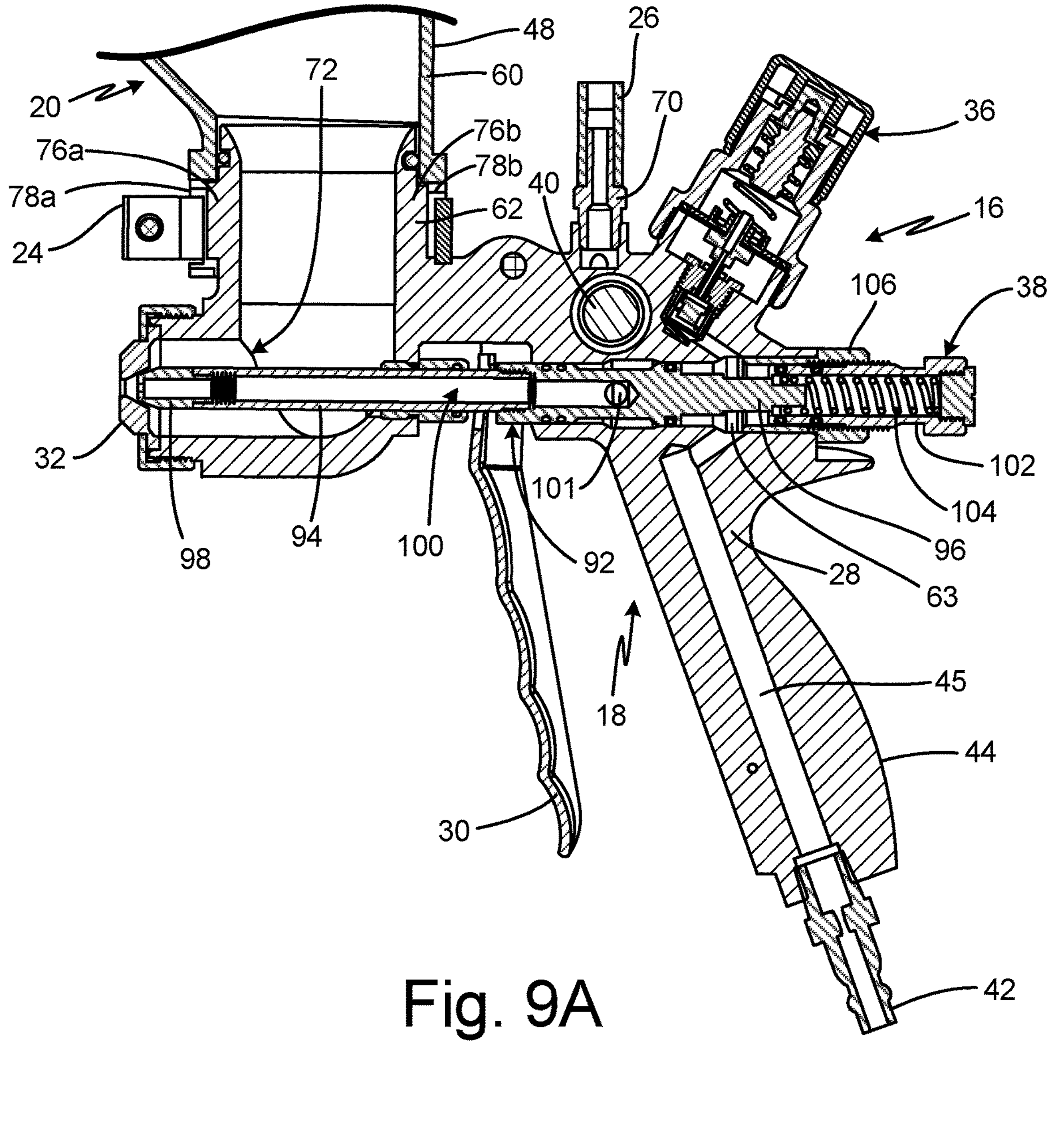
FIG. 9A is a cross-sectional view of a spray gun showing a trigger in a non-actuated state.
Figure 9B:
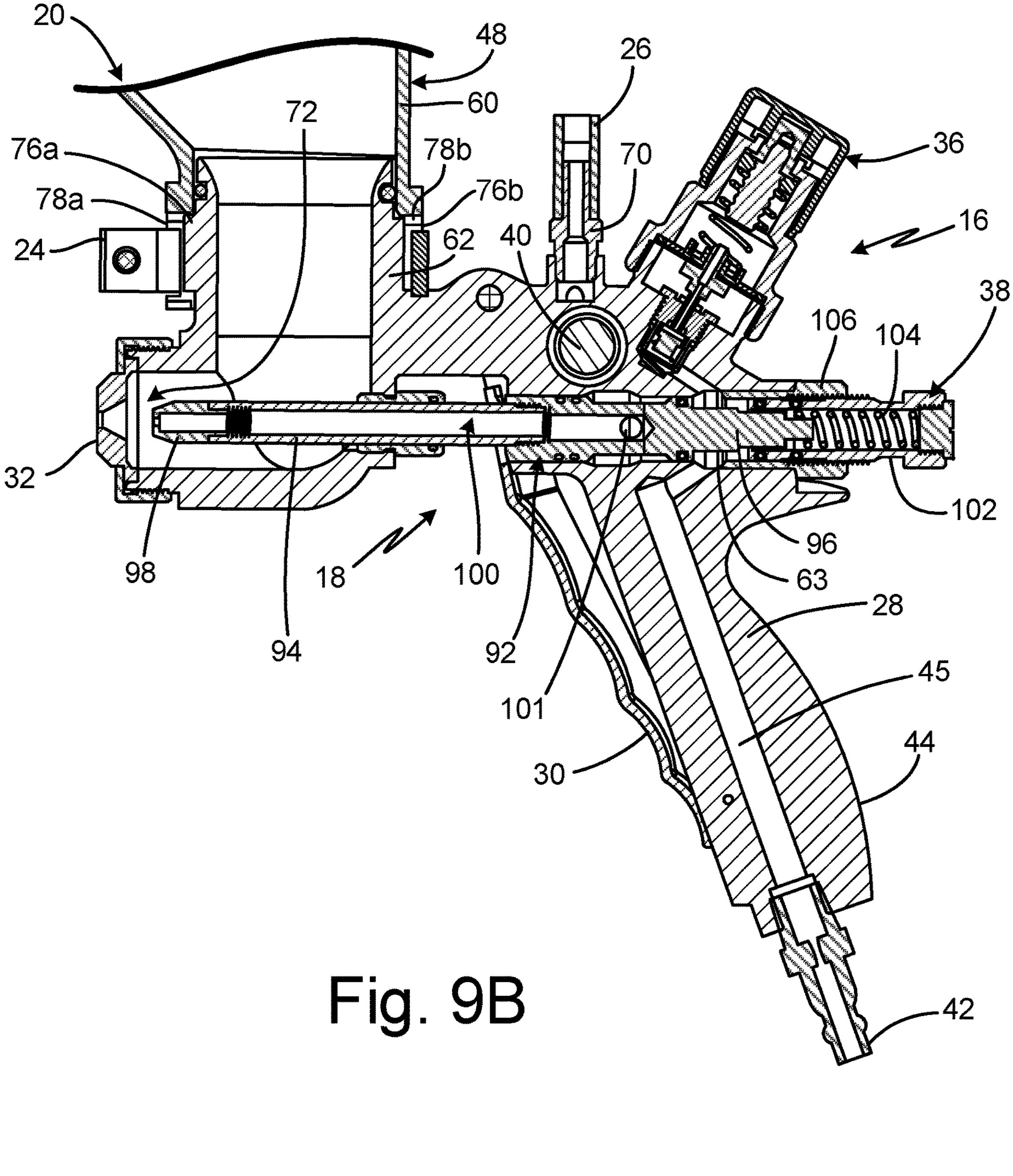
FIG. 9B is a cross-sectional view of a spray gun showing a trigger in an actuated state.

FIG. 9A is a cross sectional view of spray gun 18 with trigger 30 in a non-actuated state. FIG. 9B is a cross-sectional view of spray gun 18 with trigger 30 in an actuated state. FIGS. 9A and 9B will be discussed together. While specific parts of spray gun 18 will be discussed further herein, the basic operation of spray gun 18 will be discussed in connection with FIGS. 9A-9B. Spray gun 18 includes gun body 28, trigger 30, nozzle 32, pressure regulator 36, spray regulator 38, relief valve 40, connector 42, connector 70, and needle 92. Gun body 28 includes handle 44, throat 62, and flow chamber 63. Handle 44 includes air passage 45. Throat 62 includes projections 76*a*, 76*b*. Needle 92 includes needle front 94, needle back 96, tip 98, and needle channel 100. Needle back 96 includes bores 101. Spray regulator 38 includes spray regulator knob 102, regulator spring 104, and regulator plug 106. A portion of hopper 20 including hopper base 48 is shown. Neck 60 of hopper base 48 is shown. Slots 78*a*, 78*b* in neck 60 are shown.

Trigger 30 is attached to needle 92 and is configured to shift needle 92 between a first position, shown in FIG. 9A, and a second position, shown in FIG. 9B. In the illustrated embodiment, the needle 92 includes needle front 94 and needle back 96. Needle front 94 is removably connected to needle back 96, such as by a threaded connection. However, in various other embodiments, it is understood that needle 92 can be a unitary piece. For example, the needle front 94 and the needle back 96 can be formed from one piece. Tip 98 is attached to needle front 94 at a downstream end of needle front 94. Tip 98 can be connected to needle front 94 in any desired manner, such as a threaded connection or a press fit connection. Alternatively, tip 98 can be formed as a unitary part with needle front 94. Needle channel 100 extends through needle 92. At least a portion of the compressed air entering spray gun 18 through connector 42 flows through air passage 45 in handle 44 to common chamber 63, and downstream from common chamber 63 to needle channel 100 in needle 92, the air then flows through needle channel 100 and exits needle 92 through tip 98. The air exiting tip 98 picks up fluid flowing out of hopper 20 and carries the fluid through nozzle 32 as a spray. As such, the fluid from hopper 20 is entrained in the airstream exiting needle 92 through tip 98, and that airstream ejects the fluid from nozzle 32.

With trigger 30 in the non-actuated state shown in FIG. 9A, tip 98 engages the inside surface of nozzle 32 to seal and block the fluid from channel 72 from passing through nozzle 32. When trigger 30 is pulled backward, trigger 30 pulls needle 92 backward disengaging tip 98 from the inside surface of the nozzle 32. Needle 92 is actuated to the position shown in FIG. 9B, whereby a flowpath is opened between tip 98 and nozzle 32, thereby allowing the fluid in channel 72 to pass to and through nozzle 32 to be sprayed.

A flow of pressurized air from air supply 14 (FIGS. 1A and 1B), having passed through the connector 42 into spray gun 18, initially enters needle channel 100 through bores 101 in needle back 96. With trigger 30 in the non-actuated state shown in FIG. 9A, this flow of air passes freely from needle channel 100 and out of the nozzle 32 without entraining fluid from hopper 20. However, when needle 92 is moved backwards by trigger 30 shifting to the state shown in FIG. 9B, fluid from channel 72 passes in front of tip 98 and is then impacted and accelerated out of nozzle 32 by the flow of pressurized air flowing through needle channel 100. When trigger 30 is released, a spring force returns the needle 92 forward causing tip 98 to again seal against the inside surface of the nozzle 32 and prevent fluid flow through the channel 72 to nozzle 32. Spraying is thus prevented until trigger 30 is again actuated.

Spray regulator 38 is threaded to be turnable to adjust a forward-backward position of a backstop of the needle 92. Common chamber 63 is an air chamber that provides air to both first branch path BP1, extending to nozzle 32, and second branch path BP2, extending to hopper 20. Common chamber 63 is disposed within gun body 28 between a portion of needle back 96 and spray regulator 38. Regulator plug 106 extends into gun body 28 and is connected to gun body 28. Spray regulator knob 102 is rotatably disposed within regulator plug 106. In some examples, spray regulator knob 102 is threadedly connected to regulator plug 106. Spray regulator knob 102 can be rotated relative to regulator plug 106 to adjust the extent that spray regulator knob 102 extends into gun body 28. Regulator spring 104 is disposed within spray regulator knob 102. Regulator spring 104 interfaces with a back end of needle 92, and regulator spring 104 is configured to drive needle 92 to the position shown in FIG. 9A when trigger 30 is released. Spray regulator knob 102 provides a backstop to limit the backward displacement of needle 92 when trigger 30 is shifted from the non-actuated state to the actuated state. A portion of needle back 96 is configured to contact spray regulator knob 102 to limit the backwards displacement of needle 92. As such, the user can control the degree to which tip 98 can displace from nozzle 32, thereby controlling the size of the spray opening through nozzle 32, by rotating spray regulator knob 102 relative to regulator plug 106 and changing the position of the backstop of needle 92. Changing the size of the spray opening allows the user to control one or more aspects of the spray pattern, such as spread, consistency, and material concentration, among others.

Figure 10:
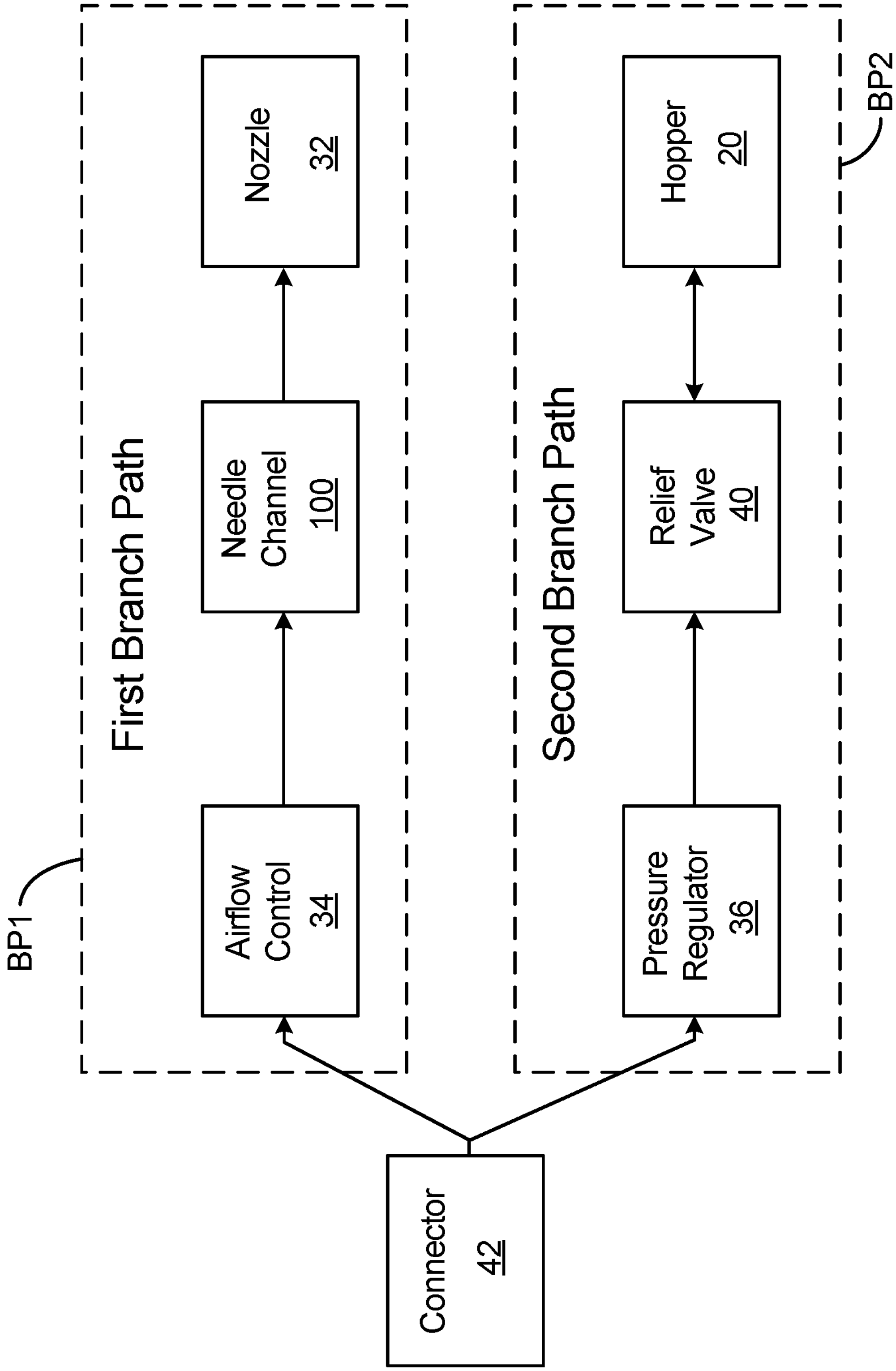
FIG. 10 is a schematic diagram of an airflow within a sprayer.

FIG. 10 is a schematic block diagram showing the flow and regulation of pressurized air within spray gun 18. The flow of pressurized air enters spray gun 18 via connector 42. However, it is understood that in various other embodiments a different pathway could introduce the flow of pressurized air into spray gun 18. After passing through connector 42, the flow of pressurized air can travel up the channel in handle 44. The flow of pressurized air is then bifurcated into two paths—first branch path BP1 and second branch path BP2. For example, each of first branch path BP1 and second branch path BP2 can extend from common chamber 63 (FIGS. 9A and 9B). A spraying portion of the flow of pressurized air flows through first branch path BP1, and a pressurizing portion of the flow of pressurized air flows through second branch path BP2.

First branch path BP1 includes, in order, airflow control 34, needle channel 100, and nozzle 32. First branch path BP1 supplies the flow of pressurized air that accelerates and expels the fluid from nozzle 32 when trigger 30 is in the actuated state (FIG. 9B). Airflow control 34 regulates the volume of air that can pass through first branch path BP1, but airflow control 34 does not regulate the pressure of the air flowing in first branch path BP1 (unless the airflow control 34 is completely shut off). The acceleration of the fluid through the nozzle 32 is dependent on the volume of air flowing through nozzle 32, with a greater airflow causing greater acceleration of the fluid through nozzle 32, and with a lesser airflow causing lesser acceleration of the fluid through nozzle 32. Changing the velocity of the fluid through nozzle 32 also changes the spray pattern applied. The user may prefer to change the spray pattern by adjusting airflow control 34 for greater or lesser fluid velocity through nozzle 32, depending on the type of fluid being sprayed and/or the circumstances of a particular project.

Second branch path BP2 includes, in order, pressure regulator 36, relief valve 40, and hopper 20. More specifically, the air flow along second branch path BP2 passes, as needed per a regulated pressure setting, though pressure regulator 36 then through relief valve 40. Assuming relief valve 40 is in a closed state and does not release the pressurized air to atmosphere, the airflow continues past relief valve 40, through hose 26 (best seen in FIGS. 8A and 8C), and is then into interior space 68 (best seen in FIG. 8C) of hopper 20 through port 66 (best seen in FIGS. 8B and 8C). The arrow indicating the flowpath between relief valve 40 and hopper 20 is bidirectional because, although the flow of air is generally from relief valve 40 to hopper 20, the pressurized air within hopper 20 can flow back to relief valve 40 when relief valve 40 is in an open state, as will be explained further herein.

The pressurized air is kept within interior space 68 of hopper 20 as long as fluid remains within hopper 20, lid 46 (best seen in FIGS. 2B and 8C) remains sealed on hopper base 48 (best seen in FIGS. 3 and 8C), and relief valve 40 is in the closed state. Within interior space 68, the pressurized air pushes downward on any fluid within interior space 68 to force the fluid down toward neck 60 (best seen in FIGS. 9A-9B) and through channel 72 (best seen in FIGS. 9A-9B) to be expelled through nozzle 32, when trigger 30 is in the actuated state such that tip 98 is disengaged from nozzle 32. The pressure within interior space 68 is regulated by pressure regulator 36. In this way, the user can adjust pressure regulator 36 to selectively increase or decrease the pressure within hopper 20. Increasing the pressure within hopper 20 increases the force on the fluid being fed into spray gun 18, thereby increasing the flow rate of the fluid into spray gun 18 and thus the output of the fluid as a spray through nozzle 32. Decreasing the pressure within hopper 20 decreases the force on the fluid being fed into spray gun 18, thereby decreasing the flow rate of the fluid into spray gun 18 and thus the output of the fluid as a spray through nozzle 32. It is noted that pressurizing hopper 20 to increase the flow rate of the fluid makes spraying of the contents of hopper 20 faster as compared to relying on gravity alone to feed the fluid into spray gun 18. This faster feed allows the user to complete a job faster because the same amount of ceiling, wall, and/or floor surface can be sprayed with the same amount of fluid in a shorter amount of time as compared to gravity-only feeding. Also, faster spraying can be preferable to the user to help avoid fatigue, because hopper 20, when filled with fluid, can be heavy and unwieldy when mounted on spray gun 18 and held upright by the user with one or two hands throughout the duration of spraying.

It is noted that airflow is regulated along first branch path BP1 while air pressure is regulated along second branch path BP2. Airflow control 34 and pressure regulator 36 are located along separate branches, downstream from a common bifurcation. Adjustments in the airflow in first branch path BP1 by airflow control 34 changes the airflow along first branch path BP1 but not the airflow in second branch path BP2. Adjustments in the air pressure in second branch path BP2 by pressure regulator 36 changes the pressure in second branch path BP2 downstream from the pressure regulator 36 but does not change the air pressure along first branch path BP1. If either of airflow control 34 or pressure regulator 36 were instead disposed upstream of the other one of airflow control 34 and pressure regulator 36, then it would be difficult for a user to fine tune both settings because a change in pressure would alter the flow regulation and vice versa. Placing airflow control 34 and pressure regulator 36 on different branches of the same air supply circuit allows the each of the air pressure and airflow to be independently controlled.

Figure 11A:
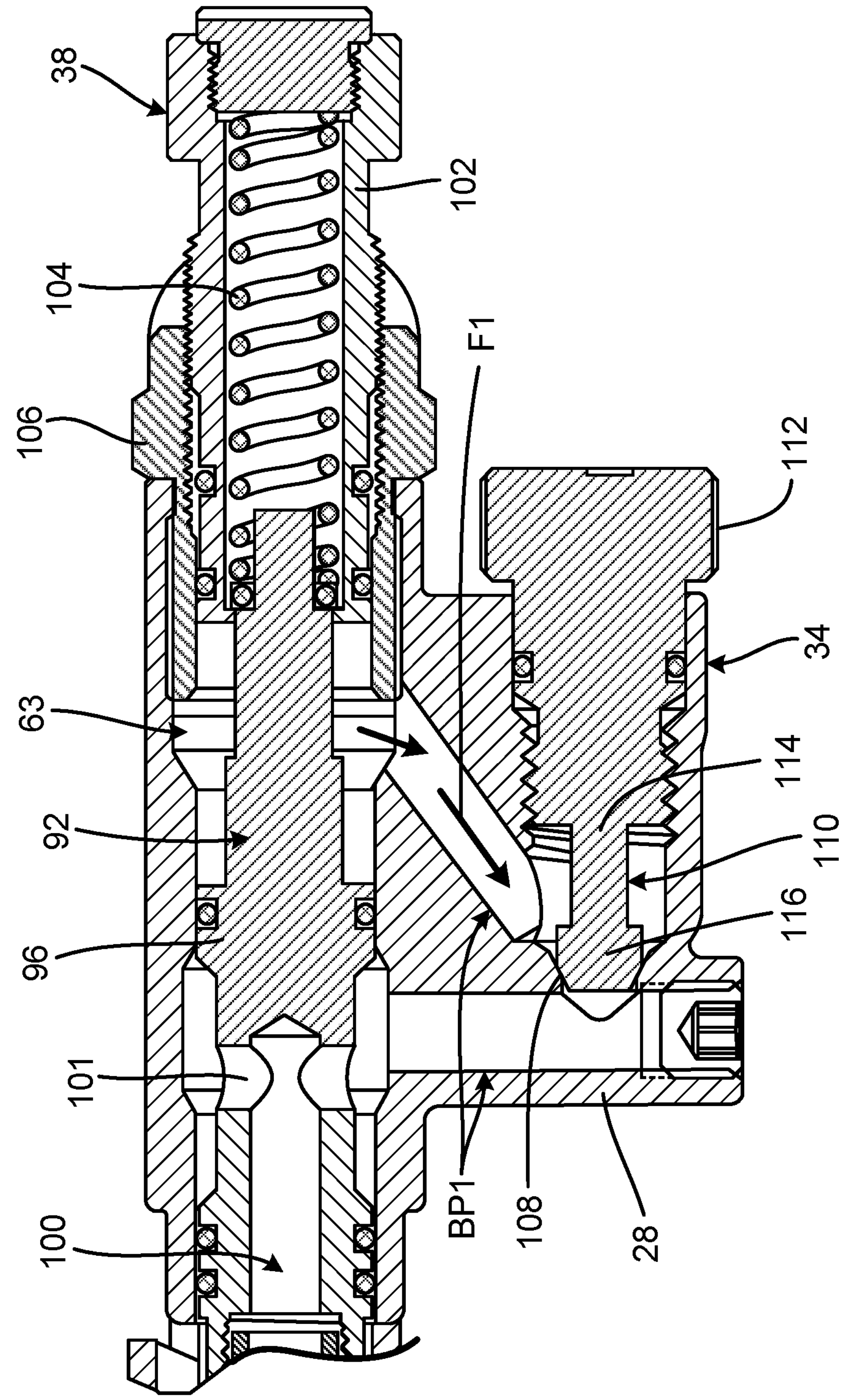
FIG. 11A is a cross-sectional view of a portion of a spray gun showing an air control valve in a closed state.
Figure 11B:
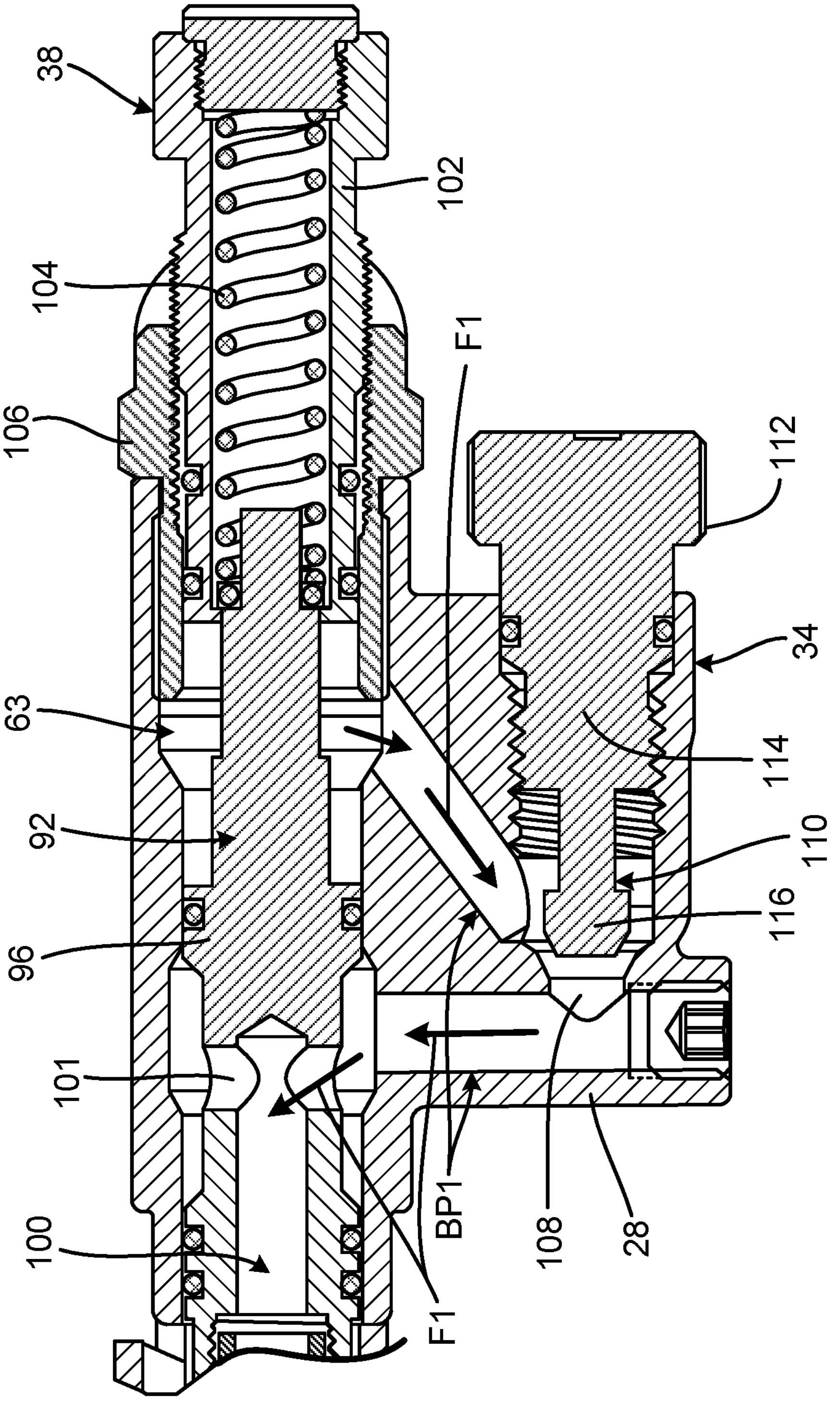
FIG. 11B is a cross-sectional view of a portion of a spray gun showing an air control valve in an open state.

FIG. 11A is a cross-sectional view of a portion of spray gun 18 taken along line 11-11 in FIG. 4 and showing airflow control 34 in a closed state. FIG. 11B is a cross-sectional view of a portion of spray gun 18 taken along line 11-11 in FIG. 4 and showing airflow control 34 in an open state. FIGS. 11A and 11B will be discussed together. Gun body 28, airflow control 34, spray regulator 38, and needle 92 of spray gun 18 are shown. A portion of first branch path BP1 through gun body 28 is shown. Common chamber 63 in gun body 28 is shown. Needle back 96 and needle channel 100 of needle 92 are shown. Needle back 52 includes bores 101. Spray regulator 38 includes spray regulator knob 102, regulator spring 104, and regulator plug 106. Airflow control 34 includes flow valve seat 108 and flow valve member 110. Flow valve member 110 includes flow knob 112, valve neck 114, and valve head 116.

In FIG. 11A airflow control 34 is in a closed state to prohibit airflow past airflow control 34 and down first branch path BP1. In FIG. 11B airflow control 34 is in an open state to permit airflow through airflow control 34 and down first branch path BP1. It is noted that the open state is variable and different degrees of opening of airflow control 34 can let the pressured air pass at different airflow rates.

Flow lines F1 shown the flow of air through airflow control 34 and within first branch path BP1.

Flow seat 46 is formed in first branch path BP1. Flow seat 46 is formed from gun body 28 in the embodiment shown, but in various other embodiments flow seat 46 may be formed from a separate component. Flow valve member 110 is mounted on gun body 28 and extends into first branch path BP1. Flow valve member 110 is attached to gun body 28 by interfacing threading on flow valve member 110 and gun body 28. Flow knob 112 is disposed outside of gun body 28 such that flow knob 112 is accessible to a user of spray gun 18. Valve neck 114 extends between flow knob 112 and valve head 116. Valve head 116 interfaces with flow valve seat 108 with airflow control 34 in the closed state to prevent airflow downstream through first branch path BP1. In the example shown, valve head 116 and flow valve seat 108 include contouring configured to interface and provide a seal with airflow control 34 in the closed state. It is understood, however, that flow valve member 110 and flow valve seat 108 can interface in any desired manner suitable to shut off airflow when in the closed state.

Turning flow valve member 110 relative to gun body 28 widens or narrows the separation between valve head 116 and flow valve seat 108. The wider the separation between valve head 116 of flow valve member 110 and flow valve seat 108, the more air can flow through airflow control 34 through first branch path BP1. The narrower the separation between valve head 116 of flow valve member 110 and flow valve seat 108, the less air can flow through airflow control 34 and downstream through first branch path BP1. Contact between valve head 116 of flow valve member 110 and flow valve seat 108, which occurs with airflow control 34 in the closed state shown in FIG. 11A, shuts off flow through airflow control 34 and thus through first branch path BP1.

Unless in the closed position, airflow control 34 is configured to not reduce downstream pressure through first branch path BP1. Therefore, the airflow passing airflow control 34 is generally at the same pressure that entered spray gun 18 through connector 42 (best seen in FIGS. 9A-9B) (e.g., about 45 PSI (310 kPa)). Therefore, the pressure of the air accelerating the fluid at nozzle 32 (best seen in FIGS. 9A-9B) is substantially the same as the input pressure at connector 42 and is not reduced therebetween while spray gun 18 is spraying at steady state. In contrast, and as discussed in further detail below, pressure regulator 36 is configured to reduce downstream pressure.

Figure 12A:
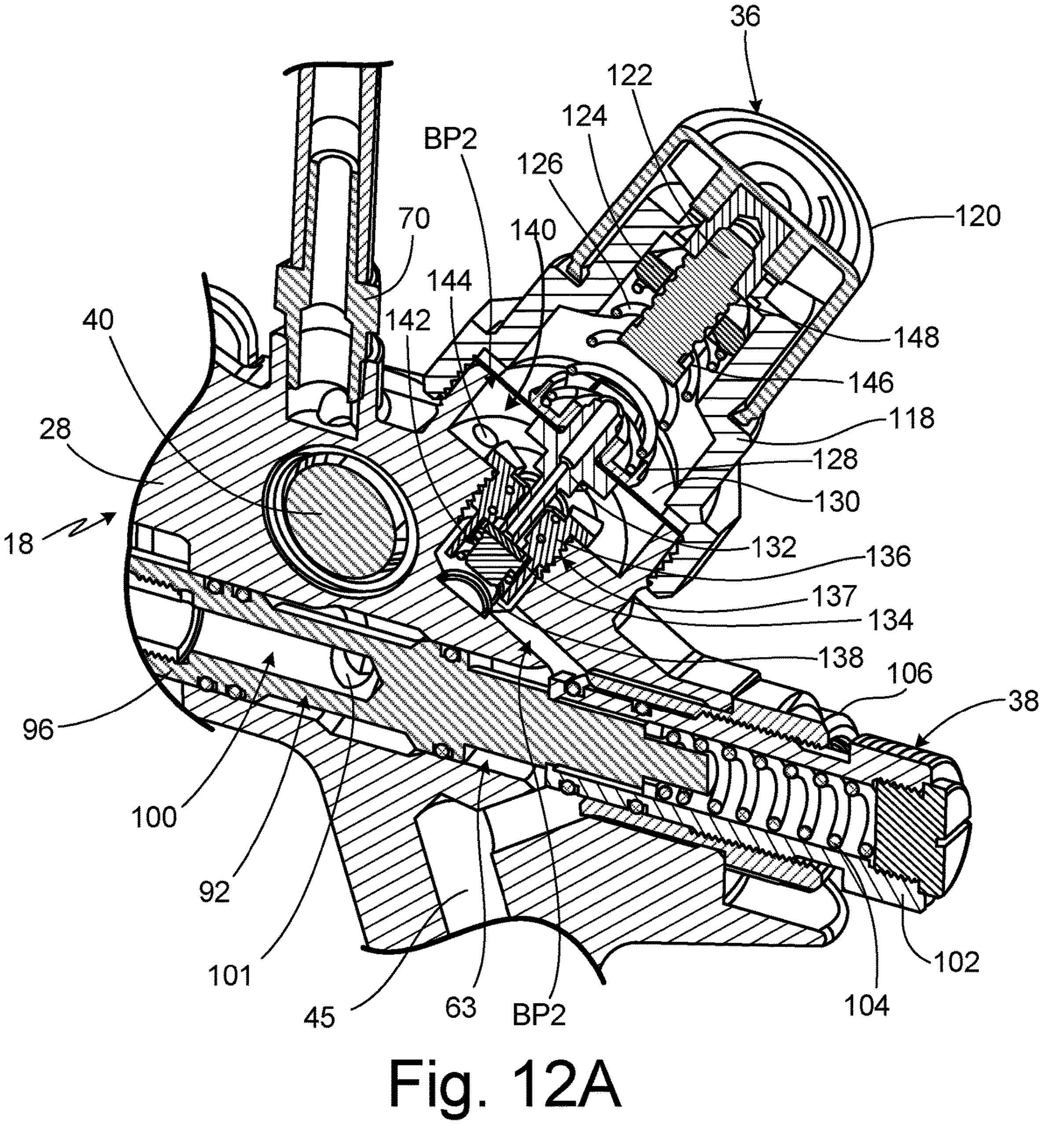
FIG. 12A is an isometric cross-sectional view of a portion of a spray gun and an air regulator.
Figure 12B:
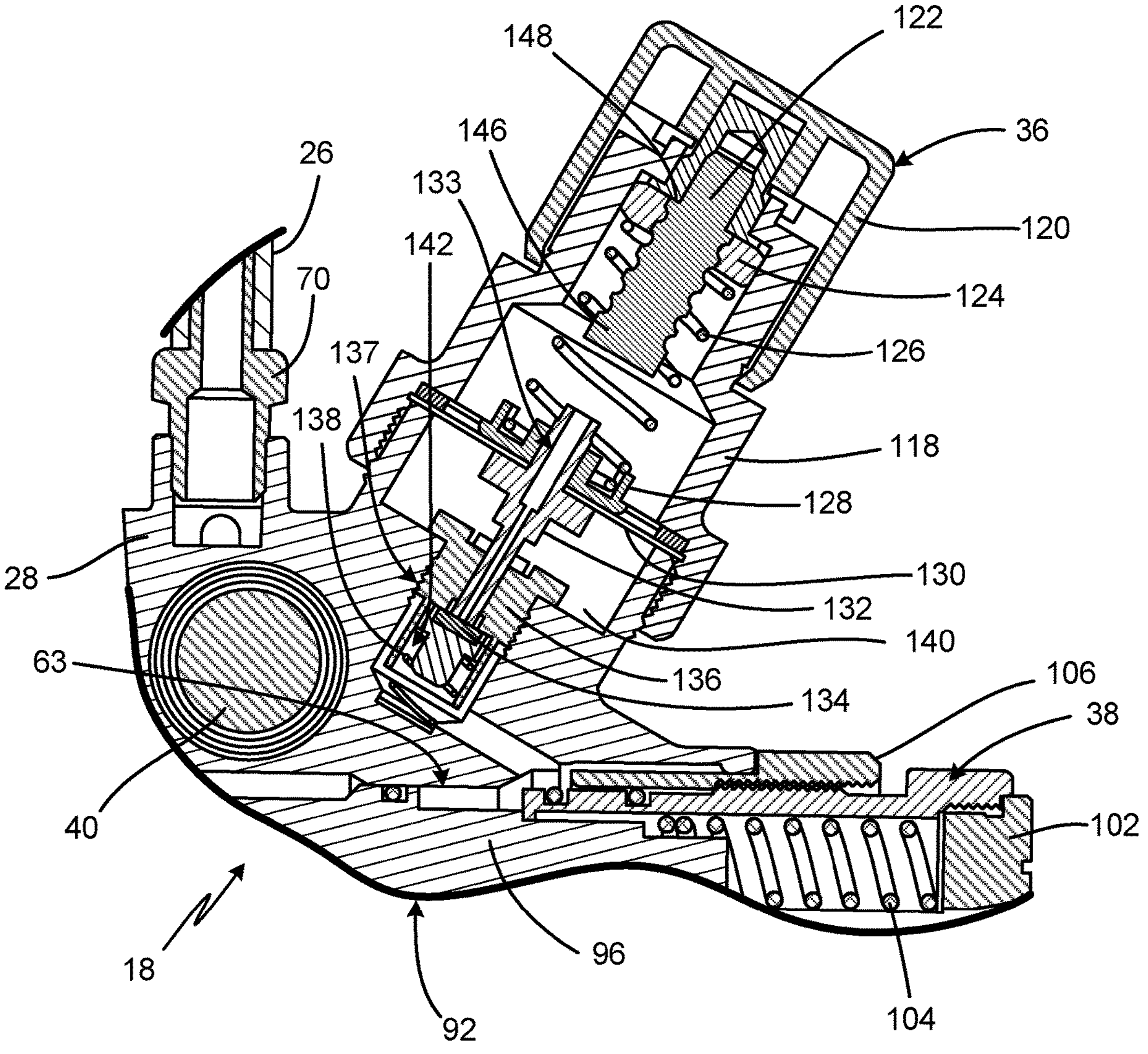
FIG. 12B is a cross-sectional view of a spray gun and air regulator showing the air regulator in a first state.
Figure 12C:
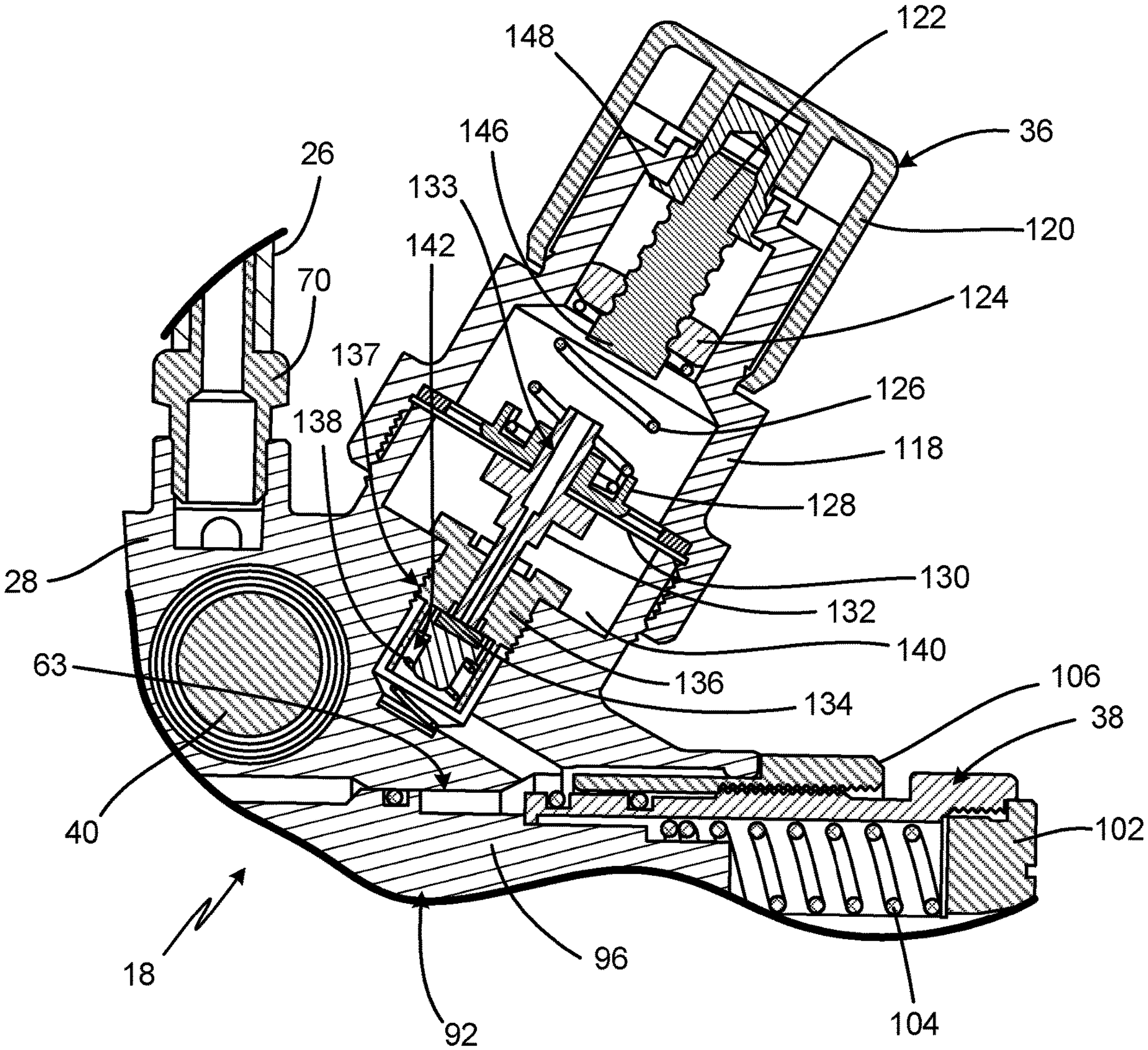
FIG. 12C is a cross-sectional view of a spray gun and air regulator showing the air regulator in a second state.

FIG. 12A is a cross-sectional view of a portion of spray gun 18 taken along line 12-12 in FIG. 2B. FIG. 12B is a cross-sectional view showing pressure regulator 36 in a first state. FIG. 12C is a cross-sectional view showing pressure regulator 36 in a second state. Specifically, FIG. 12B shows pressure regulator 36 set to zero (ambient) downstream pressure, while FIG. 12C shows pressure regulator 36 set to maximum downstream pressure. FIG. 12A-12B will be discussed together. Gun body 28, pressure regulator 36, spray regulator 38, relief valve 40, connector 70, and needle 92 of spray gun 18 are shown. A portion of second branch path BP2 through gun body 28 shown. Gun body 28 further includes air passage 45, common chamber 63, and port 144 (FIG. 12A). Needle back 96 of needle 92 is shown, and needle back 96 includes bore 101 (FIG. 12A). Spray regulator 38 includes spray regulator knob 102, regulator spring 104, and regulator plug 106. Pressure regulator 36 includes housing 118, regulator knob 120, threaded member 122, threaded ring 124, regulator spring 126, diaphragm holder 128, diaphragm 130, piston 132, seal member 134, seat retainer 136, lower spring 138, downstream chamber 140, and upstream chamber 142. Threaded member 122 includes thread stop 146 and thread stop 148.

Housing 118 is threaded to gun body 28 and contains and supports various components of pressure regulator 36. Regulator knob 120 is disposed over housing 118, and regulator knob 120 is rotatable relative to housing 118 and relative to gun body 28. Regulator knob 120 can be rotated to turn the pressure setting of pressure regulator 36 up and down. Threaded member 122 is connected to regulator knob 120 and extends into housing 118. Threaded member 122 can be rotationally fixed to knob 120 such that rotation of knob 120 causes rotation of threaded member 122. Threaded member 122 is elongated and includes threads on its outer surface.

Threaded member 122 is coupled to threaded ring 124. Threaded ring 124 is located around threaded member 122 with threaded member 122 extending through threaded ring 124. The inner surface of threaded ring 124 includes threads complimentary to the threads on exterior surface of threaded member 122. The orientation of threaded ring 124 is fixed with respect to housing 118, such as by a keyed interface between the exterior surface of threaded ring 124 and the inner surface of housing 118. With threaded member 122 fixed to the regulator knob 120, rotation of regulator knob 120 rotates threaded member 122. Due to the interfacing threading of threaded member 122 and threaded ring 124, and due to the fixed orientation of threaded ring 124 relative to housing 118, rotation of threaded member 122 via regulator knob 120 forces threaded ring 124 to move axially along threaded member 122. The direction of movement of threaded ring 124 along threaded member 122 is dependent on the direction of rotation of regulator knob 120.

Regulator spring 126 is disposed within housing 118 and extends between diaphragm holder 128 and threaded ring 124. Greater compression is placed on regulator spring 126 as threaded ring 124 is moved downwards (towards gun body 28) as driven by the turning of regulator knob 120 in a first direction (e.g., clockwise or counter clockwise). Lesser compression is placed on regulator spring 126 as threaded ring 124 is moved upwards (away gun body 28) as driven by turning of regulator knob 120 in a second direction (e.g., the other of clockwise or counter clockwise) opposite the first direction. The greater compression allows a greater air pressure to flow downstream through pressure regulator 36 within second branch path BP2. The lesser compression allows a lesser air pressure to flow downstream through pressure regulator 36 within second branch path BP2. As such, pressure regulator 36 includes a pressure control mechanism to control the pressure to hopper 20.

Regulator spring 126 pushes (indirectly, in this embodiment) on diaphragm 130 of the pressure regulator 36 via diaphragm holder 128. Regulator spring 126 pushes with greater or lesser force depending on the compression of regulator spring 126 caused by threaded ring 124. Diaphragm 130 is disposed within housing 118 and is captured between housing 118 and gun body 28. While regulator spring 126 pushes on a first side (e.g., an outer side) of diaphragm 130, the second side (e.g., inner side) of diaphragm 130 defines part of downstream chamber 140. Downstream chamber 140 is further defined by gun body 28. As further explained herein, downstream chamber 140 is part of second branch path BP2. Diaphragm 130 is kept in balance by the force of air pressure in downstream chamber 140 acting on the second side of diaphragm 130, and the mechanical force due to regulator spring 126 acting on the first side of diaphragm 130. Port 144 extends through gun body 28 and is in fluid communication with downstream chamber 140. The pressurized air can flow downstream from downstream chamber 140 via port 144, the pressurized air then flows downstream along second branch path BP2 to relief valve 40 and then to hopper 20 (best seen in FIGS. 8A-8C).

Seat retainer 136 is attached to gun body 28 between downstream chamber 140 and upstream chamber 142. In the example shown, seat retainer 136 is threaded into port 137 in gun body 28 and retained in place by the interfaced threading. It is understood, however, that seat retainer 136 can be attached to gun body 28 in any suitable manner. Upstream chamber 142 is disposed on the upstream side of seat retainer 136 and defined, in part, by gun body 28. Upstream chamber 142 forms a portion of second branch path BP2.

Piston 132 is disposed on the second side of diaphragm 130. A portion of piston 132 extends through diaphragm 130 and is connected to diaphragm holder 128, disposed on the first side of diaphragm 130. Specifically, diaphragm holder 128 on the first side of diaphragm 130 is attached (e.g., via threading) to piston 132 on the second side of the diaphragm 130, such that diaphragm 130 is captured between diaphragm holder 128 and piston 132.

Seal member 134 is disposed in upstream chamber 142 and is configured to engage and disengage seat retainer 136 to control the flow of air from downstream through pressure regulator 36 between upstream chamber 142 and downstream chamber 140. Seal member 134 is fixed with respect to the center of diaphragm 130. As such, each of seal member 134, piston 132, diaphragm 130, threaded ring 124, and threaded member 122 are disposed coaxially. Seal member 134 moves, in part, with the center of diaphragm 130. Specifically, piston 132 can push seal member 134 downwards, further into upstream chamber 142, when the center of diaphragm 130 is pushed downwards by regulator spring 126. Spring 138 is disposed in upstream chamber 142 and interfaces with seal member 134. Spring 138 is configured to push seal member 134 upwards, towards seat retainer 136, when piston 132 and the center of diaphragm 130 move upwards in response to increased air pressure in downstream chamber 140. Movement of seal member 134 downwards disengages seal member 134 from seat retainer 136. Seal member 134 disengages and reengages seat retainer 136 to open (during disengagement) and close (during engagement) a valve or seal, such as a flowpath between seal member 134 and seat retainer 136, to allow pressurized air within upstream chamber 142 to flow to downstream chamber 140. The end of piston 132 also engages and seals with seal member 134, wherein disengagement of the end of piston 132 from seal member 134 allows air on the second side of diaphragm 130 within downstream chamber 140 to flow through inner bore 133 within piston 132 to the first side of diaphragm 130 to equalize the air pressure on both sides of diaphragm 130.

When air pressure in hopper 20 is less than the air pressure in spray gun 18, and the regulator spring 126 is compressed, piston 132 pushes seal member 134 open and air flows through pressure regulator 36 to hopper 20. When air pressure in hopper 20 matches the spring force of regulator spring 126, diaphragm 130 and piston 132 move up and seal member 134 seats on seat retainer 136, closing off airflow through pressure regulator 36 to hopper 20, and the system is in equilibrium. When the regulator spring 126 is not compressed, and the air pressure in hopper 20 is >0, diaphragm 130 and piston 132 are driven upwards by the air pressure in downstream chamber 140. Seal member 134 seats to prevent air from upstream chamber 142 from flowing downstream past seal member 134. The hopper air can move backward out through inner bore 133 of piston 132 to the opposite side of diaphragm 130 from downstream chamber 140 to relieve pressure and equalize pressure on both sides of diaphragm 130. The air on the first side of diaphragm 130 is able to vent to the atmosphere through the components on first side of diaphragm 130, such as around threaded ring 124 and through knob 120.

Pressure regulator 36 is partially contained within and partially defined by gun body 28. Several components of pressure regulator 36 are within gun body 28, including upstream chamber 142, seal member 134, seat retainer 136, and diaphragm 130. It is understood, however, that more or less components of pressure regulator 36 can be disposed within, at least partially defined by, and/or interface with gun body 28.

During operation, the user sets the output pressure of pressure regulator 36 by turning knob 10 to a rotational position corresponding with a desired pressure for hopper 20. Turning knob 10 adjusts the position of threaded ring 124 along threaded member 122, which in turn exerts a greater or lesser force on the first side of diaphragm 130. If the force on the first side of diaphragm 130 is greater than the force exerted on the second side of diaphragm 130 by the pressurized air in downstream chamber 140 (meaning that regulator knob 120 is turned to a pressure setting greater than the current downstream pressure in downstream chamber 140), then the middle of diaphragm 130 is pushed downward by regulator spring 126, which also moves seal member 134 off of seat retainer 136. Disengagement of seal member 134 from seat retainer 136 allows higher pressure air within upstream chamber 142 to flow past seal member 134 and into downstream chamber 140. Once the air pressure within downstream chamber 140 is high enough to exert a force on the second side of diaphragm 130 that is greater than the force exerted on the first side of diaphragm 130 by regulator spring 126, the force exerted by regulator spring 126 will be overcome and the center of diaphragm 130 will move upwards. Moving the center of diaphragm 130 upwards pulls piston 132 upwards away from seal member 134. Spring 138 pushes seal member 134 upwards to reengage seat retainer 136 and block the flow of pressurized air from upstream chamber 142 to downstream chamber 140. While spring 138 is described as moving seal member 134 into reengagement with seat retainer 136, it is understood that in some examples seal member 134 can be attached to piston 132 to move with piston 132, such that piston 132 pulls seal member 134 back into engagement with seat retainer 136 when piston 132 is moved upwards by diaphragm 130.

If the pressure within downstream chamber 140 drops, such as due to fluid being drawn from hopper 20 into spray gun 18 for spraying. Drawing fluid from hopper 20 increases the air space within hopper 20 and lowers the pressure along second branch path BP2. The lowered air pressure decreases the force on the second side of diaphragm 130 by the air within downstream chamber 140. In some examples, the air pressure drops in downstream chamber 54 due to relief valve 40 being opened to exhaust pressurized air within second branch path BP2. The force exerted on the second side of diaphragm 130 by the air within downstream chamber 140 will be overcome by the force exerted on the first side of diaphragm 130 by regulator spring 126, such that the regulator spring 126 pushes the middle of diaphragm 130 downward, causing piston 132 to push seal member 134 and cause seal member 134 to disengage seat retainer 136. This opens a flowpath between upstream chamber 142 and downstream chamber 54 to allow higher pressure air in upstream chamber 142 to flow to downstream chamber 140, repeating the above cycle. In this way, pressure regulator 36 meters pressurized air flowing downstream through second branch path BP2 to maintain a set pressure within hopper 20.

As previously mentioned, threaded ring 124 moves axially along threaded member 122 when regulator knob 120 is rotated. Threaded member 122 includes first thread stop 146 disposed at a first end of threaded member 122 and a second thread stop 148 disposed at a second end of threaded member 122. First thread stop 146 and second thread stop 148 can be integrally formed on threaded member 122 or can be formed from another component. The threading along threaded member 122 terminates at each of thread stops 146, 148. Thread stops 146, 148 accordingly define the ends of the extent of travel of threaded ring 124 along threaded member 122. Once threaded ring 124 is at one of thread stops 146, 148, thread ring 53 is blocked from further movement toward that end of threaded member 122 on which that thread stop 146, 63 is disposed, but threaded ring 124 can reverse direction and travel along threaded member 122 towards the other thread stop 146, 63. Threaded member 122 is rotationally fixed to the regulator knob 120, so stopping further rotation of threaded ring 124 by engagement with one of thread stops 146, 148 also stops further rotation of regulator knob 120 in that direction, although the user can reverse the direction of rotation by revering the direction of rotation of the regulator knob 120. These rotational stop points represent the upper and lower pressure limits that pressure regulator 36 will permit. In some embodiments, the lower pressure limit, corresponding to rear thread stop 148, can correspond to pressure regulator 36 not passing any air downstream, or only passing air downstream at atmospheric pressure. In some embodiments, the higher pressure limit, corresponding to front thread stop 146, can correspond to pressure regulator 36 passing maximum pressure, such as about 5 PSI (34.5 kPa). Pressure regulator 36 maintains the pressure in second branch path BP1 at a lesser pressure than the pressure of the air introduced to spray gun 18 at connector 42. In this example, pressure regulator 36 can adjust the downstream pressure along second branch path BP2, and thus the pressure within hopper 20, between zero (or atmospheric) and 5 PSI (34.5 kPa), although other ranges are possible.

The pitch of the threaded interface between the inner surface of threaded ring 124 and the outer surface of threaded member 122, as well as the axial distance between thread stops 146, 148, are set such that the travel of threaded ring 124 from engagement with one of thread stops 146, 148 to the other of thread stops 146, 148 corresponds with a limited angular displacement of regulator knob 120. The full range of the limited angular displacement can correspond with the full range of the pressure output settings of pressure regulator 36. In some embodiments, the limited angular displacement of regulator knob 120 can be 360-degrees, such that regulator knob 120 can only make one complete revolution between the zero pressure setting of pressure regulator 36 and the maximum pressure setting of pressure regulator 36. In some embodiments, the limited angular displacement of regulator knob 120 can be approximately 360-degrees, or approximately one full rotation of regulator knob 120. In other embodiments, the limited angular displacement of regulator knob 120 can be less than or greater than 360-degrees. For example, the limited angular displacement of regulator knob 120 can be about 180-degrees, can be between 320-degrees-390-degrees, or can be about 720-degrees or more. In some embodiments, the limited angular displacement of regulator knob 120 can be less than two full rotations of regulator knob 120. In the case of the limited angular displacement of regulator knob 120 being less than or about one full rotation, directional marks (e.g., indicating a clocking position) can be printed on regulator knob 120 and/or other components of pressure regulator 36 and gun body 28 to provide the user with an indication of the current pressure setting, whereas the user could otherwise lose track of the number of angular revolutions of the directional mark if regulator knob 120 is rotatable more than one full rotation.

Limiting the full range of pressure settings of the pressure regulator 36 to about one full rotation of regulator knob 120 is intuitive for users as compared to multiple rotation configurations. Limiting the full range of pressure settings of pressure regulator 36 to about one full rotation of regulator knob 120 can obviate the need for a pressure dial indicating the pressure in second branch path BP2 downstream of pressure regulator 36. As such, sprayer 16 (best seen in FIGS. 2A-2B) may not include a pressure dial, or at least not include a pressure dial indicating the pressure measured in second branch path BP2.

Pressure regulator 36 also permits passive airflow to hopper 20 to avoid a vacuum condition developing in hopper 20. In some situations, the user may want to use sprayer 16 to spray fluid without hopper 20 being pressurized, such that the fluid is fed from hopper 20 into spray gun 18 by gravity alone. If lid 46 is kept secured on hopper base 48, such as to avoid spillage, then the outflow of fluid from within hopper 20 into spray gun 18 would create a vacuum condition in the hopper 20, which would inhibit further outflow of the fluid from within hopper 20 into spray gun 18. Lid 46 can also remain attached during spraying to prevent the fluid from drying out. To address the potential vacuum condition, pressure regulator 36 is configured to allow air to be pulled downstream through pressure regular 10 in response to a vacuum developing in second branch path BP2 downstream of pressure regulator 36. Pressure regulator 36 alleviates any vacuum condition to ensure consistent gravity feed of the fluid from hopper 20 into spray gun 18.

Pressure regulator 36 allows pull through of air even when pressure regulator 36 is set at its lowest (e.g., zero or ambient) pressure setting, and/or when second branch path BP2 is disconnected from the upstream air supply and is not supplied with pressured air. Specifically, if a vacuum starts to form in hopper 20, the same negative pressure is experienced within downstream chamber 140 of pressure regulator 36. The negative pressure within downstream chamber 140 pulls on the second side of diaphragm 130 (and may add with the force of regulator spring 126 acting on the first side of diaphragm 130) to move the center of diaphragm 130 downward towards seat retainer 136. Such movement of the center of diaphragm 130 moves piston 132 and thus seal member 134 off of seat retainer 136. Disengagement of seal member 134 from seat retainer 136 allows air within upstream chamber 142 (which may be at ambient pressure if no pressurized air is supplied to second branch path BP2) to flow past seal member 134, into downstream chamber 140, through port 144, and eventually into hopper 20 to alleviate the vacuum condition. Once the vacuum condition is alleviated in the hopper 20 and downstream chamber 140, the pressure within downstream chamber 140 overcomes the force of regulator spring 126 and causes the flowpath between upstream chamber 142 and downstream chamber 54 to close by moving the center of diaphragm 130 upward. Seal member 134 reengages seat retainer 136, either due to a connection with piston 132 and/or due to the force of spring 138, to close the flowpath between upstream chamber

142 and downstream chamber 54. This cycle can be repeated each time a vacuum develops within hopper 20. Pressure regulator 36 is configured to automatically proceed through and complete the vacuum relief cycle.

Figure 13A:
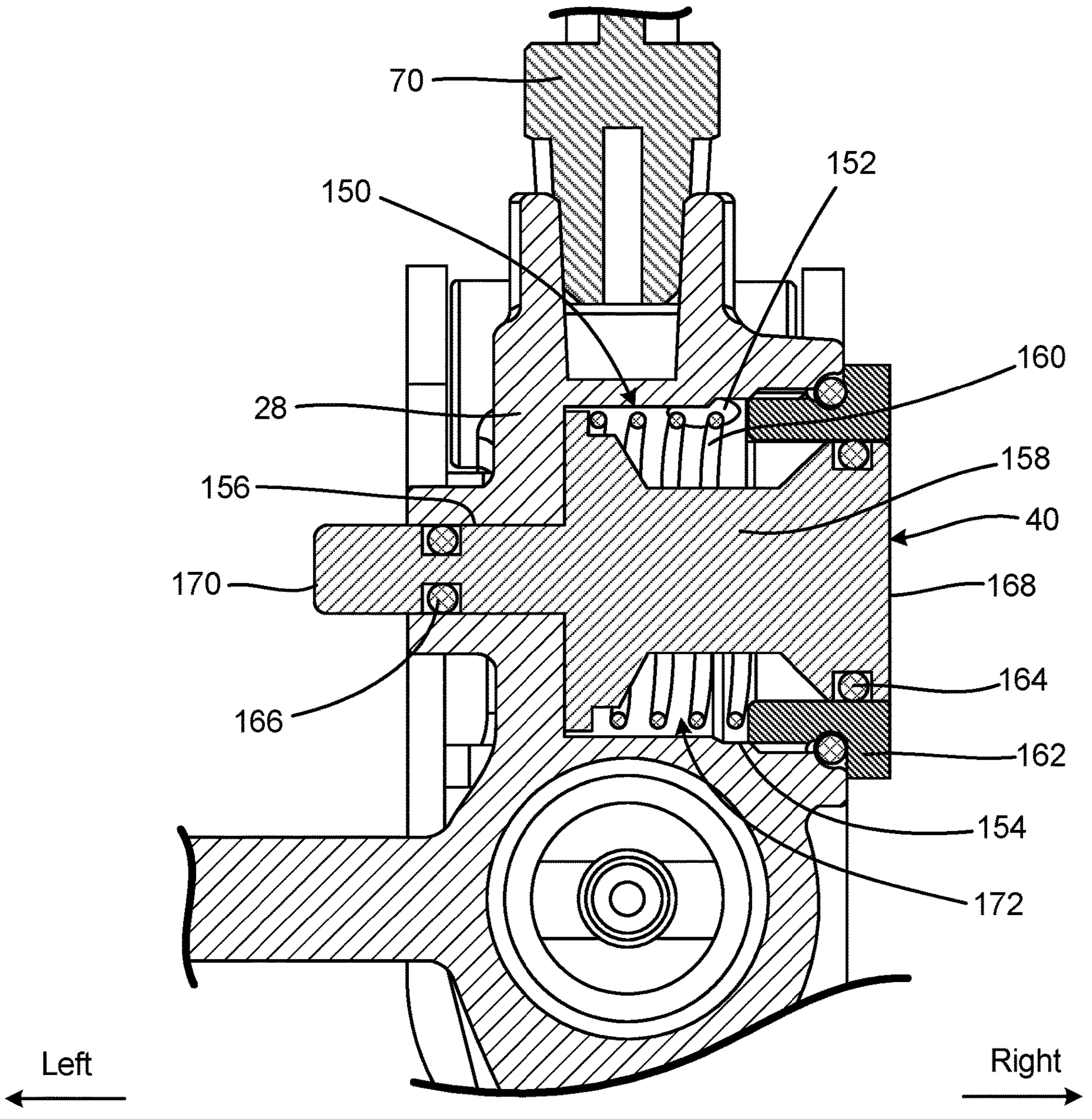
FIG. 13A is a cross-sectional view of a portion of a spray gun showing a relief valve in a closed position.
Figure 13B:
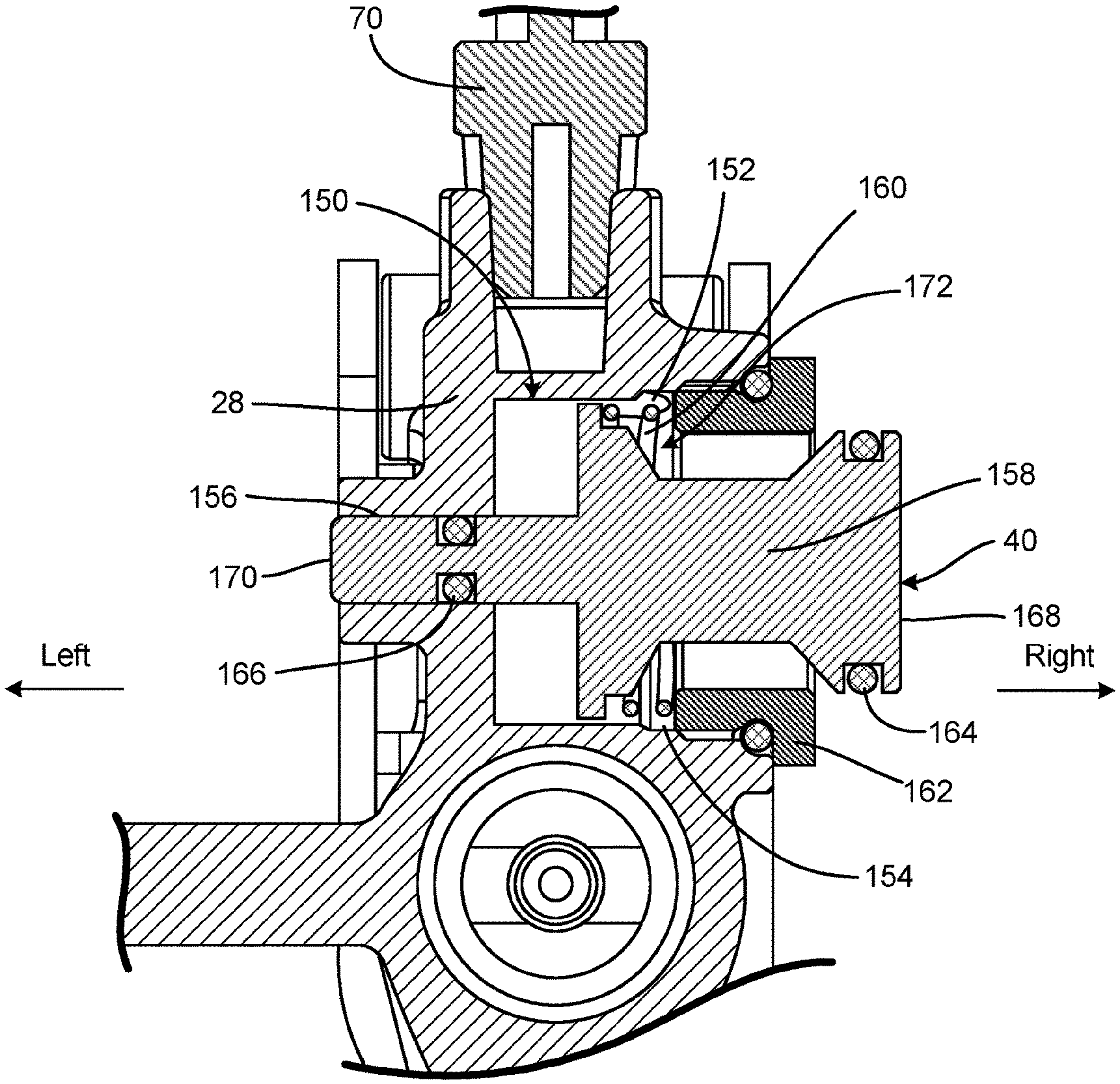
FIG. 13B is a cross-sectional view of a portion of a spray gun showing a relief valve in an open position.

FIG. 13A is a cross-sectional view of a portion of spray gun 18 showing relief valve 40 in a closed state. FIG. 13B is a cross-sectional view of a portion of spray gun 18 showing relief valve 40 in an open state. FIGS. 13A and 13B will be discussed together. In the closed state, relief valve 40 allows pressurization of second branch path BP2, including hopper 20 (best seen in FIGS. 8A-8C). In the open state, relief valve 40 allows depressurization of second branch path BP2, including hopper 20. Gun body 28, relief valve 40, and connector 70 of spray gun 18 are shown. Gun body 28 includes aperture 150 and port 152. Aperture 150 includes first portion 154 and second portion 156. Relief valve 40 includes spool 158, spring 160, retainer 162, first seal 164, and second seal 166. Spool 158 includes first end 168 and second end 170.

One function of relief valve 40 is to allow the user to quickly release pressure from second branch path BP2, including from within hopper 20. Easily relieving pressure within hopper 20 can be useful for several reasons, including so lid 46 (best seen in FIGS. 2B and 8C) can be safely removed from hopper base 48 (best seen in FIGS. 8A and 8C) without lid 46 and/or fluid being propelled by pressurized compressed air within hopper 20 upon lid 46 removal. Relief valve 40 is accessible to a finger (e.g., thumb) of the hand of the user that is holding spray gun 18. Relief valve 40 is integrated into spray gun 18 to allow for fast and intuitive depressurization of hopper 20.

Aperture 150 extends fully through gun body 28 between a right side and a left side of gun body 28. First portion 154 extends from the right side of gun body 28 to second portion 156. Second portion 156 extends from the left side of gun body 28 to first portion 154. First portion 154 has a larger diameter than second portion 156. While first portion 154 is described as extending from the right side of gun body 28 and second portion 156 is described as extending from the left side of gun body 28, it is understood that first portion 154 could extend from the left side and second portion 156 could extend from the right side.

Relief valve 40 resides within gun body 28 and extends from right side to left side of gun body 28. Spool 158 is disposed within and moves within aperture 150 through gun body 28. Retainer 162 extends into second portion 156 and retains spool 158 within aperture 150. Spring 160 is disposed within aperture 150 and extends between retainer 162 and spool 158.

First side 66 of spool 158 is exposed on the right side of spray gun 18, and second side 67 of spool 158 extends out of second portion 156 and is exposed on the left side of spray gun 18. Second side 67 projects out of gun body 28 from second portion 156 to form a pushable-button. Aperture 150 and spool 158 define chamber 172. Second branch path BP2 extends through chamber 172. Second branch path BP2 remains sealed when spool 158 is in the closed state shown in FIG. 13A, and second branch path BP2 is open to atmosphere to release pressure within second branch path BP2, including in hopper 20, when spool 158 is moved to the open state shown in FIG. 13B. For example, the user can engage and push second side 67 of spool 158 with the user's thumb to move spool 158 to the open state and connect chamber 172 to atmosphere. Spring 160 is disposed within chamber 172 and is configured to bias spool 158 toward the closed state. The force of spring 160 is configured such that the spring force can be overcome by the finger of the user.

Seals 164, 166, which can be O-rings, seal between spool 158 and gun body 28 to prevent leakage of pressurized air out of chamber 172, particularly when spool 158 is in the closed position and the second branch path is pressurized. Seal 164 extends around first end 168 of spool 158 and seals between spool 158 and retainer 162. Seal 166 extends around second end 170 of spool 158 and seals between spool 158 and gun body 28.

While relief valve 40 can have a manual function, such as described above, relief valve 40 can additionally or alternatively be configured to automatically open to relieve overpressurization of second branch path BP2 downstream of pressure regulator 36. Hopper 20 is not intended to be a high pressure vessel, and high pressurization could drive the fluid from hopper 20 into spray gun 18 at a higher rate than desired and/or could cause fluid splatter if lid 46 were removed. Relief valve 40 is configured to automatically open and release pressurized air within second branch path BP2, including from hopper 15, to the atmosphere outside of spray gun 18 when the air pressure within second branch path BP2, downstream of pressure regulator 36, exceeds a threshold amount. The threshold amount can be set at any desired level, for example, 10 PSI (69 kPa). The threshold pressure for automatic opening of the relief valve 40 can be set based on the spring force of spring 160. As such, various springs can be inserted into relief valve 40 to adjust the threshold pressure level. Generally, the threshold pressure for opening relief valve 40 is greater than the maximum output pressure of pressure regulator 36. As such, the automatic function of relief valve 40 is in place in case pressure regulator 36 fails.

The automatic relief feature of relief valve 40 operates by the pressure within chamber 172 overcoming the spring force of spring 160, such that the pressure within chamber 172 pushes spool 158 from the closed state to the open state. Seal 164 and seal 166 have differing diameters, with seal 164 having a larger diameter than seal 166. One end of spring 160 engages retainer 162, while the other end of spring 160 engages spool 158 to urge spool 158 to the closed state. Because seal 164 has a larger sealing diameter than seal 166, the air pressure within chamber 172 exerts a higher force on seal 164 than seal 166, exerting an overall rightward force on spool 158. When the air pressure within chamber 172 is sufficiently high, the force on seal 164 due to pressurized air within chamber 172 overcomes the combined force of spring 160 and the air pressure on seal 166 to move spool 158 rightward to the open state shown in FIG. 13B. With spool 158 in the open state, chamber 172 is open to the atmosphere and releases the pressurized air within second branch path BP2 downstream of pressure regulator 36 to the atmosphere. Once the pressure is relieved, spring 160 automatically returns spool 158 to the closed state. Alternatively, spool 158 can toggle open via an indent interface between spool 158 and gun body 28 and/or between spool 158 and retainer 162. As such, the indent can hold spool 158 in the open state. The user must then push on first side 170 of spool 158 to cause relief valve 40 to shift back to the closed state. Holding relief valve 40 open during spraying can also prevent a vacuum condition from forming in hopper 20. It is noted that relief valve 40 can include, as described above, both manual relief and automatic relief functions.

When relief valve 40 is closed, the pressurized air within chamber 172 can exit chamber 172 via port 152 and travel through a flowpath within gun body 28 to connector 70, then to hose 26 (best seen in FIGS. 8A and 8C), wall channel 86 (best seen in FIG. 8C), and into interior space 68 (best seen in FIG. 8C) of hopper 20. The direction of air flow is reversed when relief valve 40 is in the open state, such that the pressurized air flows to relief valve 40 from hopper 20.

Figure 14A:
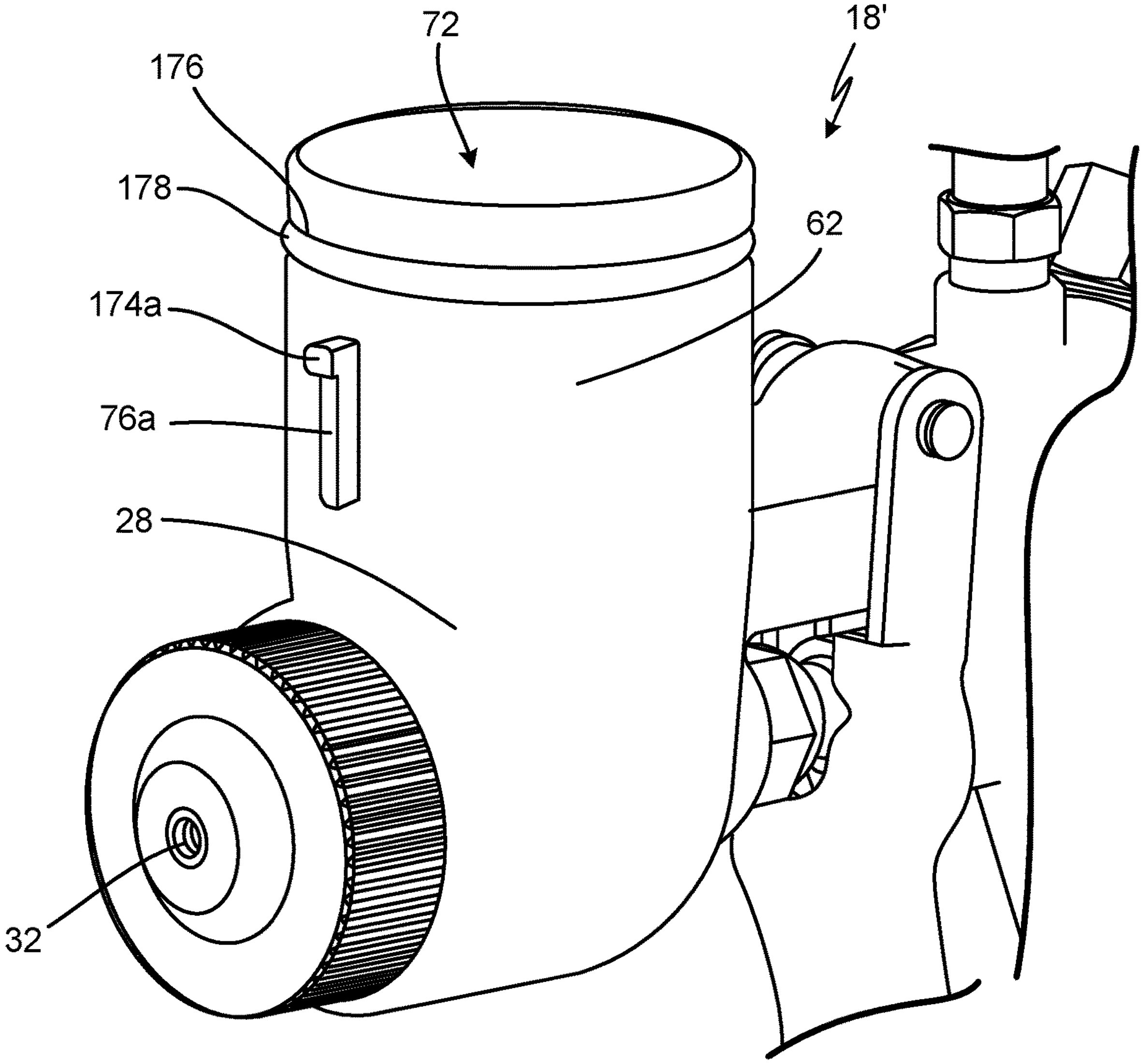
FIG. 14A is an isometric view of a second embodiment of a spray gun.
Figure 14B:
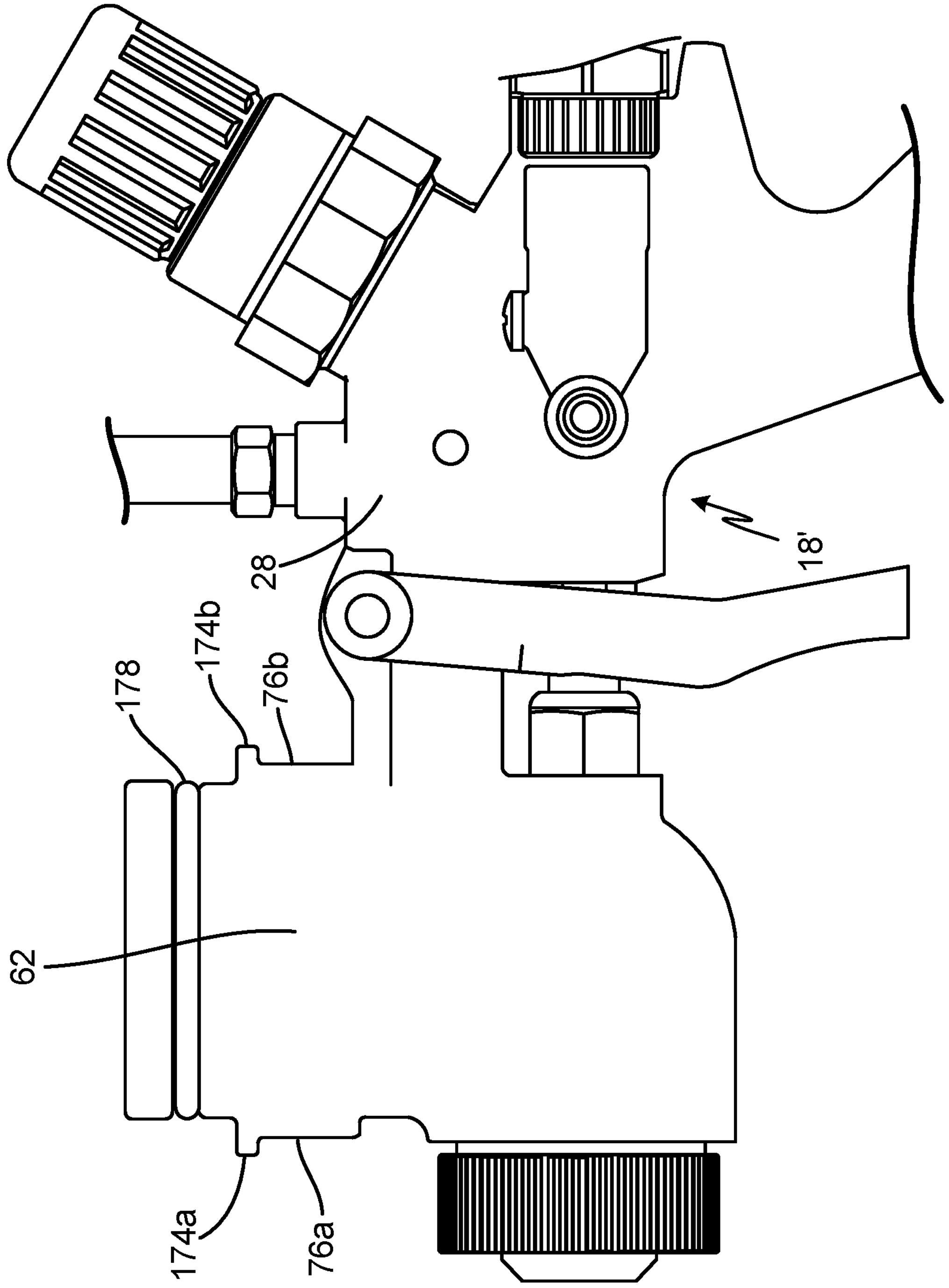
FIG. 14B is a side elevational view of the embodiment of a spray gun shown in FIG. 14A.

FIG. 14A is a first isometric view of spray gun 18'. FIG. 14B is a second isometric view of spray gun 18'. FIGS. 14A and 14B will be discussed together. Spray gun 18' is similar to spray gun 18, except projections 76*a*, 76*b* on throat 62 include stops 174*a*, 174*b*, respectively. In addition, throat 62 is shown as including groove 176 and sealing ring 178.

Stops 174*a*, 174*b* are located at the tops of the elongated projections 76*a*, 76*b*. In some alternative embodiments, stops 174*a*, 174*b* are not located on projections 76*a*, 76*b*, but instead protect directly from throat 62. Stops 174*a*, 174*b* are shown as being formed from the same type of material as projections 76*a*, 76*b* which are themselves formed from the same material as gun body 28. In the example shown, stops 174*a*, 174*b* are integral with projections 76*a*, 76*b*. Stops 174*a*, 174*b* help prevent hopper 20 (best seen in FIGS. 8A-8C) from separating from spray gun 18 due to the pressurization within hopper 20. Otherwise the pressurized air within hopper 20 may force a separation between spray gun 18 and hopper 20.

Sealing ring 178 is located within groove 176 formed around the throat 62. In some examples, sealing ring 178 can be a rubber O-ring. Sealing ring 178 engages the inner surface of neck 60 of hopper base 48 (best seen in FIGS. 8A-8C) to seal and prevent fluid within hopper 20 from leaking between the outer surface of throat 62 and the inner surface of neck 60. Also, sealing ring 178 prevents pressurized air within hopper 20 from escaping between the outer surface of throat 62 and the inner surface of neck 60, which otherwise could depressurize hopper 20. While groove 176 and sealing ring 178 are described as located on throat 62, it is understood that instead of being located in groove 176 of spray gun 18', sealing ring 178 could alternatively be located within a groove inside neck 60 of hopper 20.

Figure 15:
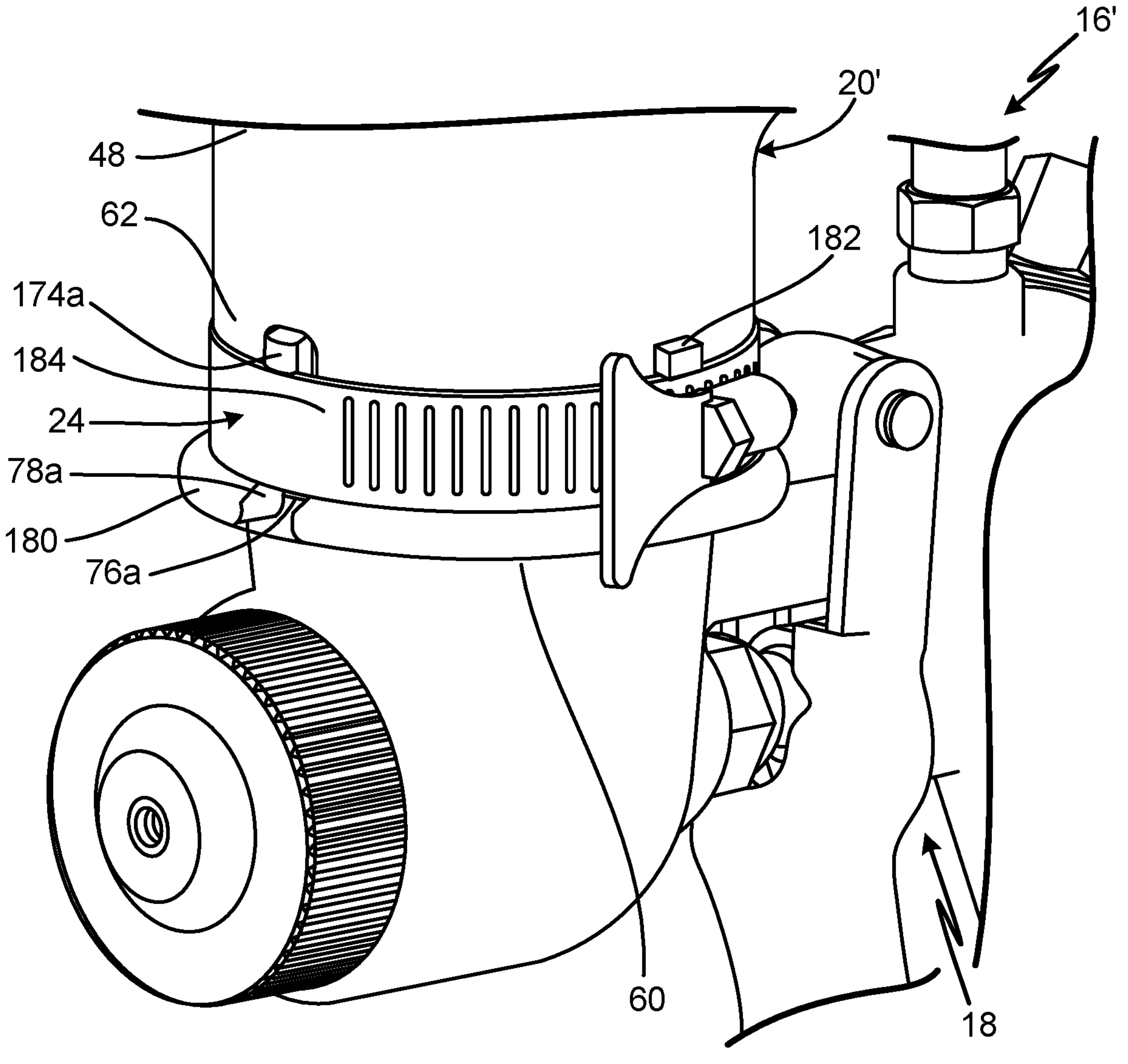
FIG. 15 is an isometric view of a second embodiment of a spray gun showing a hopper mounted on the spray gun.

FIG. 15 is an isometric view of sprayer 16'. Sprayer 16' includes spray gun 18' and hopper 20'. Throat 62 of hopper 20' includes flange 180 and stop 182. Projections 76*a*, 76*b* (only one of which is shown) are received in slots 78*a*, 78*b* (only one of which is shown) in throat 62. Also, stops 174*a*, 174*b* (only one of which is shown) project out from neck 60 beyond slots 78*a*, 78*b*. Clamp 24 is wrapped around neck 60. In this embodiment, clamp 24 is between, and can engage, projections to prevent or limit movement of clamp 24 along neck 60. Clamp 24 is limited in movement by engagement with flange 180 of hopper 20, which is disposed on the lower side of clamp 24, and by stops 174*a*, 174*b*, and 182 on the upper side of the clamp 24. It is noted that stop 182 is a projection that is part of hopper 20 (e.g., integrated with hopper base 48) and is one of a pair of projections (with another stop being located on the opposite, right side of neck 60) that prevent movement of clamp 24 along neck 60.

Engagement between the stops 174*a*, 174*b* of spray gun 18 with clamp 24, which is located around neck 60 of hopper 20, prevents separation of hopper 20 from spray gun 18, which could otherwise occur due to pressurized air within hopper 20.

As shown, clamp 24 includes band 184 that is tightened by a worm screw that interfaces with slots in band 184, the worm screw can be rotated by a handle or screwdriver.

Figure 16:
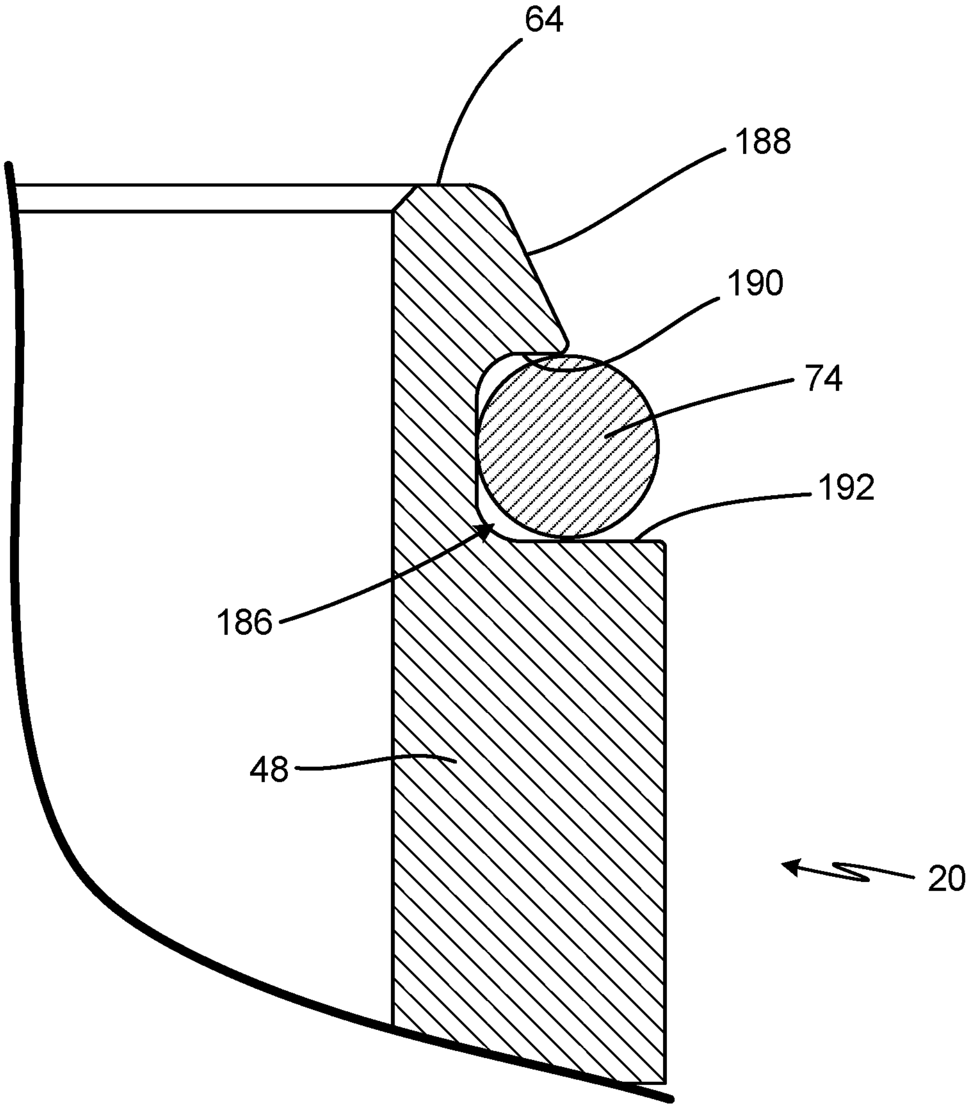
FIG. 16 is a cross-sectional view of a portion of a hopper.

FIG. 16 is a cross-sectional view of a portion of hopper 20. A portion of hopper base 48 of hopper 20 is shown. Lip 64, groove 186, and angled surface 188 of hopper base 48 are shown. Groove 186 includes top wall 190 and bottom wall 192.

Groove 186 extends into the outer, exterior surface of hopper base 48 and extends annularly entirely around hopper base 48. Groove 186 is sunken into hopper base 48 and is exposed on the exterior side of hopper base 48. Seal 74 is disposed within groove 186. Groove 186, and seal 74, are located below the top side, or lip 64, of hopper base 48.

Groove 186 is asymmetric in that the top portion of groove 186 has a different shape from the bottom portion of groove 186. The bottom portion of groove 186 is defined by bottom wall 192. The top portion of groove 186 is defined by top wall 190. Bottom wall 192 is longer than top wall 190. In other words, the top portion of groove 186 is shallower than the bottom portion of groove 186. This asymmetry exposes more of seal 74 on its top side than on its bottom side.

Angled hopper surface 188 is formed on a portion of hopper base 48 disposed above groove 186. The angled surface slopes away from the center of hopper base 48. Angled hopper surface 188 extends annularly entirely around hopper base 48. Angled hopper surface 188 extends from the corner of top wall 190 to lip 64 or the top of hopper base 48.

Figure 17:
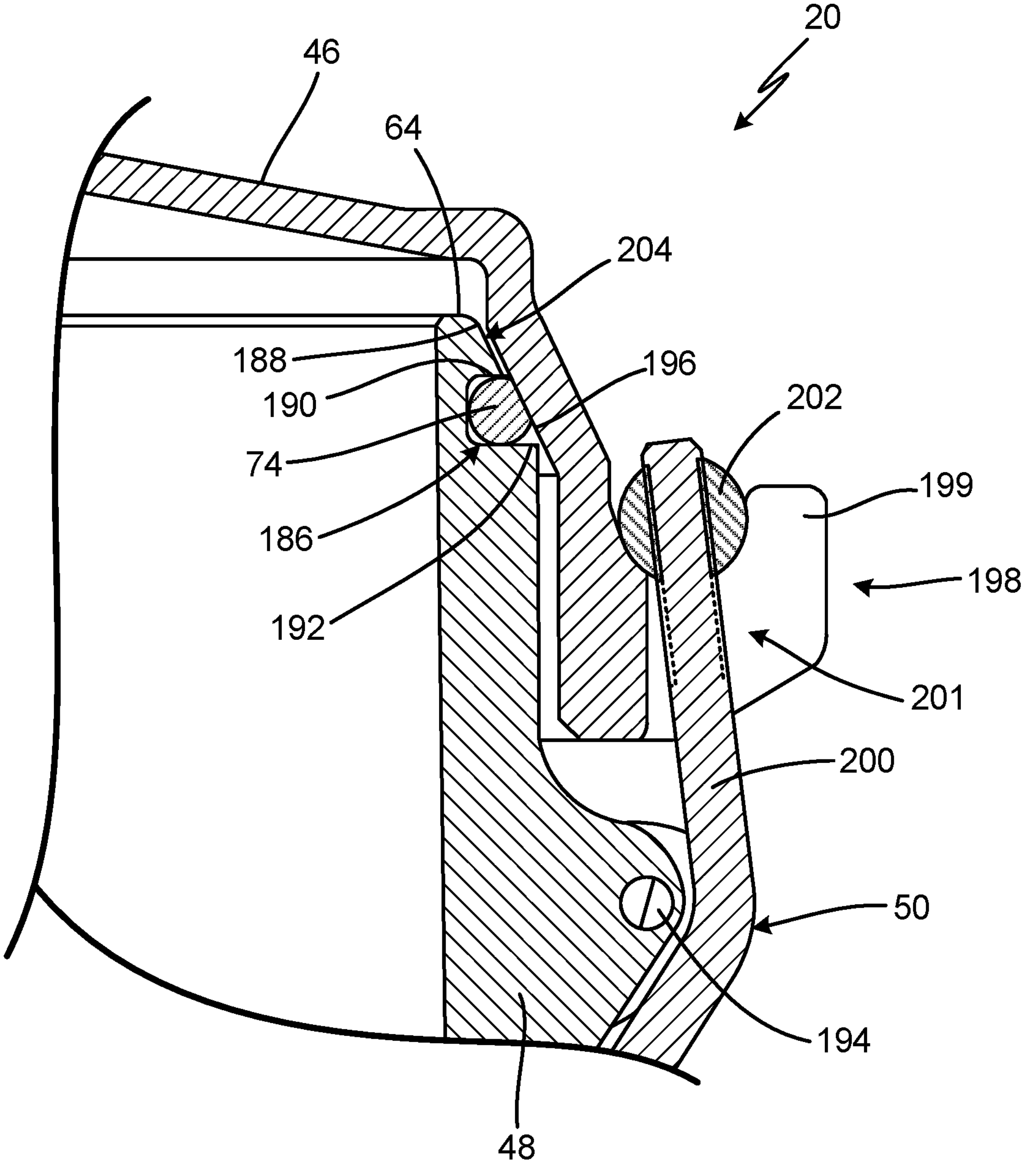
FIG. 17 is a cross-sectional view of a portion of a hopper showing a lid on the hopper.

FIG. 17 is a cross-sectional view of a portion of hopper 20. FIG. 17 is similar to FIG. 16, except FIG. 17 shows lid 46 fitted on hopper base 48. Lip 64, groove 186, angled surface 188, and pivot point 194 of hopper base 48 are shown. Groove 186 includes top wall 190 and bottom wall 192. Lid 46 includes angled lid surface 196 and holder 198. Lid fastener 50 includes rod 200 and retainer 202. Holder 198 includes prongs 199 (only one of which is shown) and opening 201.

Lid 46 is disposed on hopper base 48 and encloses interior space 68 within hopper base 48. Angled lid surface 196 extends parallel, or substantially parallel, to angled hopper surface 188. In this way, angled hopper surface 188 can have the same angle or slope as angled lid surface 196. Gap 204 is formed between angled hopper surface 188 and angled lid surface 196, and gap 204 separates angled hopper surface 188 from angled lid surface 196. Angled lid surface 196 engages seal 74 to create an annular seal between lid 46 (e.g., at angled lid surface 196) and hopper base 48 (e.g., at groove 186) by squeezing seal 74 therebetween. In the embodiment shown, lid 46 does not contact hopper base 48 (e.g., the material that forms the body of lid 46 does not contact the material that forms the body of hopper base 48) when lid 46 is on hopper base 48 and held down to seal interior space 68 of hopper 15. As such, lid 46 does not contact lip 64. Lid 46 thus rides on seal 74 without contacting angled hopper surface 188. The differential lengths between top wall 190 and bottom wall 192 further facilitates lid 46 riding on seal 74 without directly contacting hopper base 48. In this way, lid 46 may indirectly contact hopper base 48 only through seal 74 and lid fasteners 50.

Lid 46 is held on the base 21 by lid fasteners 50. Lid fasteners 50 are, in some examples, over-center clamps. Lid fasteners 50 include rod 200 that engages with retainer 202. Rod 200 is mounted to hopper base 48 at pivot point 194. Retainer 202 mounted on rod 200. Rod 200 extends into holder 198, such as through opening 201 between the two prongs 199 forming holder 198, and retainer 202 is held by holder 198, which is part of lid 46. The tension in clamp 16 can be adjusted, for greater or lesser compression force squeezing seal 74 between lid 46 and hopper base 48, by adjusting the coupling of rod 200 and retainer 202. As shown, rod 200 is threadedly engaged with a hole through retainer 202. Turning retainer 202 relative to rod 200 moves retainer 202 up or down rod 200 for lesser or greater tension and compression, depending on the direction of relative rotation. It is noted that retainer 202 is moved relative to rod 200 when clamp 16 is engaged with lid 46. Retainer 202 is configured to not rotate relative to rod 200 when held in holder 198.

While the illustrated embodiment shows groove 186 formed in hopper base 48 to retain seal 74 on hopper base 48, it is understood that groove 186 could alternatively be formed on the inner surface of lid 46. For example, groove 186 could be formed in angled lid surface 196, and seal 74 could be located within the groove in angled lid surface 196 and retained on lid 46. In this way, seal 74 would engage and seal with angled hopper surface 188 (groove 186 on hopper base 48 would be omitted) when lid 46 is placed on hopper base 48 to seal the top of hopper 15. Regardless of groove 186 being disposed in hopper base 48 or lid 46, lid 46 is configured to contact hopper base 48 through seal 74 and lid fasteners 50.

Figure 18:
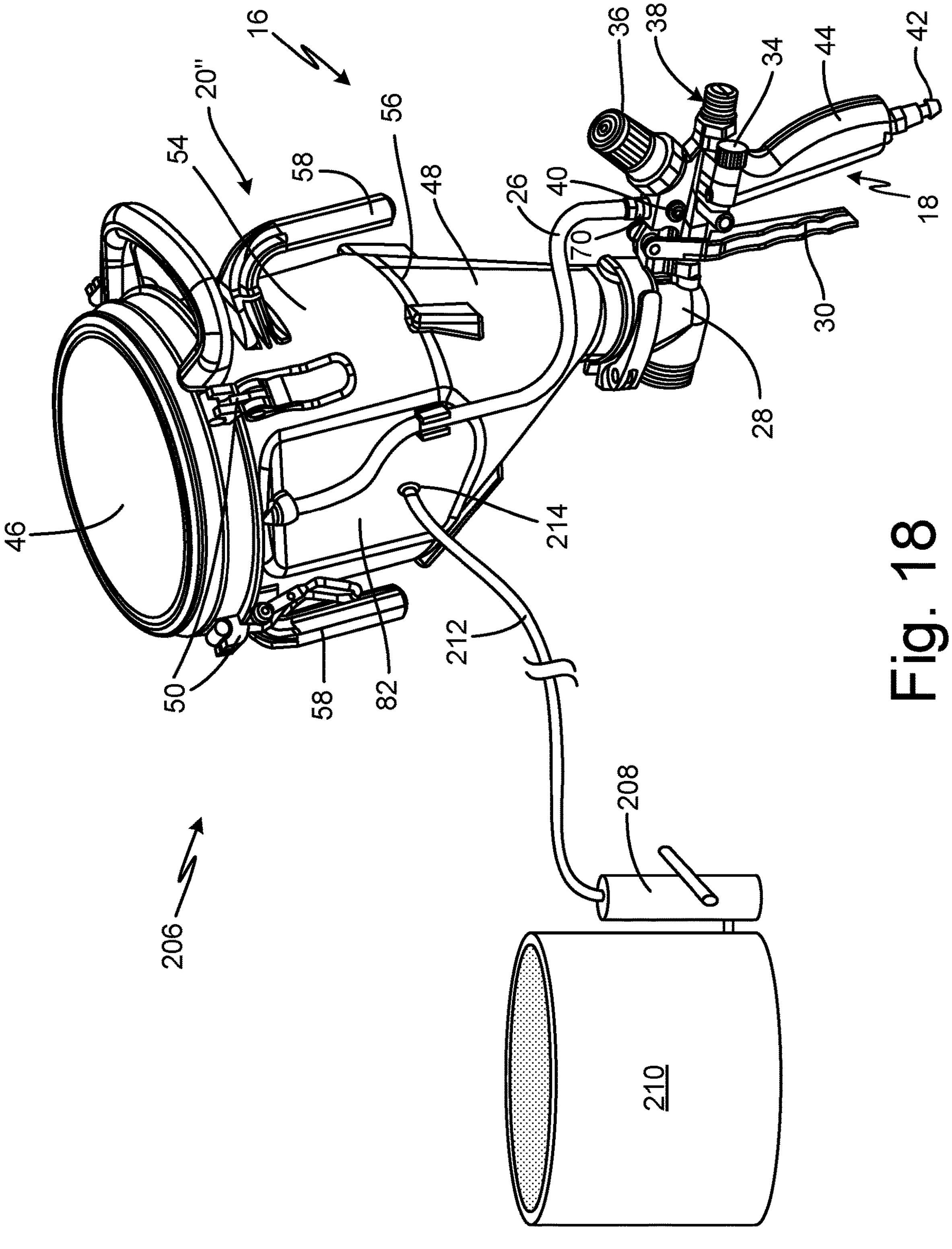
FIG. 18 is an isometric view of a refilling system.

FIG. 18 is an isometric view of refilling system 206. Refilling system 206 includes sprayer 16, pump 208, reservoir 210, and hose 212. Sprayer 16 can be similar to any sprayer version referenced herein. Sprayer 16 includes spray gun 18, hopper 20", and hose 26. Gun body 28, trigger 30, airflow control 34, pressure regulator 36, spray regulator 38, relief valve 40, connector 42, and connector 70 of spray gun 18 are shown. Handle 44 of gun body 28 is shown. Hopper 20" includes lid 46, hopper base 48, and fasteners 50. Upper portion 54, transition section 56, handles 58, flat wall 82, and port 214 of hopper base 48 are shown.

Port 214 extends through a side wall of hopper base 48 and provides access to the interior of hopper 20" for replenishing fluid within hopper 20" for continued spraying. Refilling hopper 20" through port 214 allows hopper 20" to be refilled without removing the lid 46 from base 21.

Reservoir 210 stores a supply of fluid for filling hopper 20". Hose 212 extends between pump 208 and hopper 20". Hose 212 is shown as attached to port 214. An end of hose 212 can attach to port 214 by any suitable connection, such as by a threaded, press fit, quick disconnect, or other type of connector. Port 214 is shown as being located on flat wall 82 of hopper base 48. Fitting port 214 on flat wall 82 provides for easier manufacturing than integrating port 214 into a curved surface of hopper base 48.

Pump 208 is connected to reservoir 210 and is configured to draw fluid form reservoir 210 and pump the fluid to hopper 20". Pump 208 can be a hand driven piston-type pump known in the art for moving texture fluid. An inlet of pump 208 is connected to reservoir 210. Texture fluid can be mixed in reservoir 210 and pumped out of reservoir 210 by pump 208, with pump 208 moving the fluid through hose 212 and port 214, and into hopper 20". After hopper 20" has been filled to a desired amount with the fluid, hose 212 can be detached from port 214. The user can then use sprayer 16 for spraying the added fluid. Typically, after refilling the user will disconnect hose 212 from port 214 before resuming spraying. In some cases, the user can spray while hose 212 stays connected to port 214 such that fluid can be taken into hopper 20 through port 214 and ejected from spray gun 18 during spraying as described herein.

Figure 19:
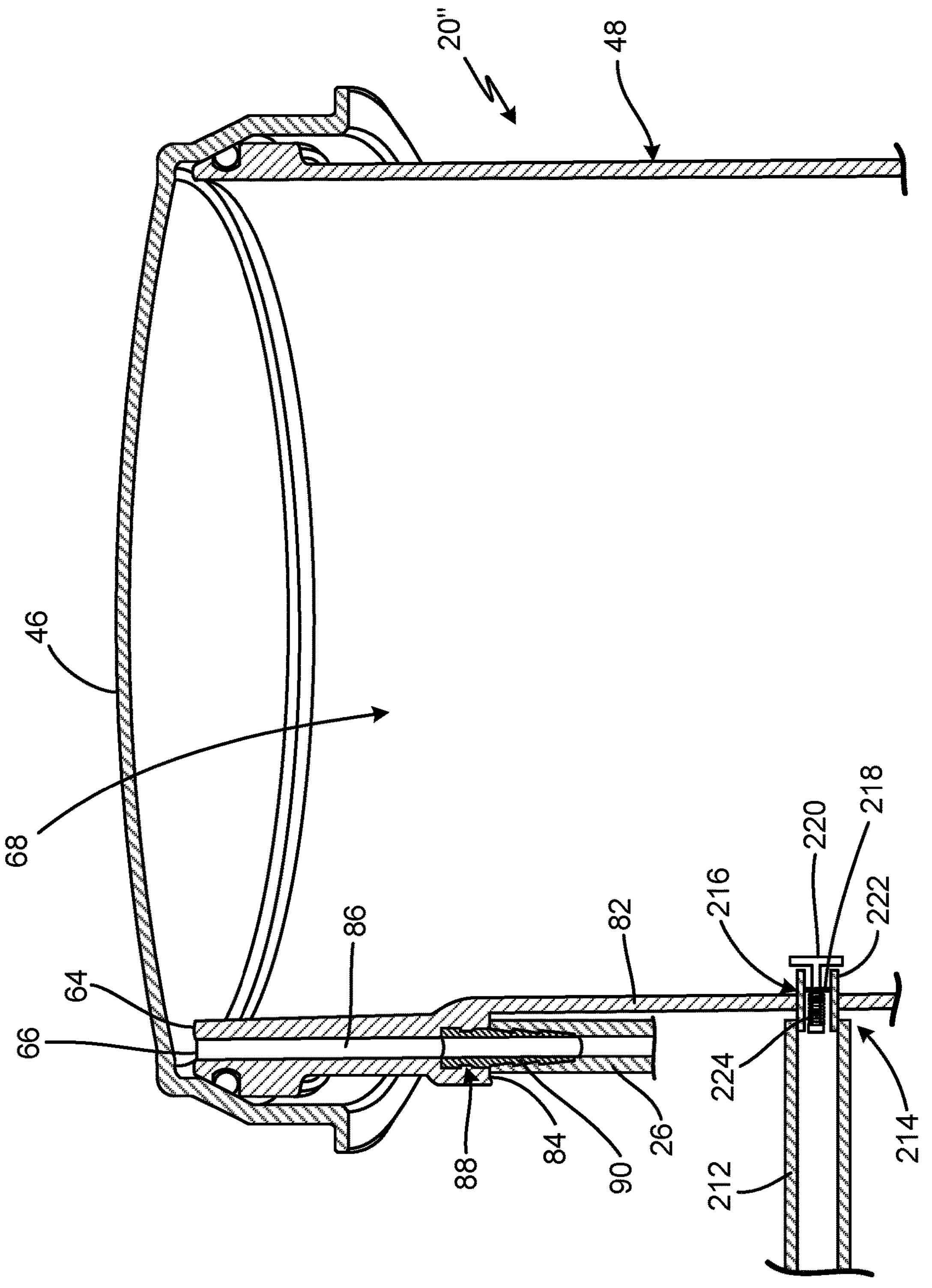
FIG. 19 is a cross-sectional view of a hopper.

FIG. 19 is a cross-sectional view of hopper 20". Lid 46 and hopper base 48 of hopper 20" are shown. Lip 64, port 66, flat wall 82, ridge 84, wall channel 86, lower opening 88, hopper connector 90, port 214, and check valve 216 of hopper 20" are shown. Hopper 20" defines interior space 68. Check valve 216 includes support 218, closing member 220, seat 222, and spring 224. Hopper 20" is substantially the same as hopper 20' and hopper 20, except port 214 extends into hopper 20"

Port 214 extends through a wall of hopper base 48 and is configured to connect to hose 212 to receive refill fluid from pump 208 (FIG. 18) and reservoir 210 (FIG. 18). Check valve 216 is disposed within port 214. Check valve 216 allows fluid to flow from the exterior of hopper 20 through port 214 and into interior space 68. However, check valve 216 does not allow fluid within interior space 68 to flow back out of hopper through port 214 and into hose 212. Likewise, check valve 216 prevents pressurized air within interior space 68 from escaping out of interior space 68 past check valve 216, through port 214, and then into hose 212 or otherwise to the exterior of hopper 20". Closing seal member 220 is movable within check valve 216. Closing seal member 220 can include a sealing disk on its interior side that interfaces with seat 222 to form an annular seal when closing seal member 220 engages seat 222. Seat 222 can be a housing or tube that is connected to, extends through, and/or is integrated with hopper base 48 of hopper 20". Spring 224 engages an opposite end of closing seal member 220 from the end that engages seat 222, and spring 224 pushes closing seal member 220 in an outward radial direction with respect to hopper 20 to push the inner side of closing seal member 220 against seat 222. The inner end of spring 224 braces off of support 218, which is fixed relative to seat 222 and hopper base 48. In one example, support 218 can be a bar that extends across the opening of port 214 and connects to opposite sidewalls. It is understood, however, that support 218 can be of any desired configuration for supporting an end of spring 224. The outer end of spring 224 pushes against an outer expanded end of closing seal member 220 to pull the inner end of closing seal member 220 against seat 222. As such, check valve 216 is normally closed.

When fluid is introduced from hose 212, or another conduit that interfaces with port 214, the pressure of the fluid, such as the pressure generated by pump 208, overcomes the spring force of spring 224 and the pressure within interior space 68 (if any, as interior 23 can be depressurized by relief valve 40 during refilling, as previously described) to open valve 216 and allow the flow of the fluid to enter interior space 68. Once the incoming fluid is exhausted or the pumping stops, spring 224 overcomes the upstream fluid pressure on the outside of port 214 and causes closing seal member 220 to shift back to a closed position. If interior space 68 was not already pressurized, then interior space 68 can once again be pressurized with air as previously described. Check valve 216 can include one or more O-rings, such as on closing seal member 220, to enhance sealing. While one example of check valve 216 is shown herein, various other types of check valves can be used. For example, check valve 216 can be a ball and seat or flapper valve, amongst other options. If port 214 and check valve 216 are used, then hopper 20 can have three sealing features—sealing ring 37, sealing ring 178, and check valve 216—to keep pressurized air and fluid within interior space 68 of hopper 20".

Discussion of Possible Embodiments

The following are non-exclusive descriptions of possible embodiments of the present invention.

A sprayer configured to spray fluid includes a hopper configured to hold the fluid; and a spray gun mounted to the hopper and configured to receive fluid from the hopper and spray the fluid onto a surface. The spray gun includes a gun body; an air passage extending into the gun body, the air passage configured to receive a flow of pressurized air; a first air pathway fluidly connected to the air passage and extending through the gun body; and a second air pathway fluidly connected to the air passage and extending through the gun body.

The sprayer of the preceding paragraph can optionally include, additionally and/or alternatively, any one or more of the following features, configurations and/or additional components:

A connector chamber in the gun body, the air passage configured to provide the flow of pressurized air to the connector chamber. At least a portion of the first air pathway extends through the gun body from the connector chamber, and at least a portion of the second air pathway extends through the gun body from the connector chamber.

The first air pathway is configured to direct a first portion of the flow of pressurized air to a nozzle of the spray gun, the first portion configured to propel the fluid through the nozzle; and the second air pathway is configured to direct a second portion of the flow of pressurized air to the hopper to pressurize the hopper and force the fluid from the hopper into the gun body.

An airflow control mechanism mounted to the gun body and configured to control the flow of the first portion through the first air pathway.

The airflow control mechanism includes a valve member extending into the gun body, the valve member configured to be actuated between a closed state, where the valve member prevents the first portion from flowing through the first air pathway, and an open state, where the valve member allows the first portion to flow through the first air pathway.

The valve member is capable of being positioned at a plurality of open positions while in the open state to vary a distance between the valve member and a valve seat.

The valve member is mounted to the gun body via interfaced threading, the valve member configured to shift between the closed state and the open state by rotating relative to the gun body.

A pressure regulator mounted to the gun body, the pressure regulator configured to control the flow of the second portion of the flow of pressurized air to the hopper through the second air pathway, to thereby control pressurization of the hopper.

The pressure regulator is actuatable between a plurality of positions between a minimum flow position and a maximum flow position.

The connector chamber is disposed upstream of both the airflow control mechanism and the pressure regulator.

A sprayer configured to spray fluid includes a hopper configured to hold the fluid; a spray gun mounted to the hopper and configured to receive fluid from the hopper and spray the fluid onto a surface; and a pressure regulator mounted to a gun body of the spray gun and configured to regulate a flow of pressurizing air from the gun body to the hopper, the flow of pressurizing air configured to pressurize the hopper to force fluid from the hopper into the spray gun. The pressure regulator is operable in a passive mode in which the pressure regulator allows a vacuum condition in the hopper to cause the pressure regulator to shift to an open state such that the flow of pressurizing air can flow through the pressure regulator to the hopper in response to the vacuum condition.

The sprayer of the preceding paragraph can optionally include, additionally and/or alternatively, any one or more of the following features, configurations and/or additional components:

The pressure regulator includes a housing mounted on the gun body; a diaphragm retained between the housing and the gun body; a first spring disposed in the housing and acting on a first side of the diaphragm, the first spring configured to bias the diaphragm in a first direction; a downstream chamber defined by the gun body and a second side of the diaphragm, wherein the downstream chamber is fluidly connected to the hopper; and a seal member connected to the diaphragm and separating the downstream chamber from an upstream chamber formed in the gun body, wherein movement of the diaphragm actuates the seal member between a closed position and an open position.

The seal member prevents the flow of pressurizing air from flowing into the downstream chamber from the upstream chamber when in the closed position, and wherein the seal member allows the flow of pressurizing air to flow into the downstream chamber from the upstream chamber when in the open position.

The pressure regulator further includes a seat retainer mounted in an air port extending through the gun body, the air port disposed between the upstream chamber and the downstream chamber. The seal member includes a shaft extending through seat retainer and connected to the diaphragm. The seal member is engaged with the seat retainer when the seal member is in the closed position, and the seal member is disengaged from the seat retainer when the seal member is in the open position.

A pressure control mechanism disposed within the housing and configured to exert a force on the first side of the diaphragm, via the first spring, to control a pressure of the flow of pressurizing air passing through the pressure regulator.

The pressure control mechanism includes a knob disposed on the housing; a threaded member extending from the knob into the housing, wherein rotation of the knob is configured to cause rotation of the threaded member; and a threaded ring disposed on the threaded member, wherein rotation of the threaded member causes the threaded ring to shaft axially along the threaded member. The threaded ring interfaces with the first spring, such that movement of the threaded member in the first direction increases the spring force on the diaphragm and movement of the threaded member in the second direction decreases the spring force on the diaphragm.

An exterior circumferential edge of the threaded ring contacts an inner side of the housing.

The exterior circumferential edge is keyed to the inner side of the housing, such that the inner side of the housing engages the exterior circumferential surface of the threaded ring to prevent the threaded ring from rotating relative to the housing.

A second spring disposed in the upstream chamber and interfacing with the seal member. The second spring is configured to bias the second spring towards the closed state.

A port extending into the downstream chamber through the gun body, the port providing a fluid connection between the downstream chamber and a flowpath extending to the hopper.

A relief valve extending into the gun body and disposed in the flowpath extending downstream from the port, the relief valve configured to be actuated between a closed position, where the flowpath is sealed, and an open position, where the flowpath is connected to the atmosphere.

A sprayer configured to spray fluid includes a hopper configured to hold the fluid; a spray gun mounted to the hopper and configured to receive fluid from the hopper and spray the fluid onto a surface, the spray gun configured to receive a pressurized airflow and provide the pressurized airflow to the hopper; and a relief valve disposed in a flowpath of the pressurized airflow, the flowpath fluidly connected to the hopper. The relief valve configured to pneumatically connect an interior of the hopper to the atmosphere when the relief valve is in an open position, thereby venting the pressure within the hopper.

The sprayer of the preceding paragraph can optionally include, additionally and/or alternatively, any one or more of the following features, configurations and/or additional components:

The relief valve includes a relief valve member disposed in a gun body of the spray gun.

The relief valve member is configured to shift to the open position based on the pressure within the hopper exceeding a threshold pressure.

The gun body includes an aperture disposed in the flowpath. The relief valve member comprises a spool disposed within the aperture. The spool and the aperture define a chamber within the gun body. The spool is configured to shift between the open position and a closed position. The chamber is sealed from the atmosphere with the spool in the closed position.

The spool includes a first end exposed on a first side of the gun body; and a first seal extending around the first end. The first seal is configured to pneumatically seal the chamber when the spool is in the closed position.

The spool includes a second end exposed on a second side of the gun body; and a second seal extending around the second end and interfacing with the gun body with the spool in each of the open position and the closed position.

A diameter of the first seal is larger than a diameter of the second seal such that the pressurized airflow in the chamber exerts a larger force on the first seal than on the second seal.

The spool is manually actuatable between the closed position and the open position.

The second end extends out of the gun body, such that the second end comprises a push button extending out of the gun body and accessible from outside of the gun body.

A retainer extending into the aperture and engaging the gun body, wherein the first seal interfaces with an inner edge of the retainer when the spool is in the closed position; and a spring disposed within the aperture, the spring interfacing with the retainer and the spool, wherein the spring is configured to bias the spool towards the closed position.

The relief valve is disposed downstream of a pressure regulator configured to regulate a pressure of the pressurized airflow flowing through the flowpath to the hopper.

The threshold pressure is greater than a maximum pressure configured to be allowed to flow downstream through the pressure regulator by the pressure regulator.

A sprayer configured to spray fluid, includes a hopper configured to hold the fluid; a spray gun mounted to the hopper and configured to receive fluid from the hopper and spray the fluid onto a surface; and a pressure regulator mounted to a gun body of the spray gun and configured to regulate a pressure of a flow of pressurizing air flowing to the hopper. The pressure regulator includes a pressure control mechanism configured to control the pressure of the flow of pressurizing air passing through the pressure regulator; and a knob configured to rotate to control a state of the pressure control mechanism. The knob has a limited angular displacement between a minimum pressure position and a maximum pressure position.

The sprayer of the preceding paragraph can optionally include, additionally and/or alternatively, any one or more of the following features, configurations and/or additional components:

The pressure regulator includes a housing mounted on the gun body of the gun. The knob is disposed on the housing and connected to the pressure control mechanism. The knob is configured to rotate relative to the housing to control the pressure of the flow of pressurizing air to the hopper to control a pressure within the hopper.

The pressure regulator includes a diaphragm retained between the housing and the gun body; a first spring disposed in the housing and acting on a first side of the diaphragm and configured to bias the diaphragm in a first direction; and a downstream chamber defined by the gun body and a second side of the diaphragm, wherein the downstream chamber is fluidly connected to the hopper. The pressure control mechanism is disposed within the housing and configured to exert a force on the first side of the diaphragm, via the first spring, to control a pressure of the flow of pressurizing air passing through the pressure regulator. The movement of the diaphragm in the first direction increases the flow of pressurizing air into the downstream chamber, and movement of the diaphragm in a second direction, opposite the first direction, reduces the flow of pressurizing air into the downstream chamber.

The pressure control mechanism includes a threaded member extending from the knob, wherein rotation of the knob is configured to cause rotation of the threaded member; and a threaded ring disposed on the threaded member, wherein rotation of the threaded member causes the threaded ring to shift axially along the threaded member in the first direction or the second direction.

The threaded ring interfaces with the first spring, such that movement of the threaded member in the first direction increases the spring force on the diaphragm and movement of the threaded member in the second direction decreases the spring force on the diaphragm.

A first thread stop disposed at a first end of the threaded member; and a second thread stop disposed at a second end of the threaded member. The first thread stop and the second thread stop define the ends of the extent of travel of the threaded ring along the threaded member.

An exterior circumferential edge of the threaded ring is keyed to an inner side of the housing, such that the inner side of the housing engages the exterior circumferential surface of the threaded ring to prevent the threaded ring from rotating relative to the housing.

The threaded member is rotationally fixed to the knob such that the threaded member rotates with the knob. The threaded ring engaging the first thread stop prevents the knob from rotating in a first rotational direction. The threaded ring engaging the second thread stop prevents the knob from rotating in a second rotational direction, opposite the first rotational direction.

The threaded member and the threaded ring include interfaced threading dimensioned such that the limited angular displacement of the knob is 360-degrees or less.

A thread pitch of the threaded member and the threaded ring is dimensioned such that the limited angular displacement of the knob is 360-degrees or less.

Positional markings on the knob.

A sprayer configured to spray fluid includes a hopper configured to hold the fluid; and a spray gun mounted to the hopper and configured to receive fluid from the hopper and spray the fluid onto a surface. The spray gun includes a gun body having a flowpath therethrough, the flowpath configured to provide a pressurizing airflow to the hopper; and a pressure regulator mounted to a gun body of the gun and configured to regulate the pressurizing airflow to the hopper. The pressure regulator includes a housing mounted on the gun body; a diaphragm retained between the housing and the gun body; a downstream chamber defined by the gun body and a second side of the diaphragm, wherein the downstream chamber is fluidly connected to the hopper; and a seal member connected to the diaphragm and separating the downstream chamber from an upstream chamber in the gun body.

The sprayer of the preceding paragraph can optionally include, additionally and/or alternatively, any one or more of the following features, configurations and/or additional components:

The seal member is movable between a closed position, where seal member prevents the flow of pressurizing air from flowing into the downstream chamber from the upstream chamber, and an open position, where the seal member allows the flow of pressurizing air to flow into the downstream chamber from the upstream chamber.

An air port extending through the gun body between the upstream chamber and the downstream chamber, wherein the seal member is configured to control the flow of pressurizing air through the air port.

A seat retainer mounted to the gun body and disposed in the air port. The seal member includes a shaft extending through seat retainer and connected to the diaphragm. The seal member is engaged with the seat retainer when the seal member is in the closed position, and the seal member is disengaged from the seat retainer when the seal member is in the open position.

A port extending through the gun body and fluidly connected to the downstream chamber, wherein the port is fluidly connected to a flowpath extending to the hopper to provide pressurized air to the hopper.

A sprayer configured to spray fluid includes a spray gun configured to receive a fluid and spray the fluid onto a surface and a hopper mounted on the spray gun and configured to hold the fluid and provide the fluid to the spray gun. The hopper includes a hopper base; and an air passage extending through a wall of the hopper base, the air passage including a passage inlet and a passage outlet, and the air passage configured to provide pressurized air to an interior of the hopper.

The sprayer of the preceding paragraph can optionally include, additionally and/or alternatively, any one or more of the following features, configurations and/or additional components:

The hopper includes a lid disposed over a lip located at a top of the hopper base. The passage outlet of the air passage is disposed adjacent the lip.

The passage outlet is oriented vertically towards the lid.

The air passage extends along a passage axis between the passage inlet and the passage outlet.

A wall of the hopper base includes an external ridge, and the passage inlet extends into the external ridge.

The wall of the hopper base includes a flat portion, wherein the external ridge projects above the flat portion.

A seal groove extending around an exterior of the hopper base proximate the lip. A hopper seal disposed in the seal groove, the hopper seal configured to interface with the lid to seal an interior of the hopper base.

The gun body includes an air inlet extending into the gun body, the air inlet configured to receive the pressurized air from an air source; a hopper pressurization port extending through the gun body; and a hose extending from the hopper pressurization port to the passage inlet.

A sprayer configured to spray fluid includes a spray gun configured to receive a fluid and spray the fluid onto a surface and a hopper mounted on to the spray gun and configured to hold the fluid and provide the fluid to the spray gun. The spray gun includes a gun body and a throat extending from the gun body. The hopper includes a hopper base having a neck configured to mount to the throat of the gun body, wherein the fluid moves through the neck and throat between the hopper and the spray gun.

The sprayer of the preceding paragraph can optionally include, additionally and/or alternatively, any one or more of the following features, configurations and/or additional components:

At least one projection extends from the throat of the gun body. The neck includes at least one slot configured to receive the at least one projection to fix an orientation of the hopper with respect to the gun body.

The at least one projection includes two projections, and the at least one slot includes two slots.

The two projections are oriented about 180-degrees apart about a periphery of the throat.

The at least one projection is vertically elongate. The at least one projection includes a stop projecting horizontally from the at least one projection.

A clamp extending around the neck and the throat, wherein the clamp is disposed between the gun body and the stop.

The hopper includes a base flange at a distal end of the neck, wherein the clamp is disposed between the base flange and the stop.

The stop extends out of the at least one slot when the hopper is mounted on the gun, such that the stop engages the clamp to prevent the hopper from pulling off of the throat and disengaging from the spray gun.

The hopper tilts relative to a vertical axis when the hopper is mounted on the spray gun.

The hopper base includes an upper portion and a transition portion extending between and connecting the upper portion and the neck. The upper portion is oriented on a hopper axis, the hopper axis tilted one of forward and backward relative to the vertical axis when the hopper is mounted on the gun.

The at least one projection and the at least one slot are oriented to limit a tilt of the hopper to one of forward and backward relative to the vertical axis.

The throat is disposed within the neck.

A sprayer configured to spray fluid includes a spray gun configured to receive a fluid and spray the fluid onto a surface, wherein the spray gun includes a gun body and a throat extending from the gun body, and a hopper mounted on the spray gun and configured to hold the fluid and provide the fluid to the gun. The hopper includes a hopper base; a lip disposed at a first end of the hopper base and extending around a top opening in the hopper base; a seal groove extending around an exterior of the hopper base below the lip; a seal disposed within the groove; and a lid disposed over the top opening and the lip, the lid configured to engage the seal to enclose and seal the hopper base.

The sprayer of the preceding paragraph can optionally include, additionally and/or alternatively, any one or more of the following features, configurations and/or additional components:

The groove is defined by a bottom wall and a top wall opposite the bottom wall, wherein the bottom wall is longer than the top wall.

The hopper base includes an angled base surface extending annularly about the hopper base between a distal end of the top wall and the lip.

The lid rides on the seal.

The lid is spaced from the hopper base such that the lid does not contact the hopper base.

The lid includes an angled lid surface configured to engage the seal, and a gap is disposed between the angled lid surface and the angled base surface.

A plurality of over-center clamps disposed about the hopper, wherein the plurality of over-center clamps are configured to engage the lid and to hold the lid on the hopper base.

Each one of the plurality of over-center clamps comprise a rod and a retainer mounted on the rod, and the retainer is configured to rotate relative to the rod to adjust a degree of compression of the lid on the seal.

The rod is mounted to the hopper base at a pivot point disposed on an exterior of the hopper base. The retainer is mounted on the lid at a holder extending from the lid.

The holder comprises a first prong and a second prong, wherein the rod extends between the first prong and the second prong.

A sprayer configured to spray fluid includes a spray gun configured to receive a fluid and spray the fluid onto a surface, and a hopper mounted on the spray gun. The spray gun includes a gun body; and a throat extending from the gun body. The hopper is mounted at the throat and configured to hold the fluid and provide the fluid to the spray gun. The hopper includes a hopper base having a neck; and a first groove extending around an exterior of the hopper proximate a top of the hopper base. The sprayer further includes a second groove extending around one of an exterior of the throat and an interior of the neck; a first seal disposed within the first groove; and a second seal disposed within the second groove. The first seal is configured to interface with and seal with a lid disposed on the top of the hopper. The second seal is configured to interface with the throat and neck to seal the interface between the throat and the neck.

The sprayer of the preceding paragraph can optionally include, additionally and/or alternatively, any one or more of the following features, configurations and/or additional components:

The second groove extends around an exterior of the throat.

A plurality of projections extending from the exterior of the throat. The second groove is disposed above the plurality of projections.

The lid is configured to ride on the first seal.

The lid is spaced from the hopper base such that the lid does not contact the hopper base when the lid contacts the first seal.

Each of the first groove and the second groove are disposed above a spray axis of the spray gun.

Each of the first seal and the second seal seal an interior of the hopper base to enable pressurization of the interior of the hopper base.

A sprayer configured to spray fluid includes a spray gun configured to receive a fluid and spray the fluid onto a surface; and a hopper mounted on the spray gun and configured to hold the fluid and provide the fluid to the spray gun. The hopper includes a plurality of projections extending from an exterior of the hopper. The plurality of projections are vertically elongate. The plurality of projections are spaced around a periphery of the hopper. The plurality of projections are configured to engage multiple points along a curved surface of a container when the sprayer is placed in the container.

The sprayer of the preceding paragraph can optionally include, additionally and/or alternatively, any one or more of the following features, configurations and/or additional components:

The engagement of the multiple points is configured to prevent rocking of the sprayer against the curved surface.

The plurality of projections includes four projections extending from the exterior of the hopper.

The plurality of projections engage the curved surface to prevent rocking of the sprayer against the curved surface.

The hopper further includes an upper portion disposed at a top of the hopper; a neck disposed at a bottom of the hopper; and a transition portion extending between and connecting the upper portion and the neck. The plurality of projections are extend from the upper portion onto the transition portion.

A sprayer configured to spray fluid includes a spray gun configured to receive a fluid and spray the fluid onto a surface; and a hopper mounted on the spray gun and configured to hold the fluid and provide the fluid to the spray gun. The hopper includes a hopper base; a lid disposed on the hopper base; and a port extending through the hopper base, wherein the port is configured to provide a pathway for fluid to enter the hopper such that the hopper can be refilled without removing the lid from the hopper base.

The sprayer of the preceding paragraph can optionally include, additionally and/or alternatively, any one or more of the following features, configurations and/or additional components:

A valve disposed within the port.

The valve is a check valve configured to allow flow into the hopper and prevent flow out of the hopper.

The hopper base includes a flat wall portion, and wherein the port extends through the flat wall portion.

The check valve includes a seat and a closing member configured to shift between an open position where fluid can flow through the check valve and a closed position where fluid is prevented from flowing through the check valve. The closing member includes a disk configured to interface with the seat when the closing member is in the closed position.

The check valve includes a spring configured to bias the closing member towards the closed position.

The port is configured to connect to a hose for channeling the fluid to the hopper through the port.

A spray system incorporating the sprayer and having a fluid reservoir and a pump. The hose extends from the pump to the port. The pump is configured to pump fluid from the fluid reservoir and into the hopper through the hose and the port.

A method of spraying includes flowing pressurized air into a common air passage extending into a gun body of a spray gun; flowing a first portion of the pressurized air through a first branch path and to a nozzle of the spray gun to eject a fluid from the nozzle of the spray gun; controlling the flow of the first portion of the pressurized air through the first branch path with an airflow control mechanism disposed in the first branch path; flowing a second portion of the pressurized air through a second branch path within the gun body; regulating an air pressure of the second portion of the pressurized air with a pressure regulator disposed in the second branch path, thereby generating a regulated air flow within the second branch path downstream of the first branch path; and flowing the regulated air flow to a hose extending from a port in the gun body, the hose extending to a hopper mounted on the spray gun and configured to provide the regulated air flow to the hopper to pressurize the hopper.

The method of the preceding paragraph can optionally include, additionally and/or alternatively, any one or more of the following features, configurations and/or additional components:

Shifting a relief valve disposed in the gun body and in the second branch path downstream of the pressure regulator from a closed state to an open state, thereby venting the regulated air from the second branch path to the atmosphere and depressurizing the hopper.

A method of spraying includes flowing air into a common air passage extending into a gun body of a spray gun; flowing a first portion of the air through a first branch path and to a nozzle of the spray gun to eject a fluid from the nozzle of the spray gun; flowing a second portion of the air through a second branch path within the gun body and to a hose extending from a port in the gun body; flowing the second portion through the hose to an air passage extending through a wall of the hopper, wherein the air passage is disposed on a passage axis and includes a passage outlet oriented vertically towards a lid of the hopper; wherein the second portion is configured to pressurize an interior of the hopper to drive the fluid into the spray gun from the hopper.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A handheld sprayer comprising:

a spray gun configured to receive material from a reservoir supported by the spray gun and spray the material onto a surface, the spray gun comprising:

a nozzle through which the material is emitted from the spray gun;

a trigger supported by the gun body, the trigger actuatable to open a flowpath for the material through the nozzle;

a connector supported by the spray gun and configured to attach to a hose and supply a flow of pressurized air;

an air passage extending into the spray gun, the air passage configured to receive the flow of pressurized air;

a common chamber within the spray gun, the common chamber configured to receive the flow of pressurized air from the air passage;

a first air pathway fluidly connected to the air passage to receive a first portion of the pressurized air, wherein at least a portion of the first air pathway extends through the spray gun from the common chamber, and wherein the first air pathway is configured to direct the first portion of the pressurized air to the nozzle, the first portion of the pressurized air configured to propel the material through the nozzle; and a second air pathway fluidly connected to the air passage to receive a second portion of the pressurized air from the air passage, wherein at least a portion of the second air pathway extends through the spray gun from the common chamber, and wherein the second air pathway is configured to direct the second portion of the pressurized air to pressurize the reservoir and force the material from the reservoir and towards the nozzle for spraying; and a pressure regulator supported by the spray gun and including a regulator spring, the pressure regulator configured to regulate a pressure of the second portion of the pressurized air.

2. The sprayer of claim 1, wherein the pressure regulator is adjustable to vary the pressure of the second portion of the pressurized air downstream of the pressure regulator.

3. The sprayer of claim 2, wherein the pressure regulator is actuatable between a plurality of positions between a minimum flow state and a maximum flow state.

4. The sprayer of claim 3, wherein the pressure regulator includes a knob configured to actuate the pressure regulator between the plurality of positions, wherein the knob is rotatable between a first position corresponding to the minimum flow state and a second position corresponding to the maximum flow state.

5. The sprayer of claim 4, wherein the knob is configured to rotate 360-degrees between the first position and the second position.

6. The sprayer of claim 1, further comprising:

an airflow control mechanism mounted to a gun body of the spray gun and configured to control the flow of the first portion through the first air pathway.

7. The sprayer of claim 6, wherein the airflow control mechanism comprises:

a valve member extending into the gun body, the valve member configured to be actuated between a closed state, where the valve member prevents the first portion from flowing through the first air pathway, and an open state, where the valve member allows the first portion to flow through the first air pathway.

8. The sprayer of claim 7, wherein the valve member is capable of being positioned at a plurality of open positions while in the open state to vary a distance between the valve member and a valve seat.

9. The sprayer of claim 8, wherein the valve member is mounted to the gun body via interfaced threading, the valve member configured to shift between the closed state and the open state by rotating relative to the gun body.

10. The sprayer of claim 1, wherein the pressure regulator includes a housing mounted to a gun body of the spray gun.

11. The sprayer of claim 1, wherein the pressure regulator is actuatable between a plurality of positions between a minimum flow position and a maximum flow position.

12. The sprayer of claim 1, wherein the connector chamber is disposed upstream of an airflow control mechanism configure to control the flow of the first portion of pressurized air through the first air pathway, and wherein the connector chamber is disposed upstream of the pressure regulator.

13. The sprayer of claim 1, further comprising:

a relief valve disposed on the second air pathway;

wherein the relief valve configured to pneumatically connect the second air pathway to atmosphere when the relief valve is in an open position, thereby venting the pressure within the second air pathway.

14. The sprayer of claim 13, wherein the relief valve is disposed downstream of the pressure regulator.

15. The sprayer of claim 13, wherein the relief valve is configured to shift to the open position by the pressure within the second air pathway when the pressure within the second air pathway exceeds a threshold pressure.

16. The sprayer of claim 1, wherein:

the reservoir is formed by a hopper having a hopper base with a top opening and a neck extending from an opposite end of the hopper base from the top opening; and the hopper is mounted to a gun body of the sprayer by the neck interfacing with a throat projecting from the gun body.

17. The sprayer of claim 1, further comprising:

a needle disposed at least partially within a gun body of the sprayer, the needle operably connected to the trigger to be actuated by the trigger and control spraying through the nozzle.

18. A handheld sprayer comprising:

a spray gun configured to receive material from a reservoir supported by the spray gun and spray the material onto a surface, the spray gun comprising:

a nozzle through which the material is emitted from the spray gun;

a trigger supported by the gun body, the trigger actuatable to open a flowpath for the material through the nozzle;

an air passage extending into the spray gun, the air passage configured to receive the flow of pressurized air;

a first air pathway fluidly connected to the air passage to receive a first portion of the pressurized air, wherein at least a portion of the first air pathway extends through the spray gun, and wherein the first air pathway is configured to direct the first portion of the pressurized air to the nozzle, the first portion of the pressurized air configured to propel the material through the nozzle; and a second air pathway fluidly connected to the air passage to receive a second portion of the pressurized air from the air passage, wherein at least a portion of the second air pathway extends through the spray gun, and wherein the second air pathway is configured to direct the second portion of the pressurized air to pressurize the reservoir and force the material from the reservoir and towards the nozzle for spraying; and a pressure regulator supported by the spray gun and including a regulator spring, the pressure regulator configured to regulate a pressure of the second portion of the pressurized air.

* * * * *